(12) United States Patent
Kuroda

(10) Patent No.: US 9,843,363 B2
(45) Date of Patent: Dec. 12, 2017

(54) COVERED WIRE COUPLING TYPE INFORMATION COMMUNICATION NETWORK, ELECTROMAGNETIC FIELD COUPLING COMMUNICATION METHOD AND ELECTROMAGNETIC FIELD COUPLER

(71) Applicant: KEIO UNIVERSITY, Tokyo (JP)

(72) Inventor: Tadahiro Kuroda, Yokohama (JP)

(73) Assignee: KEIO UNIVERSITY, Tokyo (JP)

( * ) Notice: Subject to any disclaimer, the term of this patent is extended or adjusted under 35 U.S.C. 154(b) by 0 days.

(21) Appl. No.: 14/891,016

(22) PCT Filed: May 9, 2014

(86) PCT No.: PCT/JP2014/062464
§ 371 (c)(1),
(2) Date: Nov. 13, 2015

(87) PCT Pub. No.: WO2014/185349
PCT Pub. Date: Nov. 20, 2014

(65) Prior Publication Data
US 2016/0119034 A1    Apr. 28, 2016

(30) Foreign Application Priority Data

May 16, 2013 (JP) .................................. 2013-103762

(51) Int. Cl.
*H04B 3/00* (2006.01)
*H04B 5/00* (2006.01)
(Continued)

(52) U.S. Cl.
CPC ............. *H04B 5/0075* (2013.01); *H04B 3/46* (2013.01); *H01R 13/6473* (2013.01); *H04B 5/0012* (2013.01)

(58) Field of Classification Search
CPC ............. H04L 25/0272; H04L 25/0292; H04L 25/028; H04L 25/08; H04L 7/0008;
(Continued)

(56) References Cited

U.S. PATENT DOCUMENTS

2005/0017908 A1    1/2005  Saegrov
2008/0032621 A1    2/2008  Higuma et al.
(Continued)

FOREIGN PATENT DOCUMENTS

JP    2006-38393 A    2/2006
JP    2007-116464 A   5/2007
(Continued)

OTHER PUBLICATIONS

Notification of Transmittal of International Preliminary Report on Patentability (Form PCT/IPEA/416) dated Jan. 13, 2015 issued in International Patent Application No. PCT/JP2014/062464, (2 pages).

(Continued)

Primary Examiner — Zewdu Kassa
(74) Attorney, Agent, or Firm — Westerman, Hattori, Daniels & Adrian, LLP

(57) ABSTRACT

This invention relates to a covered wire coupling type information communication network, an electromagnetic field coupling communication method and an electromagnetic field coupler, which makes it possible to solve the problem with the mechanical contact system and the structure where wires are exposed in a connector. A first covered wire and a second covered wire are placed in close proximity to each other in a coupling unit, and electromagnetic coupling in the coupling unit creates a data connection between the first and second covered wire.

36 Claims, 43 Drawing Sheets

(51) Int. Cl.
*H04B 3/46* (2015.01)
*H01R 13/6473* (2011.01)

(58) Field of Classification Search
CPC ........ H01R 43/28; H01R 43/20; H01R 43/01; H01R 2103/00; H01R 43/052; H01R 43/16; H01H 11/041; H01H 11/04; A61N 1/044; B21K 1/62; H01B 7/2825; H01B 11/1016
USPC .......... 375/257, 316, 295, 219; 29/857, 877; 174/107
See application file for complete search history.

(56) References Cited

U.S. PATENT DOCUMENTS

| | | | |
|---|---|---|---|
| 2011/0030210 A1* | 2/2011 | King, Jr. .............. | H01R 4/4818 29/857 |
| 2012/0000692 A1* | 1/2012 | Tsuchiya ................ | H01R 4/726 174/107 |
| 2013/0324044 A1 | 12/2013 | Kuroda et al. | |

FOREIGN PATENT DOCUMENTS

| | | |
|---|---|---|
| JP | 2007-267055 A | 10/2007 |
| JP | 2009-194782 A | 8/2009 |
| JP | 5213087 B2 | 6/2013 |
| WO | 2012/111639 A1 | 8/2012 |

OTHER PUBLICATIONS

Notification of Transmittal of Translation of the International Preliminary Report on Patentability dated Nov. 19, 2015, Form PCT/IB338, with Form PCT/IPEA/409 issued in International Patent Application No. PCT/JP2014/062464, with English translation. (11 pages).

International Search Report dated Jun. 3, 2014, issued in counterpart International Application No. PCT/JP2014/062464 (2 pages).

Takeya et al., "A 12Gb/s Non-Contact Interface with Coupled Transmission lines", IEEE Journal of Solid-State Circuits, Mar. 2013, pp. 790-800, vol. 48, No. 3, cited in the Specification (11 pages).

Takeya et al., "A 12Gb/s Non-Contact Interface with Coupled Transmission lines", IEEE International Solid-State Circuits Conference (ISSCC '11), Dig.Tech.Papers, Feb. 2011, pp. 492-493 (3 pages).

Yun et al., "A 7Gb/s/Link Non-Contact Memory Module for Multi-Drop Bus System Using Energy-Equipartitioned Coupled Transmission Line", IEEE International Solid-State Circuits Conference (ISSCC '12), Dig.Tech.Papers, Feb. 2012, pp. 52-53, cited in the Specification (3 pages).

Mizuhara et al., "A 0.15mm-Thick Non-Contact Connector for MIPI Using Vertical Directional Coupler", IEEE International Solid-State Circuits Conference (ISSCC '13), Dig.Tech.Papers, Feb. 2013, pp. 200-201, cited in the Specification (3 pages).

* cited by examiner

FIG. 5A
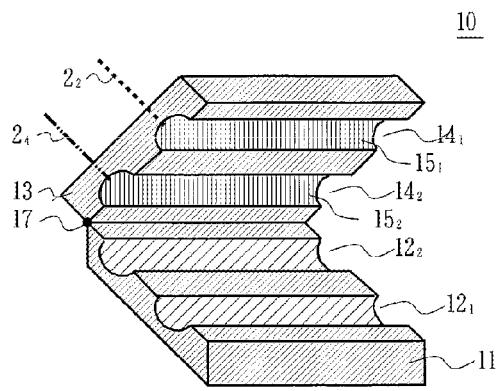
FIG. 5B
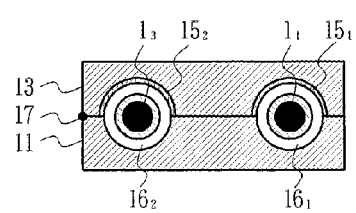
FIG. 5C          FIG. 5D
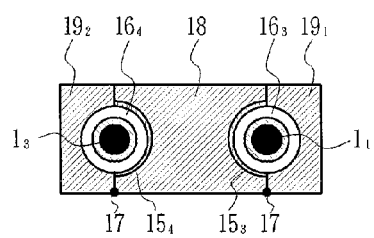  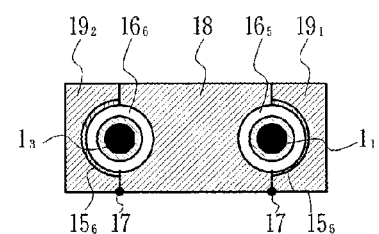
FIG. 6A
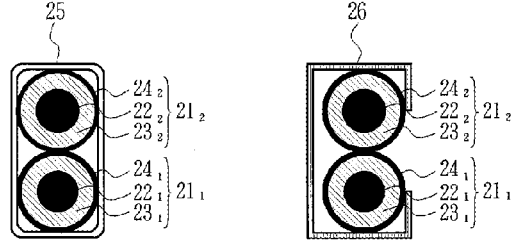
FIG. 6B
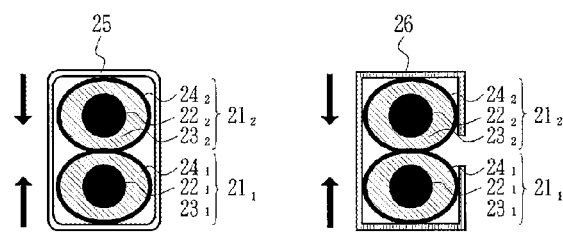

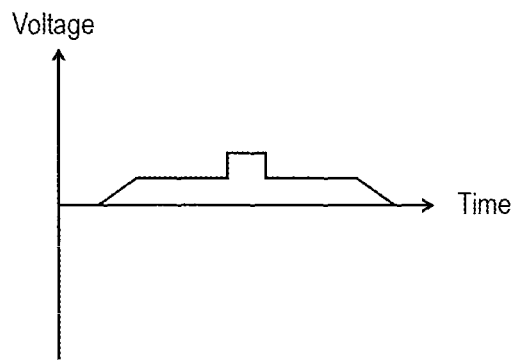
FIG. 46A
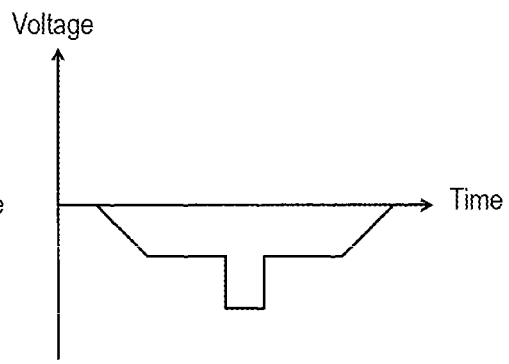
FIG. 46B
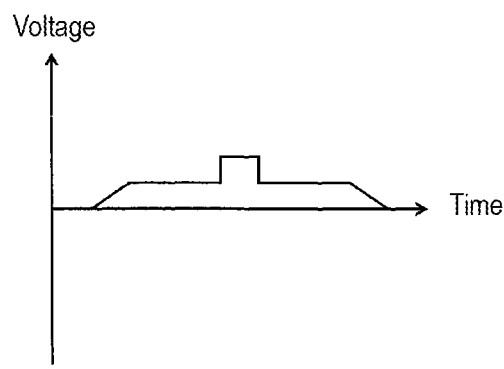
FIG. 46C
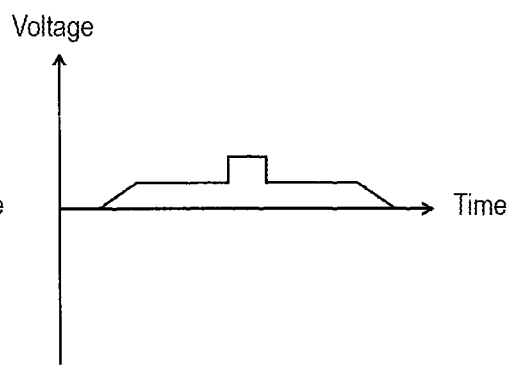
FIG. 46D
FIG. 47
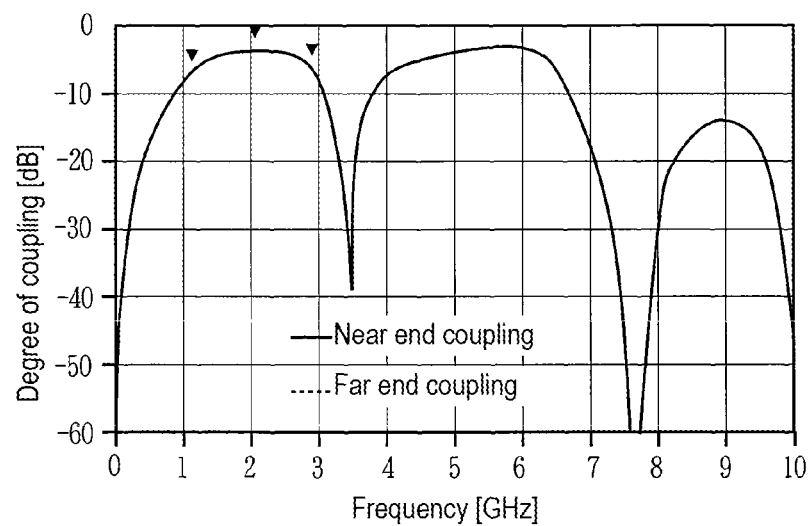

Threshold value with hysteresis 0   1   1   0   1   0   0   0   1

Without being affected by noise

COVERED WIRE COUPLING TYPE INFORMATION COMMUNICATION NETWORK, ELECTROMAGNETIC FIELD COUPLING COMMUNICATION METHOD AND ELECTROMAGNETIC FIELD COUPLER

TECHNICAL FIELD

The present invention relates to a covered wire coupling type information communication network, an electromagnetic field coupling communication method and an electromagnetic field coupler, and in particular, to a configuration for non-contact high speed data communication between modules through the use of capacitive coupling and inductive coupling by providing a coupling unit between covered wires used for a local area network (LAN) for communication between modules, for example.

BACKGROUND ART

In the case where a conventional system is constructed by combining modules, signal wires are connected through connectors between the respective modules. The present inventor has proposed an electrical non-contact signal transfer method that could substitute these connectors (see Patent Document 1 or Non-Patent Documents 1 through 3).

Meanwhile, a mechanical connection system where a covered wire of which the insulating coating has been peeled is connected to an electrode, which is made to make contact with another electrode through the spring force is used for widely available conventional connectors. In addition, a communication standard such as controller area network where noise-proofing has been enforced is used for the communication protocol in vehicular applications or the like.

Here, a coupling mechanism using a conventional mechanical connector is described in reference to FIGS. 61A through 61C. FIG. 61A is a perspective diagram illustrating the state before insertion, and FIG. 61B is a perspective diagram illustrating the state after insertion. A memory module 80 where a memory element 82 is mounted on a substrate 81 is inserted into a DIMM (dual in-line memory module) connector 90, and after that, the memory module 80 is secured with fixtures 93 provided on either side.

FIG. 61C is a cross-sectional diagram illustrating an enlargement of a structure where the memory module 80 is inserted into the DIMM connector 90 secured on a circuit substrate 100 so that connection terminals 83 provided on the memory module 80 are pinched between spring members 92 provided within a housing 91 for electrical contact.

In vehicular applications and airplane applications, high reliability is required, and thus, reliability, durability, miniaturization, a reduction in the thickness, an increase in the speed, an increase in the number of electrodes, an increase in the density and an increase in the ease of operation are required.

From among these, as for the reliability and durability, vibration proof and shock resistance are required in order to prepare for an accidental instant disconnection, and in addition, environmental durability in response to high temperatures, high humidity, a change in the temperature, and dirt and dust is also required. Furthermore, durability for mechanical insertion and removal as well as durability against electromagnetic noise in order to prepare for electrostatic discharge damage are also required.

CITATION LIST

Patent Literature

PATENT DOCUMENT 1: Japanese Patent No. 5213087

Non-Patent Literature

Non-Patent Document 1: T. Takeya, L. Nan, S. Nakano, N. Miura, H. Ishikuro, and T. Kuroda, "A 12 Gb/s Non-Contact Interface with Coupled Transmission lines", IEEE JOURNAL OF SOLID-STATE CIRCUITS, Vol. 48, No. 3, pp. 790-800, March 2013, Non-Patent Document 2: W. Yun, S. Nakano, W. Mizuhara, A. Kosuge, N. Miura, H. Ishikuro, and T. Kuroda, "A 7 Gb/s/Link Non-Contact Memory Module for Multi-Drop Bus System Using Energy-Equipartitioned Coupled Transmission Line", IEEE International Solid-State Circuits Conference (ISSCC '12), Dig. Tech. Papers, pp. 52-53, February 2012

Non-Patent Document 3: W. Mizuhara, T. Shidei, A. Kosuge, T. Takeya, N. Miura, M. Taguchi, H. Ishikuro, and T. Kuroda, "A 0.15 mm-Thick Non-Contact Connector for MIPI Using Vertical Directional Coupler" IEEE International Solid-State Circuits Conference (ISSCC '13), Dig. Tech. Papers, pp. 200-201, February 2013

SUMMARY OF THE INVENTION

Problems to be Solved by the Invention

Conventional connectors have various types of limitations, including a limitation due to the mechanical structure for spring contact and a limitation due to the structure where wires are exposed. Such a problem where a short circuit could make the entirety of the network fail can be cited as an example of a limitation due to the mechanical structure for spring contact.

FIG. 62 is a diagram illustrating a short circuit where short circuiting 119 occurs between a pair of wires 115 and 116 when three pairs of wires ((113, 114), (115, 116) and (117, 118)) are connected to buses 111 and 112. In this case, such a problem arises that the other two pairs of wires ((113, 114) and (117, 118)) are also short circuited, making the entirety of the network through the buses 111 and 112 fail.

Even when measures are taken for vibration proof and shock resistance, in some cases a force due to a great acceleration is applied to a connector in an automobile or an airplane. In the case where such a great acceleration is applied, such a problem arises that defects may be caused by instant disconnection.

As described above, wires are exposed in conventional connectors, and therefore, such a problem may also arise that the contacts of a connector become rusty due to exposure to water, causing a contact defect. A connector box where a number of connectors are integrated is generally used, and therefore, such a problem also arises that connection to a LAN cannot be achieved with the shortest wires, and thus, the weight of the wires is large. In particular, this becomes a factor of causing poor fuel efficiency in a vehicular or airplane application.

Furthermore, it is necessary to install connectors of which the number is more than necessary in advance for the preparation of a case where new connections are necessary when being used for a long period of time, which becomes a factor of hampering miniaturization or a reduction in the thickness. Moreover, such a problem also arises that an excessive current keeps flowing through a bus when two output circuits transmit a signal simultaneously (bus conflict), which could cause failure.

At the time of connection, in some cases a flexible circuit board is forced to be abruptly bent, and at the same time, a slot (for insertion) is necessary, and therefore, there is a problem such that miniaturization or a reduction in the thickness is difficult.

In addition, contact by means of a spring may cause such a problem where an impedance mismatch may be caused, which deteriorates the quality of the transmitted signal, or a problem where the signal may leak. In the case of the connection through a connector, there is also a problem that it is difficult to mount an LSI tester. In the case where the number of connections between an LSI chip and an LSI tester is very large, a considerably large force is necessary for the mechanical and simultaneous connections. Incidentally, one chip has 500 connections, and thus, when it is assumed that 500 chips are tested simultaneously, the number of connections is 250,000, which means an application of a load of several tons.

Accordingly, an object of the present invention is to solve the problem with the mechanical contact system and the structure where wires are exposed in a connector.

Means for Solving Problems (1) In order to solve the above-described problems, a covered wire coupling type information communication network is provided with: a first covered wire provided with a cylindrical inner conductor coated with an insulator; and a second covered wire provided with an inner conductor coated with an insulator, and is characterized in that the first covered wire and the second covered wire are placed in close proximity in a first coupling unit so that data connection is achieved between the first covered wire and the second covered wire through electromagnetic field coupling.

Thus, even in the case where covered wires are used, non-contact data connection is achieved by placing the first covered wire and the second covered wire in close proximity in the coupling unit without using a mechanical contact type connector, and therefore, the problems with the above-described connector due to the mechanical contact type structure with the wires being exposed can be solved.

That is to say,
1) The non-contact connection does not allow a direct current signal to transfer, which prevents a short circuit from affecting the entirety of the network.
2) The non-contact connection allows a force to be applied due to acceleration, which prevents communication failure from occurring even when the communication distance changes.
3) The coating of wires provides a waterproof structure that prevents rusting from occurring due to exposure to water.
4) Even at the time when buses conflict, a current flowing through a bus is a small current in an instant pulse form, which does not cause failure. In addition, even when a coupler is used, it is provided only on the first covered wire side, and the second covered wire is a general covered wire without a coupler, and therefore:
5) A coupling unit may be provided at an arbitrary location, and thus, connection to the nearby LAN cable covered wire is possible with a short wire.
6) A coupling unit is simply provided at an arbitrary location, and thus, connection can be added afterwards if necessary.
7) In order to achieve data connection, the second covered wire can be placed in close proximity over the insulating coating of the first covered wire that works as a bus trunk line without breaking the insulating coating, and thus, installment is easy, and the reliability and durability can be secured.

(2) In addition, the present invention according to the above (1) is characterized in that the second covered wire is wound around the first covered wire a number of times in the first coupling unit. Thus, the second covered wire is wound around the first cable covered wire covered wire a number of times so that the visual angle θ is effectively increased so as to increase the coupling efficiency, which makes miniaturization of the network easy.

(3) Furthermore, the present invention according to the above (1) is characterized in that the first covered wire and the second covered wire are placed parallel to each other in the first coupling unit. Thus, the first covered wire and the second covered wire are placed parallel to each other, which makes the task of winding one wire around the other unnecessary.

(4) Moreover, the present invention according to the above (3) is characterized in that the second covered wire has a coupling electrode where the inner conductor is not coated with the insulator in the first coupling unit, and the coupling electrode encompasses the inner conductor of the first covered wire by a visual angle of 90° or greater. Thus, a coupling electrode that is not coated with an insulator is used so that the first covered wire and the second covered wire can be placed in closer proximity, which can increase the coupling efficiency.

(5) In addition, the present invention according to the above (4) is characterized in that the coupling electrode makes direct contact with the outer periphery of the insulator that coats the first covered wire in such a manner as to cover the outer periphery of the insulator. Thus, the outer periphery of the insulator with which the first covered wire is coated is made to make contact with and is coated with the coupling electrode so that the distance between the two is made shorter, thereby increasing the coupling efficiency.

(6) Furthermore, the present invention according to the above (4) is characterized in that the coupling electrode is formed of a conductive layer provided on the inner wall of a cylindrical through hole through which the first covered wire runs in a coupler that is provided with the cylindrical through hole. Thus, a coupler with a coupling electrode is used so that the coupling task is easier, and at the same time, the coupling structure is stabilized.

(7) Moreover, the present invention according to any of the above (4) through (6) is characterized in that the coupling electrode of the second covered wire is terminated with the impedance being matched. Thus, the termination with the impedance being matched can prevent a signal from being reflected, which makes high speed communication possible.

(8) In addition, the present invention according to any of the above (4) through (6) is characterized in that the coupling electrode of the second covered wire is terminated openly. Thus, open termination makes the connection through a terminal resistor unnecessary, which makes a reduction in cost possible.

(9) Furthermore, the present invention according to any of the above (3) through (6) is characterized in that the first covered wire has a third covered wire having the same structure as the first covered wire and forming a differential pair with the first covered wire, and at the same time, the second covered wire has a fourth covered wire having the same structure as the second covered wire and forming a differential pair with the second covered wire, and the third covered wire and the fourth covered wire achieve electromagnetic field coupling in a second coupling unit that is positioned parallel to the first coupling unit. By using this configuration, problems with a connector due to the mechanical contact type structure with wires being exposed can be solved in signal communication using a differential signal.

(10) Moreover, the present invention according to the above (9) is characterized in that the coupling electrode of the second covered wire and the coupling electrode of the fourth covered wire are terminated with impedance being matched. Thus, the coupling electrode of the second covered wire and the coupling electrode of the fourth covered wire are terminated with the impedance being matched so as to prevent a signal from being reflected, which makes high speed communication possible.

(11) In addition, the present invention according to the above (10) is characterized in that the coupling electrode of the second covered wire and the coupling electrode of the fourth covered wire are terminated with impedance being matched on the same side in the direction in which the coupling electrodes are arranged in parallel. Thus, termination with the impedance being matched is achieved on the same side, which makes possible the formation of a directional coupler for allowing a signal to propagate only towards the near end coupling side.

(12) Furthermore, the present invention according to the above (10) is characterized in that the coupling electrode of the second covered wire and the coupling electrode of the fourth covered wire are terminated with impedance being matched on the opposite sides in the direction in which the coupling electrodes are arranged in parallel. Thus, termination on the opposite sides makes possible propagation of signals to the left and to the right with the same amplitude and with the same polarity.

(13) Moreover, the present invention according to any of the above (10) through (12) is characterized in that a conductor for connecting each end of a pair of coupling electrodes to each other is formed in a coupler so as to provide a terminal resistor for termination with impedance being matched, where the coupler is provided with the pair of coupling electrodes including a pair of cylindrical through holes that are parallel to each other and through which the first covered wire and the third covered wire run, respectively, and conductive layers provided on the inner walls of the pair of cylindrical through holes. By using a coupler having this structure, the time and effort for connecting a terminal resistor are unnecessary.

(14) In addition, the present invention according to any of the above (10) through (12) is characterized in that a transmitter/receiver is connected to either end of the pair of coupling electrodes so that the resistor provided in the transmitter/receiver connected on the downstream side in the direction of propagation is used as the terminal resistor. Thus, two transmitter/receivers are connected and the resistors provided in the transmitter/receivers are used as a terminal resistor, thereby making the time and effort for connecting a terminal resistor unnecessary.

(15) Furthermore, the present invention according to the above (9) is characterized in that the coupling electrode of the second covered wire and the coupling electrode of the fourth covered wire are terminated openly. Thus, the coupling electrode of the second covered wire and the coupling electrode of the fourth covered wire are terminated openly, which makes the connection of a terminal resistor unnecessary.

(16) Moreover, the present invention according to the above (15) is characterized in that the coupling electrode of the second covered wire and the coupling electrode of the fourth covered wire are terminated openly on the same side in the direction in which the coupling electrodes are arranged in parallel. Thus, open termination on the same side can allow a signal of which the intensity is half of that on the near end coupling side to propagate without a change in the polarity on the far end coupling side where the signal was discarded according to the prior art.

(17) In addition, the present invention according to the above (15) is characterized in that the coupling electrode of the second covered wire and the coupling electrode of the fourth covered wire are terminated openly on the opposite sides in the direction in which the coupling electrodes are arranged in parallel. Thus, open termination on the opposite sides can allow signals to propagate to the left and to the right with the same amplitude and with the same polarity, though the signals are slightly weaker.

(18) Furthermore, the present invention according to the above (9) is characterized in that the coupling electrode of the second covered wire and the coupling electrode of the fourth covered wire are linked without a resistor. Thus, the coupling electrode of the second covered wire and the coupling electrode of the fourth covered wire are linked for terminal connection, which prevents a signal from being reflected, thereby making high speed communication possible, and at the same time making connection of a terminal resistor unnecessary.

(19) Moreover, the present invention according to the above (18) is characterized in that the coupling electrode of the second covered wire and the coupling electrode of the fourth covered wire are linked on the same side in the direction in which the coupling electrodes are arranged in parallel. Thus, in the case of linking on the same side, the degree of coupling can be increased, and at the same time, the directionality can be weakened as compared to the case of termination with the impedance being matched on the same side.

(20) In addition, the present invention according to the above (18) is characterized in that the coupling electrode of the second covered wire and the coupling electrode of the fourth covered wire are linked on the opposite sides in the direction in which the coupling electrodes are arranged in parallel. Thus, open termination on the opposite sides can allow signals to propagate to the left and to the right with the same amplitude and with the same polarity, though the signals are weaker.

(21) Furthermore, the present invention according to any of the above (18) through (20) is characterized in that a good conductor for connecting each end of a pair of coupling electrodes to each other is formed in a coupler so as to provide a linking unit, where the coupler is provided with the pair of coupling electrodes including a pair of cylindrical through holes that are parallel to each other and through which the first covered wire and the third covered wire run, respectively, and conductive layers provided on the inner walls of the pair of cylindrical through holes. By using a coupler having this structure, the time and effort for connecting a pair of coupling electrodes are unnecessary.

(22) Moreover, the present invention according to any of the above (9) through (21) is characterized in that a differential pair including a fifth covered wire and a sixth covered wire achieves electromagnetic field coupling with a differential pair including the first covered wire and the third covered wire in a location different from the first and second coupling units. Thus, electromagnetic field coupling is achieved with a third differential pair, which thereby makes possible data connection with the differential pair made of the first covered wire that works as a bus and the third covered wire.

(23) In addition, the present invention according to any of the above (9) through (21) is characterized in that a differential pair including a fifth covered wire and a sixth covered wire achieves electromagnetic field coupling with a differential pair including the first covered wire and the third covered wire in a location that allows for electromagnetic field coupling with the first and second coupling units. Thus, electromagnetic field coupling is achieved with a third differential pair at the same location, which thereby makes possible direct data connection vis-à-vis the differential pair made of the second covered wire and the fourth covered wire.

(24) Furthermore, the present invention according to either of the above (22) or (23) is characterized by further including: a transmission means for transmitting a digital signal to a differential pair including the second covered wire and the fourth covered wire; and a decoding means for decoding the digital signal by determining the polarity of a pulse signal that is induced in a differential pair including the first covered wire and the third covered wire. Thus, at the time of data connection via the differential pair made of the first covered wire that works as a bus and the third covered wire, the output from the coupling unit in the differential pair on the transmission side becomes a pulse signal that is gained by differentiating the digital signal, and the output from the coupling unit in the differential pair on the reception side becomes a pulse signal gained by differentiating the pulse signal, that is to say, a pulse signal gained by second-order differentiating the digital signal, and therefore, the polarity of the received pulse signal can be determined using the threshold value with hysteresis so that the digital signal can be decoded.

(25) Moreover, the present invention according to either of the above (22) or (23) is characterized by further including: a transmission means for transmitting a pulse signal of which the polarity is in response to a digital signal to a differential pair including the second covered wire and the fourth covered wire; and a decoding means for decoding the digital signal by determining the polarity of a bipolar pulse signal that is induced in a differential pair including the first covered wire and the third covered wire. Thus, a pulse signal of which the polarity is in response to the digital signal may be transmitted instead of the digital signal itself, and in this case, the output on the reception side is a bipolar pulse signal, and thus, the polarity thereof may be determined for decoding on the basis of the set threshold value.

(26) In addition, the present invention according to either of the above (22) or (23) is characterized by further including: a test signal transmission means for transmitting a test signal to a differential pair that achieves electromagnetic field coupling with a differential pair including the first covered wire and the third covered wire; and a polarity adjustment means for returning to a normal polarity the polarity of a signal received by another differential pair that achieves electromagnetic field coupling with a differential pair made up of the first covered wire and the third covered wire. Thus, in the case where the directional coupling system is used, the received pulse signal has a polarity, and therefore, the directionality thereof is stored by transmitting a test signal in advance so that the polarity of the received signal can be returned to the normal polarity.

(27) Furthermore, the electromagnetic field coupling communication method according to the present invention is characterized by data connection between a first covered wire including a cylindrical inner conductor coated with an insulator and a second covered wire including an inner conductor coated with an insulator in a first coupling unit between the first covered wire and the second covered wire through electromagnetic field coupling, where the first and the second covered wires are in a proximity closer to the sum of the film thicknesses of the insulator with which the first and the second covered wires are coated in such a state that the insulators are not deformed through a pressing force. Thus, the two wires are made to be closer than usual, which makes data connection possible using electromagnetic field coupling.

(28) Moreover, the present invention according to the above (27) is characterized in that the first covered wire has a third covered wire having the same structure as the first covered wire and forming a differential pair with the first covered wire, and at the same time, the second covered wire has a fourth covered wire having the same structure as the second covered wire and forming a differential pair with the second covered wire, and data connection is achieved between the third covered wire and the fourth covered wire through electromagnetic field coupling in a second coupling unit that is positioned so as to be parallel to the first coupling unit, where the third covered wire and the fourth covered wire are in a proximity closer to the sum of the film thicknesses of the insulators with which the third and fourth covered wires are coated in a state that the insulators are not deformed through a pressing force. Thus, electromagnetic field coupling resulting from arrangement in close proximity can be used in signal communication using a differential signal so that the problems with the connector due to the mechanical contact type structure with wires being exposed can be solved.

(29) In addition, the electromagnetic field coupler according to the present invention is characterized by including: a first cylindrical through hole through which a first covered wire including a cylindrical inner conductor coated with an insulator runs; and a first coupling electrode made of a conductive layer provided on the inner wall of the first cylindrical through hole so as to be connected to an inner conductor of a second covered wire including the inner conductor coated with an insulator. Thus, a coupler for covered wires can be implemented by providing cylindrical through holes and coupling electrodes on the inner walls of the cylindrical through holes, and as a result, electromagnetic field coupling resulting from arrangement in close proximity can be implemented more easily and without requiring a high level operation.

(30) Furthermore, the present invention according to the above (29) is characterized by further including: a second cylindrical through hole through which a third covered wire having the same structure as the first covered wire and forming a differential pair with the first covered wire runs; and a second coupling electrode made of a conductive layer provided on the inner wall of the second cylindrical through hole so as to be connected to an inner conductor of a fourth covered wire having the same structure as the second covered wire and forming a differential pair with the second covered wire. Thus, a coupler for a differential signal can be implemented in signal communication using a differential signal by providing a pair of cylindrical through holes and a pair of coupling electrodes.

(31) Moreover, the present invention according to the above (30) is characterized in that one end of the first coupling electrode and one end of the second coupling electrode achieve terminal connection through a terminal resistor. Thus, the coupler is provided with a terminal resistor so that a directional coupler can be implemented without requiring the task of connecting a terminal resistor.

(32) In addition, the present invention according to the above (31) is characterized in that the terminal resistor is connected to the first coupling electrode and the second coupling electrode on the same side in the direction in which the first and second coupling electrodes run. In this configuration, a directional coupler for allowing a signal to propagate only towards the near end coupling side can be formed.

(33) Furthermore, the present invention according to the above (31) is characterized in that the terminal resistor is connected to the first coupling electrode and the second coupling electrode on the opposite sides in the direction in which the first and second coupling electrodes run. In this configuration, a coupler for allowing signals to propagate to the left and to the right with the same amplitude and with the same polarity can be formed.

(34) Moreover, the present invention according to the above (33) is characterized in that the first coupling electrode is provided inside the first cylindrical through hole on one side in the direction in which the first cylindrical through hole runs, and the second coupling electrode is provided inside the second cylindrical through hole on the side that is further away from the first coupling electrode. In this configuration, connection wires for connecting the terminal resistor to the first and second coupling electrodes become unnecessary, which prevents electromagnetic interference from occurring between the connection wires and the first and second coupling electrodes.

(35) In addition, the present invention according to the above (30) is characterized in that one end of the first coupling electrode and one end of the second coupling electrode are linked through a good conductor. Thus, the coupler itself is provided with a good conductor, which makes connection between the first coupling electrode and the second coupling electrode possible without having a resistor in between, and as a result, the coupling efficiency can be increased.

(36) Furthermore, the present invention according to the above (35) is characterized in that the good conductor is connected to the first coupling electrode and the second coupling electrode on the same side in the direction in which the first and the second coupling electrodes run. In this configuration, it is possible to allow a signal to propagate towards the far end coupling side as well with the directionality being weakened.

(37) In addition, the present invention according to the above (35) is characterized in that the good conductor is connected to the first coupling electrode and the second coupling electrode on the opposite sides in the direction in which the first and second coupling electrodes run. In this configuration, signals can be propagated to the left and to the right with the same amplitude and the same polarity, though the signals are weaker.

(38) Furthermore, the present invention according to the above (37) is characterized in that the first coupling electrode is provided inside the first cylindrical through hole on one side in the direction in which the first cylindrical through hole runs, and the second coupling electrode is provided inside the second cylindrical through hole on the side that is further away from the first coupling electrode. In this configuration, electromagnetic interference between the good conductor and the first and second coupling electrodes can be reduced.

(39) Moreover, the present invention according to the above (30) is characterized in that one end of the first coupling electrode and one end of the second coupling electrode are terminated openly. Thus, the open termination can allow a signal to propagate towards the far end coupling side without inverting the polarity.

(40) In addition, the present invention according to the above (39) is characterized in that the connection point between the first coupling electrode and the inner conductor of the second covered wire and the connection point between the second coupling electrode and the inner conductor of the fourth covered wire are on the same side in the direction in which the first coupling electrode and the second coupling electrode run. In this configuration, the directionality of the signals that propagate towards the open terminal side and towards the opposite side can be increased.

(41) Furthermore, the present invention according to the above (39) is characterized in that the connection point between the first coupling electrode and the inner conductor of the second covered wire and the connection point between the second coupling electrode and the inner conductor of the fourth covered wire are on the opposite sides in the direction in which the first coupling electrode and the second coupling electrode run. In this configuration, signals can be propagated to the left and to the right with the same amplitude and the same polarity.

Advantageous Effects of the Invention

In accordance with the disclosed covered wire coupling type information communication network, electromagnetic field coupling communication method and electromagnetic field coupler, it becomes possible to solve the problems with the mechanical contact system and the structure where wires are exposed in a connector using the electromagnetic field coupling system.

BRIEF DESCRIPTION OF DRAWINGS

FIGS. 5A through 5D are diagrams illustrating a coupler;

FIGS. 6A and 6B are diagrams illustrating the covered wire coupling type information communication network according to Example 1 of the present invention;

FIGS. 35A through 35E are a diagram and graphs illustrating a concrete operational principle (1);

FIGS. 46A through 46D are graphs illustrating a concrete operational principle (2);

FIG. 47 is a graph illustrating the frequency characteristics of a coupler used in Example 11 of the present invention;

DESCRIPTION OF EMBODIMENTS

Figure 1A:
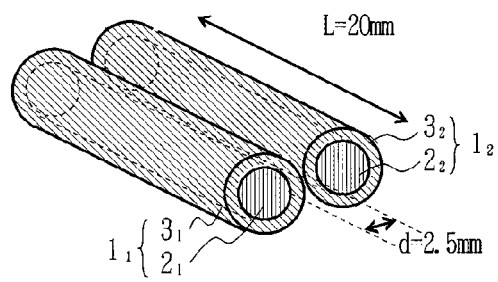
FIGS. 1A through 1C are diagrams illustrating a coupling unit in the covered wire coupling type information communication network and the electromagnetic field coupling communication method according to an embodiment of the present invention.
Figure 1B:
Figure 1C:
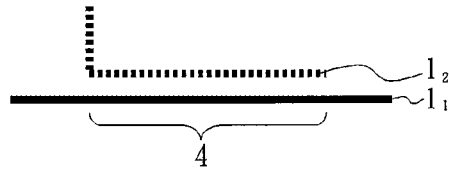

Here, the covered wire coupling type information communication network and the electromagnetic field coupling communication method according to an embodiment of the present invention are described in reference to FIGS. 1A to 5B. FIGS. 1A through 1C are a perspective diagram, a cross-sectional diagram and symbolic diagram illustrating a coupling portion in the covered wire coupling type information communication network and the electromagnetic field coupling communication method according to the embodiment of the present invention. As illustrated in the figures, a first covered wire $1_1$ having a core conductor $2_1$ coated with an insulator $3_1$ and a second covered wire $1_2$ having a core conductor $2_2$ coated with an insulator $3_2$ are arranged in close proximity in a coupling unit 4. A signal propagating through one wire allows a signal to propagate through the other wire, which achieves electromagnetic field coupling in the coupling unit 4, and thus, data connection is achieved. In this case, the core conductors $2_1$ and $2_2$ may be any good conductor, and typically, Cu is used. In addition, polyethylene may be used for the insulators $3_1$ and $3_2$, which may be additionally protected with a coating of vinyl or the like.

Figure 2:
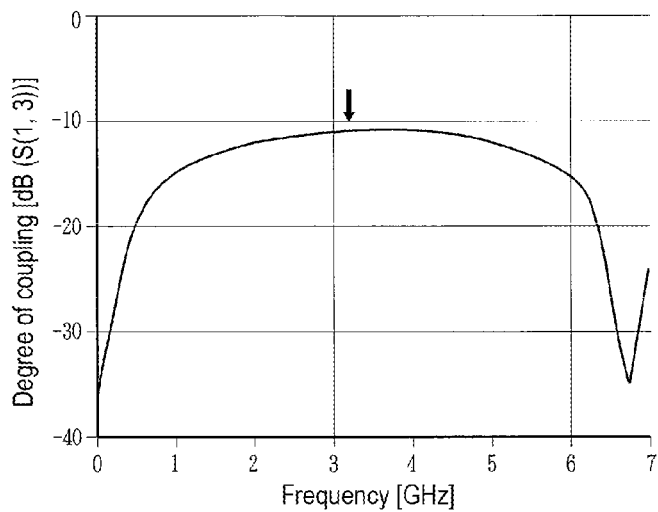
FIG. 2 is a graph illustrating the dependency of the degree of coupling on the frequency in an electromagnetic field coupling communication method using covered wires.

FIG. 2 is a graph illustrating the dependency of the degree of coupling on the frequency in the electromagnetic field coupling communication method using covered wires, where the length of the coupling unit is set to 20 mm and the distance between the outer periphery of the core conductors is set to 2.5 mm for simulation. As illustrated in the diagram, the degree of coupling is −12 dB when in close proximity to 3 GHz, which means a signal of which the intensity is ¼ of the signal propagating the first covered wire propagates through the second covered wire as a result of electromagnetic field coupling. This result was unexpected even for the present inventor, and thus, such knowledge has been acquired from the resulting signal with ¼ the intensity being propagated that data connection is possible by using electromagnetic field coupling even in the case of covered wires. In addition, flat characteristics are exhibited in a relatively broad band of 1 GHz to 6 GHz, and therefore, electromagnetic field coupling with a broad frequency band becomes possible.

In addition, the degree of coupling increases when the distance between the outer peripheries of the center conductors $1_1$ and $1_2$ is shorter than 2.5 mm, which increases the quality of communication and reliability, and therefore, it is desirable to shorten the distance by applying a pressing force using tape or a caulking member. Meanwhile, the degree of coupling lowers when the distance is longer than 2.5 mm; however, communication is possible without any problems even when the distance varies within a range of the degree of coupling that is required for communication.

In the coupling unit 4, an insulator portion may be stripped from one covered wire so that a bare wire is used as a coupling electrode. This coupling electrode may be in a plate form or a cylindrical form that misses part of the circumference. It is desirable for this coupling electrode to encompass the inner conductor of the other covered wire at a visual angle of 90° or greater.

Figure 3A:
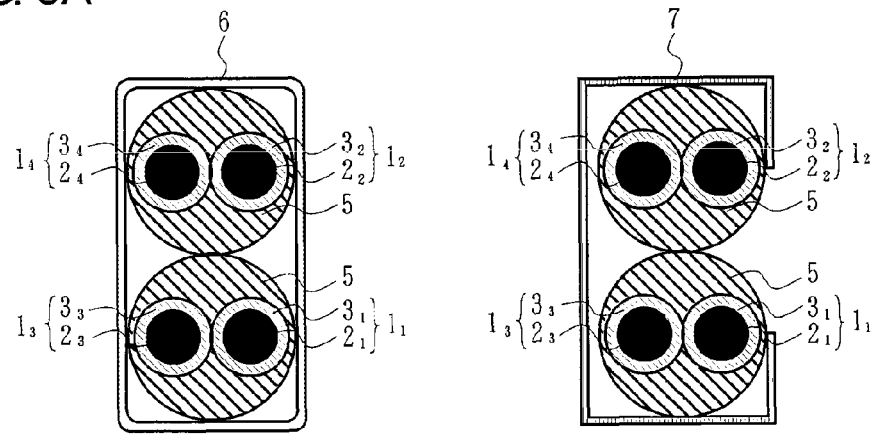
FIGS. 3A and 3B are diagrams illustrating a case of an application to a differential communication system.
Figure 3B:
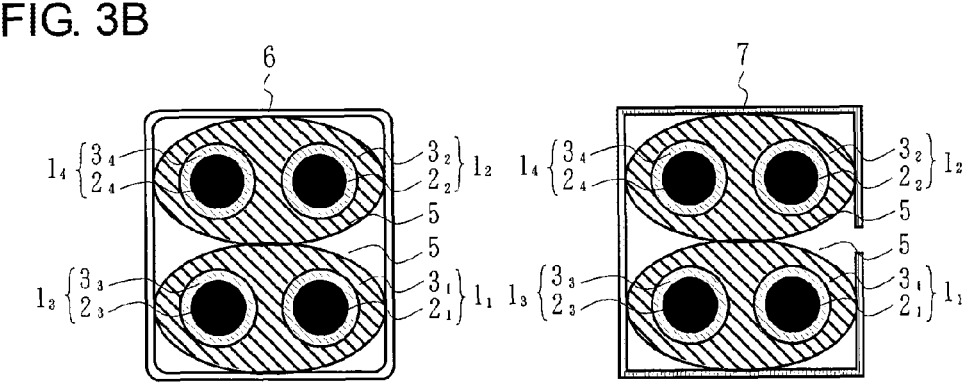

FIGS. 3A and 3B are diagrams illustrating a case of an application to a differential communication system. FIG. 3A is a schematic cross-sectional diagram illustrating a general case of an arrangement in close proximity, and FIG. 3B is a cross-sectional diagram illustrating a case where the distance between the core conductors is shortened using a clamping means. Here, examples where the core conductors are made to come closer by bounding with tape 6 and where a caulking member 7 is used are illustrated. In these cases, a differential signal flows through a differential pair of the first covered wire $1_1$ and the third covered wire $1_3$, a differential signal flows through a differential pair of the second covered wire $1_2$ and the fourth covered wire $1_4$, the first covered wire $1_1$ and the second covered wire $1_2$ achieve electromagnetic field coupling, and the third covered wire $1_3$ and the fourth covered wire $1_4$ achieve electromagnetic field coupling. Here, the symbol 5 in the figures is a coating insulating film.

Figure 4:
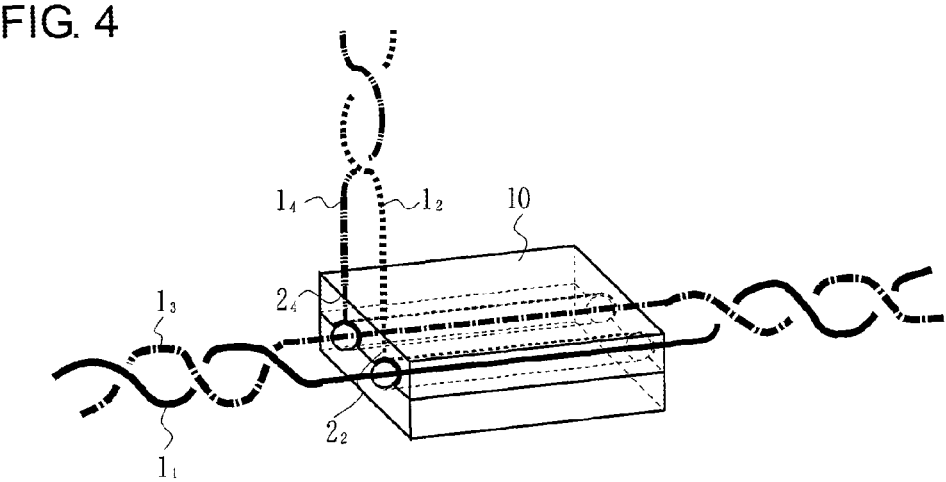
FIG. 4 is a diagram illustrating a case of an application to a differential communication system using a coupler.

FIG. 4 is a diagram illustrating a case of an application to a differential communication system using a coupler, where a differential pair of the first covered wire $1_1$ and the third covered wire $1_3$ and a differential pair of the second covered wire $1_2$ and the fourth covered wire $1_4$ achieve electromagnetic field coupling using a coupler 10.

FIGS. 5A through 5D are diagrams illustrating the coupler. FIG. 5A is a schematic perspective diagram illustrating the coupler, and FIG. 5B is a cross-sectional diagram illustrating the same. The coupler 10 is provided with a bottom plate member 11 in which a pair of semi-cylindrical trenches $12_1$ and $12_2$ are created, an upper lid member 13 in which semi-cylindrical trenches $14_1$ and $14_2$ are created, and coupling electrodes $15_1$ and $15_2$ provided in the semi-cylindrical trenches $14_1$ and $14_2$. Here, the surface of the coupling electrodes $15_1$ and $15_2$ may be coated with a thin insulating film in order to prevent the coupling electrodes $15_1$ and $15_2$ from being exposed.

The bottom plate member 11 and the upper lid member 13 are rotated around a hinge 17 so as to be layered on top of each other, and thus, cylindrical through holes $16_1$ and $16_2$ through which the first covered wire $1_1$ and the third covered wire $1_3$ run are created. Here, the bottom plate member 11 and the upper lid member 13 are fixed to each other using a clip or an engagement mechanism.

Alternatively, the bottom plate member 11 and the upper lid member 13 may be placed on top of each other so as to be connected with screws without the hinge 17 being provided. In this case, an insulator sheet is placed between the bottom plate member 11 and the upper lid member 13 so that the distance d between the wires $1_1$, $1_3$ and the coupling electrodes $15_1$, $15_2$ can be adjusted, and the degree of coupling can be set to an arbitrary value.

The second covered wire $1_2$ (core conductor $2_2$) and the fourth covered wire $1_4$ (core conductor $2_4$) are connected to one end of the coupling electrode $15_1$ and one end of the coupling electrode $15_2$, respectively. In this case, the other end of the coupling electrode $15_1$ and the other end of the coupling electrode $15_2$ may be terminated through a terminal resistor with the impedance being matched, may be terminated openly, or may be linked to each other without a resistor. In this case, the side where the second covered wire $1_2$ and the fourth covered wire $1_4$ are connected may be the ends of the coupling electrodes $15_1$ and $15_2$ on the same side, or the wires may be connected to the ends on the opposite sides.

As for the terminal resistor in the case of termination with the impedance being matched, a resistor of 100Ω (=50Ω+ 50Ω) may be externally attached or a resistor film of 100Ω may be formed in advance at one end of the flat surface on the upper lid member 13 between the semi-cylindrical trenches $14_1$ and $14_2$. Alternatively, a transmitter/receiver for transmission is connected on the input side of the coupling electrodes $15_1$ and $15_2$, and a transmitter/receiver for termination may be connected on the output side of the coupling electrodes $15_1$ and $15_2$ so that the resistor provided in the transmitter/receiver for termination can be used as a terminal resistor. In the case of terminal connection without a resistor in between, a good conductor film may be provided in advance at one end of the flat surface on the upper lid member 13 between the semi-cylindrical trenches $14_1$ and $14_2$. In particular, it is desirable to use a good conductor having the same characteristic impedance as the conductor of the coupling unit.

FIGS. 5C and 5D are cross-sectional diagrams illustrating a modification where the locations of the coupling electrodes are changed. In the case of FIG. 5C, side housings $19_1$ and $19_2$ are provided on either side of the center housing 18, and coupling electrodes $15_3$ and $15_4$ are provided on the inner surface of the trenches provided on the center housing 18 side. These side housings $19_1$ and $19_2$ can be rotated around the hinges 17 so as to create cylindrical through holes $16_3$ and $16_4$. Here, the center housing 18 and the side housings $19_1$ and $19_2$ are fixed to each other using clips or an engagement mechanism.

In the case of FIG. 5D, side housings $19_1$ and $19_2$ are provided on either side of the center housing 18, and coupling electrodes $15_5$ and $15_6$ are provided on the inner surface of trenches provided on the side housing $19_1$ and $19_2$ sides. These side housings $19_1$ and $19_2$ are rotated around the hinges 17 so as to create cylindrical through holes $16_5$ and $16_6$. In this case as well, the center housing 18 and the side housings $19_1$ and $19_2$ are fixed to each other using clips or an engagement mechanism.

In addition, the differential pair of the first covered wire $1_1$ and the third covered wire $1_3$ may be used as a bus so that a number of differential pairs can achieve electromagnetic field coupling in the coupling units at the same location or in the coupling units at different locations. In this configuration, the same data can be sent to a number of differential pairs at the same time.

In the covered wire coupling type information communication network and the electromagnetic field coupling method according to the embodiment of the present invention, the following working effects are gained in data communication using covered wires.
1) The non-contact connection does not allow a direct current signal to flow, and thus, a short circuit does not affect the entirety of the network.
2) The non-contact connection allows a force to be applied due to acceleration, and thus, communication failure does not occur even when the communication distance changes.
3) The coating of the covered wires provides a waterproof structure that prevents rusting from occurring due to exposure to water.
4) Even at the time when buses conflict, a current flowing through a bus is a small current in an instant pulse, which does not cause failure.

In addition, even when a coupler is used, it is provided only on the first covered wire side, and the second covered wire is a general covered wire without a coupler, and therefore:
5) A coupling unit may be provided at an arbitrary location, and thus, connection to the nearby LAN cable is possible with a short wire.
6) A coupling unit is simply provided at an arbitrary location, and thus, connection can be added afterwards if necessary.
7) In order to achieve data connection, the second covered wire can be placed in close proximity over the insulating coating of the first covered wire that works as a bus trunk line without breaking the insulating coating, and thus, installment is easy, and the reliability and durability can be secured.

In Patent Document 1, couplers are provided on either side of the first signal line and the second signal line and are coated with the same insulator as that of the signal lines. The signal lines and the couplers are parallel plates of which the characteristic impedance is normalized. In addition, the communication distance is approximately 1 mm. Meanwhile, in the present invention, a coupler is provided for only one signal line and is not coated with the same insulator as that of the conductor. The conductor is cylindrical and is surrounded by the coupler, thus providing a simple structure. As a result, connection can be easily added at an arbitrary location. Furthermore, the characteristic impedance is not normalized (except examples where the coupler is terminated), and the communication distance can be in a range from 2.5 mm to 7.5 mm as described below due to a great thickness of the coating surrounding the cylindrical core conductor, and thus, a great improvement can be achieved in terms of the communication distance.

EXAMPLE 1

Next, the covered wire coupling type information communication network according to Example 1 of the present invention is described in reference to FIGS. 6A and 6B, and only the configuration of the coupling unit is described. FIGS. 6A and 6B are diagrams illustrating a coupling unit in the covered wire coupling type information communication network according to Example 1 of the present invention. FIG. 6A is a cross-sectional diagram illustrating a normal state, and FIG. 6B is a cross-sectional diagram illustrating a case where the distance between the core conductors is shortened using a clamping means. Covered wires $21_1$ and $21_2$ of which the core conductors $22_1$ and $22_2$ are coated with insulators $23_1$ and $23_2$ made of polyethylene, and after that further coated with protective coating films $24_1$ and $24_2$ made of vinyl are made to make contact with each other, and then fixed with a tape 25 or a caulking fixture 26, and thus, the coupling unit is formed.

As illustrated on the left side of the figures, the distance between the core conductor $22_1$ and the core conductor $22_2$ is shortened so as to increase the degree of coupling by tightly winding the tape 25 or through thermal contraction of the tape 25. Alternatively, as illustrated on the right side of the figures, the distance between the core conductor $22_1$ and the core conductor $22_2$ is shortened so as to increase the degree of coupling as a result of compression from the caulking fixture 26 being caulked.

According to Example 1 of the present invention, the covered wires 21₁ and 21₂ are arranged in close proximity so as to provide a coupling unit, and electromagnetic field coupling achieved in the coupling unit makes non-contact data connection possible without using a connector that requires mechanical contact. In particular, the use of the tape 25 or the caulking fixture 26 makes it possible to make the two closer so as to increase the degree of coupling.

In this case, the coupling unit is provided at an arbitrary location of the covered wires 21₁ and 21₂, which makes connection to a nearby LAN cable possible using a short wire. As for the degree of coupling, as illustrated in FIG. 2, it is possible to achieve the degree of coupling of approximately −12 dB.

EXAMPLE 2

Figure 7:
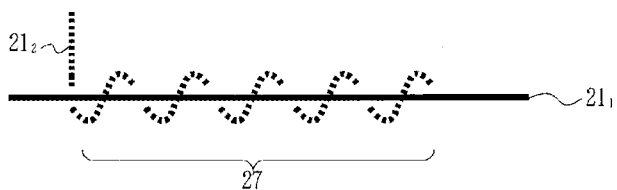
FIG. 7 is a side diagram illustrating a coupling unit of the covered wire coupling type information communication network according to Example 2 of the present invention.

Next, the covered wire coupling type information communication network according to Example 2 of the present invention is described in reference to FIG. 7, and only the coupling unit is described as well. FIG. 7 is a side diagram illustrating the coupling unit of the covered wire coupling type information communication network according to Example 2 of the present invention. A covered wire 21₁ of which the core conductor 22₁ is coated with an insulator 23₁ made of polyethylene, and after that coated with a protective coating film 24₁ made of vinyl is wound a number of times around a covered wire 21₁ of which the core conductor 22₁ is coated with an insulator 23₁ made of polyethylene, and after that coated with a protective coating film 24₁ made of vinyl, and thus, the coupling unit 27 is formed.

Thus, the covered wire 21₂ is wound around the covered wire 21₁ so that the visual angle θ can be increased in the coupling unit, and therefore, the degree of coupling can be increased.

EXAMPLE 3

Figure 8A:
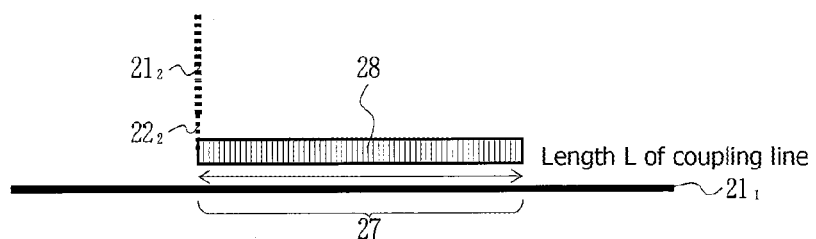
FIGS. 8A through 8D are diagrams illustrating a coupling unit of the covered wire coupling type information communication network according to Example 3 of the present invention.
Figure 8B:
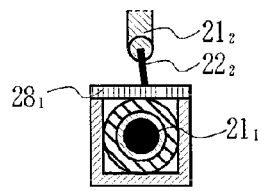
Figure 8C:
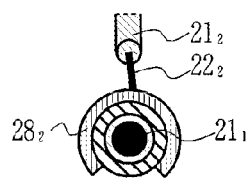
Figure 8D:
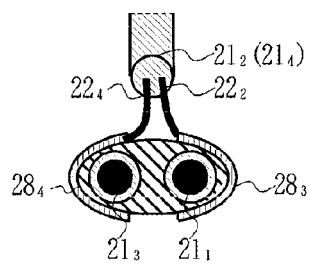
Figure 9:
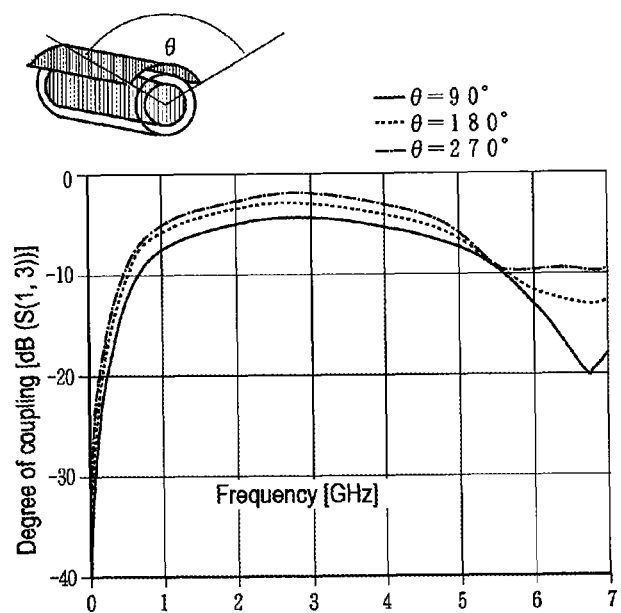
FIG. 9 is a diagram and a graph illustrating the results of simulation.

Next, the covered wire coupling type information communication network according to Example 3 of the present invention is described in reference to FIGS. 8A through 9, and only the coupling unit is described as well. FIGS. 8A through 8D are diagrams illustrating the coupling unit of the covered wire coupling type information communication network according to Example 3 of the present invention. FIG. 8A is a schematic side diagram, and FIGS. 8B through 8D are cross-sectional diagrams illustrating a portion in the contact state. As illustrated in FIG. 8A, the core conductor 22₂ of the covered wire 21₂ is connected to the coupling electrode 28 in the coupling unit 27 of which the coupling line has a length L so that the coupling electrode 28 and the core conductor 22₁ of the covered wire 21₁ can achieve electromagnetic field coupling.

The coupling electrode 28 may be a coupling electrode 28₁ in plate form as illustrated in FIG. 8B or may be a cylindrical coupling electrode 28₂ where the circumference is partially cut as illustrated in FIG. 8C. In the case of a differential type covered wire, as illustrated in FIG. 8D, one half of the periphery of the covered wire may be coated with the coupling electrode 28₃ for coupling one covered wire 21₃ to the covered wire 21₁, and the other half may be coated with the coupling electrode 28₄ for coupling the other covered wire 21₄ to the covered wire 21₂.

In this coupling system using the coupling electrode 28, the longer the length L of the coupling line is, the narrower the band is but the greater the degree of coupling for a low frequency is, and therefore, the coupling system is appropriate for low speed communication such as for automobiles. Meanwhile, the shorter the length L of the coupling line is, the weaker the degree of coupling for a low frequency is but the broader the band is, and therefore, the coupling system is appropriate for high speed communication.

FIG. 9 is a diagram and a graph illustrating the results of simulation for the cases where the visual angle θ was 90°, 180° and 270° in the type of coupling electrode in FIG. 8C. As is clear from the figures, the greater the visual angle θ is, the higher the degree of coupling is; however, there is not much of a difference, and therefore, approximately 90° is sufficient. Incidentally, the degree of coupling in the vicinity of 3 GHz where the maximum value is gained is approximately −4.5 dB in the case of θ=90°, approximately −3 dB in the case of θ=180°, and approximately −2 dB in the case of θ=270°.

EXAMPLE 4

Figure 10A:
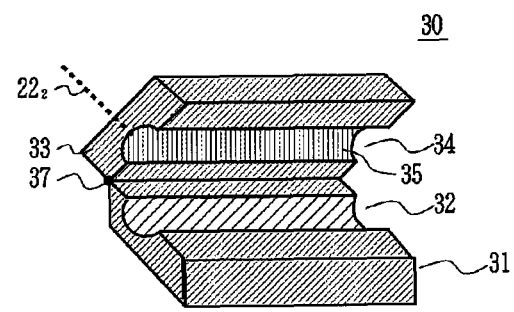
FIGS. 10A and 10B are diagrams illustrating a coupling unit of the covered wire coupling type information communication network according to Example 4 of the present invention.

Next, the covered wire coupling type information communication network according to Example 4 of the present invention is described in reference to FIGS. 10A through 13, and only the coupling unit is described as well. FIGS. 10A and 10B are diagrams illustrating the coupling unit of the covered wire coupling type information communication network according to Example 4 of the present invention where a coupler is used. FIG. 10A is a diagram illustrating the coupler, and FIG. 10B is a diagram illustrating the same in the coupled state.

Figure 10B:
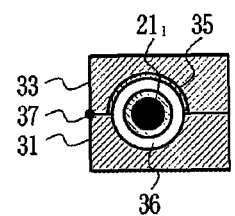

As illustrated in FIG. 10A, a coupler 30 is provided with a bottom plate member 31 in which a semi-cylindrical trench 32 is created and an upper lid member 33 in which a semi-cylindrical trench 34 having a coupling electrode 35 on the inner surface is created. As illustrated in FIG. 10B, the bottom plate member 31 and the upper lid member 33 are rotated around the hinge 37 so as to be placed on top of each other, thereby creating a cylindrical through hole 36 through which a covered wire 21₁ runs. In addition, the core conductor 22₂ of the covered wire 21₂ is connected to the coupling electrode 35.

Figure 11:
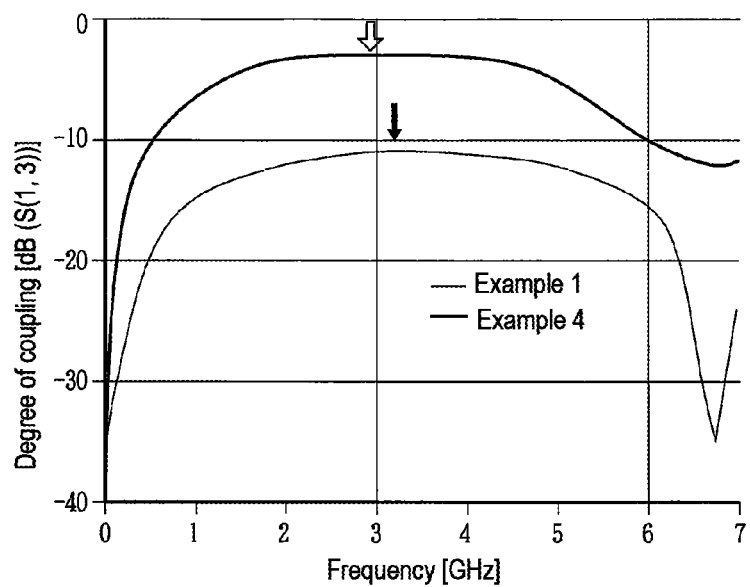
FIG. 11 is a graph illustrating the degree of coupling.

FIG. 11 is a graph illustrating the degree of coupling of a case where the distance d between the core conductor 21₁ and the coupling electrode 35 is 2.5 mm and the length L of the coupling line is 20 mm. The degree of coupling in the vicinity of 3 GHz was −2.584 dB. The degree of coupling in Example 1 is also illustrated for comparison, and it can be seen that the degree of coupling is greatly increased.

Figure 12:
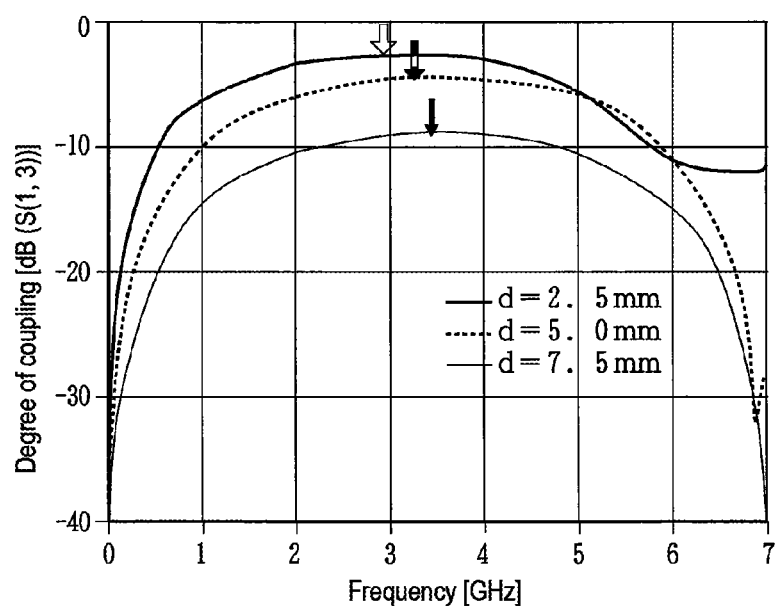
FIG. 12 is a graph illustrating the dependency of the degree of coupling on the distance d.

FIG. 12 is a diagram illustrating the dependency of the degree of coupling on the distance d for cases where the visual angle θ is 180°, the length L of the coupling line is 20 mm, and the distance d is 2.5 mm, 5 mm and 7.5 mm. As illustrated in the figure, the shorter the distance d is, the higher the degree of coupling is, and even in the case of d=7.5 mm, the degree of coupling of approximately −9 dB can be gained. Incidentally, the peak value of the degree of coupling is −2.584 dB@2.875 GHz in the case of d=2.5 mm, −5.051 dB@3.364 GHz in the case of d=5 mm, and −8.980 dB@3.500 GHz in the case of d=7.5 mm.

Figure 13:
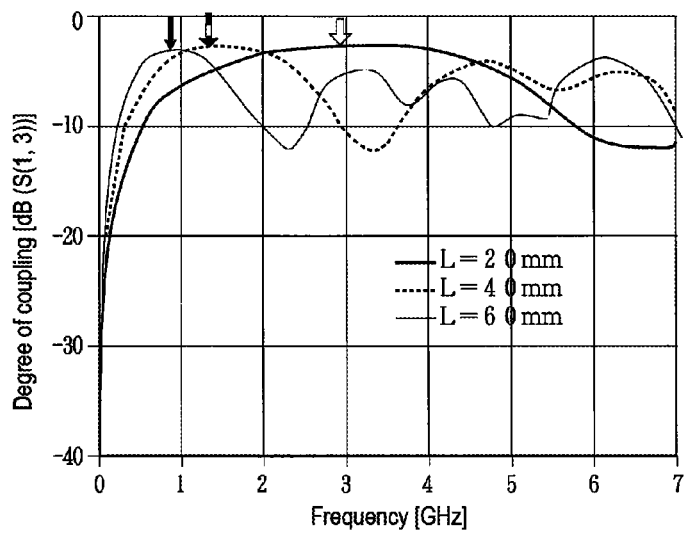
FIG. 13 is a graph illustrating the dependency of the degree of coupling on the length L of the coupling lines.

FIG. 13 is a graph illustrating the dependency of the degree of coupling on the length L of the coupling line for cases where the visual angle θ is 180°, the distance d is 2.5 mm, and the length L of the coupling line is 20 mm, 40 mm and 60 mm. As illustrated in the figure, the degree of coupling is approximately the same; however, the longer the length L of the coupling line is, the narrower the band is, and the greater the degree of coupling for a low frequency is. Incidentally, the peak value of the degree of coupling is −2.584 dB@2.875 GHz in the case of L=20 mm, −5.557 dB@1.432 GHz in the case of L=40 mm, and −2.558 dB@0.924 GHz in the case of L=60 mm.

Thus, the use of a coupler makes it possible to easily achieve electromagnetic field coupling where a predetermined visual angle θ, the distance d and the length L of the coupling line are constant.

EXAMPLE 5

Figure 14A:
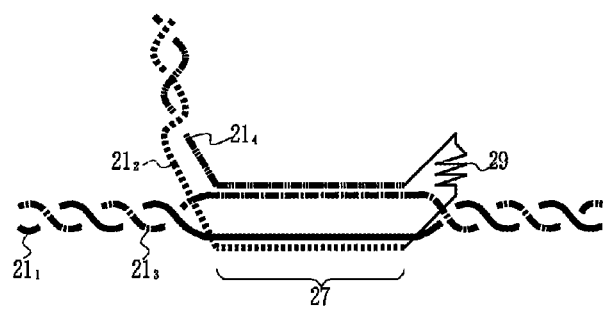
FIGS. 14A through 14C are diagrams illustrating a coupling unit of the differential type covered wire coupling type information communication network according to Example 5 of the present invention.

Next, the differential type covered wire coupling type information communication network according to Example 5 of the present invention is described in reference to FIGS. 14A through 21, and only the coupling unit is described as well. FIGS. 14A through 14C are diagrams illustrating the coupling unit of the differential type covered wire coupling type information communication network according to Example 5 of the present invention. FIG. 14A is a schematic diagram illustrating the configuration, and FIGS. 14B and 14C are symbolic diagrams illustrating the propagation state of a signal. As illustrated in FIG. 14A, in the case where an electromagnetic coupling system is applied to differential type covered wires, entangled covered wires $21_1$ and $21_3$ are partially put in a parallel state so as to form a coupling unit 27 where electromagnetic field coupling is achieved with other differential type covered wires $21_2$ and $21_4$. At this time, the covered wires $21_2$ and $21_4$ are terminated on the output end side with the impedance being matched using a terminal resistor 29 of loon.

Figure 14B:
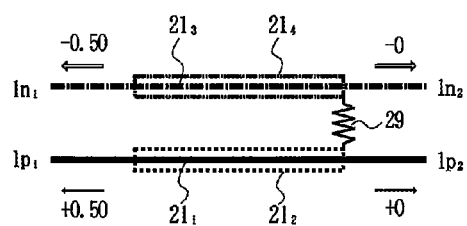
Figure 14C:
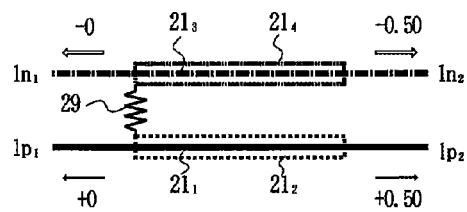

As illustrated in FIG. 14B, ideally, one half of a positive signal that has entered through the covered wire $21_2$ propagates through the covered wire $21_1$ towards the left side in the figure due to the electromagnetic field coupling, and the other half propagates through the covered wire $21_2$ towards the right side, where the signal that has propagated towards the right side is consumed as heat in the terminal resistor 29. Accordingly, the signal propagates in the $1p_1$ direction and does not propagate in the $1p_2$ direction when propagating through the covered wire $21_1$. A negative signal that has entered through the covered wire $21_4$ propagates in the same manner as the positive signal only with the polarity being inverted. Accordingly, signals propagate only in the direction towards the left through the covered wires $21_1$ and $21_3$ that make a differential pair, which provides complete directional coupling. Here, it is assumed for calculation that the near end coupling is 0.5 and the far end coupling is 0 for the purpose of simplifying calculation. In FIG. 14C, the input side and the terminal side are opposite to each other as in FIG. 14B, and signals propagate only in the direction towards the right through the covered wires $21_1$ and $21_3$ that make a differential pair.

Figure 15A:
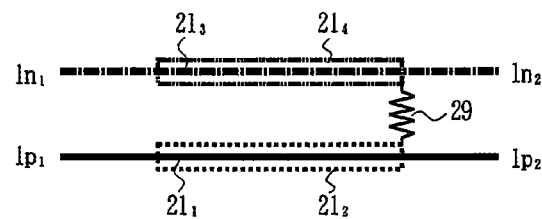
FIGS. 15A through 15E are a diagram and graphs illustrating a concrete operational principle (1)
Figure 15B:
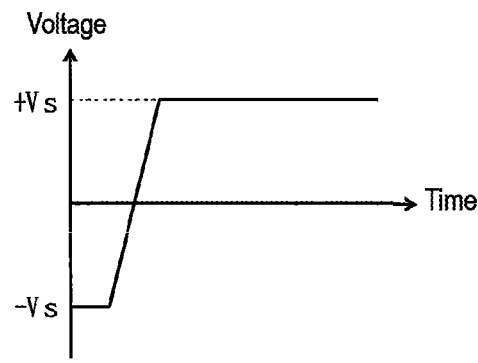
Figure 15C:
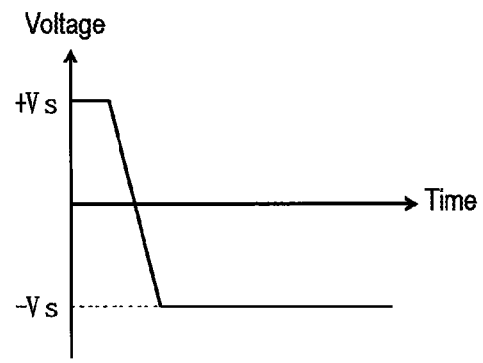

FIGS. 15A through 16D are a diagram and graphs illustrating a concrete operational principle. First, a case where termination is carried out with the impedance being matched at the right end of the coupling unit as illustrated in FIG. 15A is described. FIG. 15B is a graph illustrating a waveform of an example of a positive signal that propagates through the covered wire $21_2$, and FIG. 15C is a graph illustrating a waveform of an example of a negative signal that propagates through the covered wire $21_4$. When a positive signal from the covered wire $21_2$ propagates from the left end towards the right end of the coupling unit, mutual capacitance C and mutual impedance M sequentially exist between the covered wire $21_2$ and the covered wire $21_1$ in the coupling unit, and therefore, a capacitive coupling current and an inductive coupling current are induced in and flow through the covered wire $21_1$ as a result of the coupling effects of i=C(dv/dt) and v=L(di/dt). An electromagnetic field coupling wave of which the waveform is illustrated in FIG. 15D appears at the left end, and an electromagnetic field coupling wave in FIG. 15E appears at the right end.

At this time, as the details are described in Patent Document 1, a capacitive coupling current and an inductive coupling current are induced and propagate in such a manner that half of the capacitive coupling current returns to the near end while the other half proceeds to the far end, and either current generates a positive voltage signal in the terminal resistor that is at the destination to which the current flows. Meanwhile, the inductive coupling current flows in the direction opposite to that of the current loop of the input signal in such a manner that a positive voltage signal is generated at the near end and a negative voltage signal is generated at the far end. As a result, the signal that is induced at the near end is that illustrated in FIG. 15D, and the signal that is induced at the far end is that illustrated in FIG. 15E. In the case where the degree of coupling is as strong as approximately −6 dB, typically, the capacitive coupling current and the inductive coupling current are equal, and the two signals offset each other at the far end, which results in the signal induced at the far end as illustrated in FIG. 15E being very small.

Figure 16A:
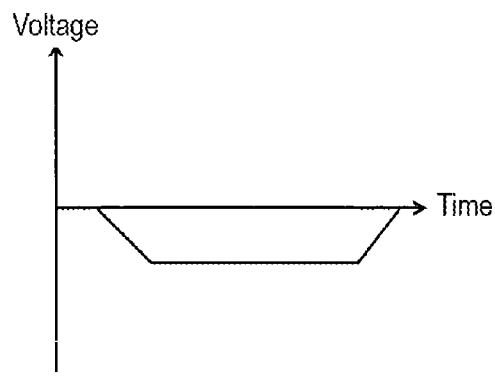
FIGS. 16A through 16D are graphs illustrating a concrete operational principle (2)
Figure 16B:
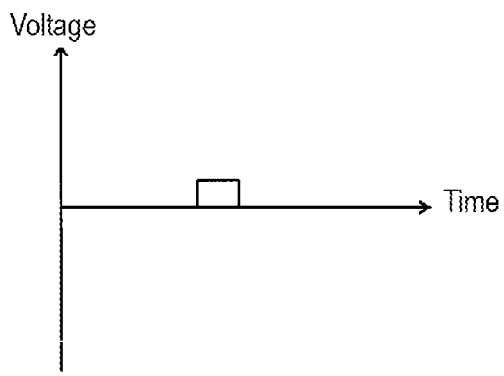

Meanwhile, as for negative signals, when a negative signal from the covered wire $21_4$ propagates from the left end of the coupling unit towards the right end, an electromagnetic field coupling wave in such a waveform as in FIG. 16A appears at the left end of the covered wire $21_3$. In addition, an electromagnetic field coupling wave as in FIG. 16B appears at the right end.

Figure 15D:
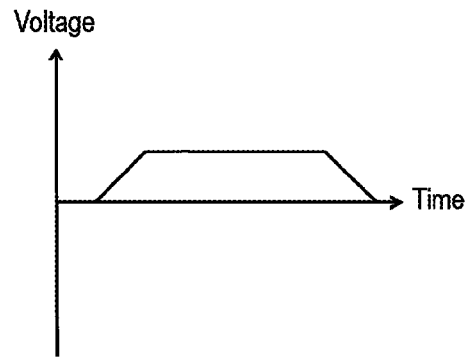
Figure 15E:
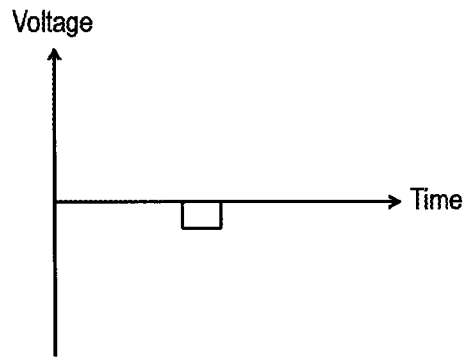
Figure 16C:
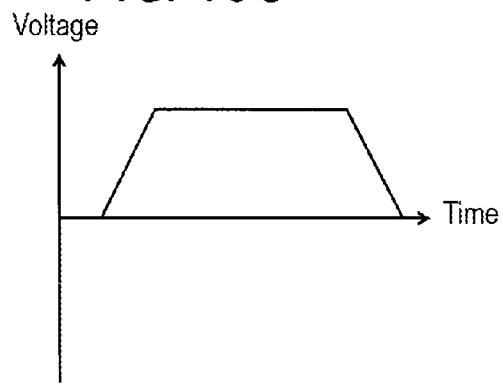
Figure 16D:
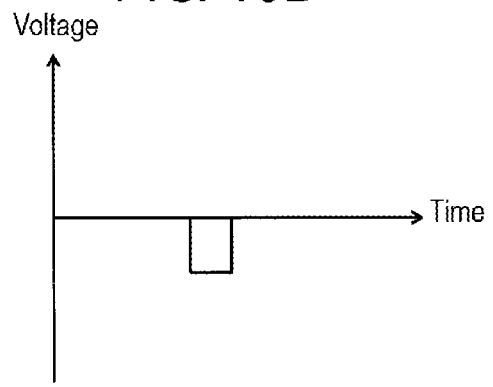

Accordingly, as for differential signals, as illustrated in FIG. 16C, a waveform where a waveform that is gained by inverting the waveform in FIG. 16A and the waveform in FIG. 15D are superposed propagates at the left end. Meanwhile, as illustrated in FIG. 16D, a waveform where a waveform that is gained by inverting the waveform in FIG. 16B and the waveform in FIG. 15E are superposed propagates at the right end.

Figure 17A:
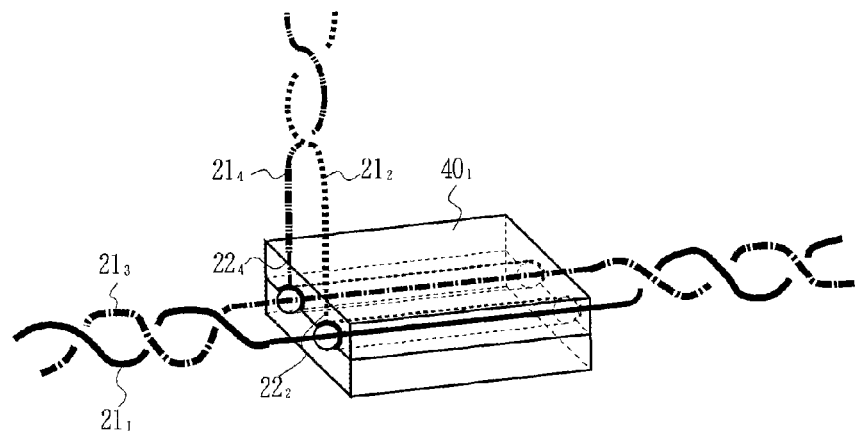
FIGS. 17A through 17D are diagrams illustrating a coupling unit of the differential type covered wire coupling type information communication network according to Example 5 in the case where a coupler is used.
Figure 17B:
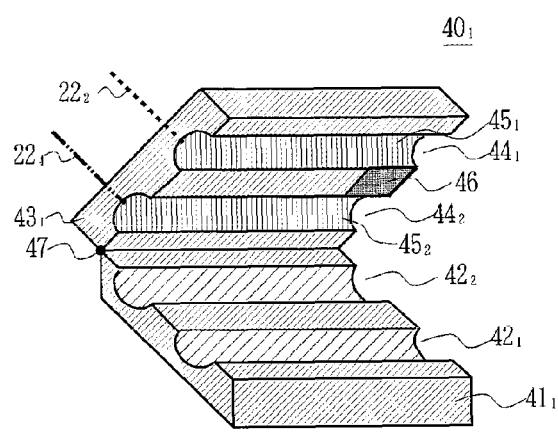
Figure 17C:
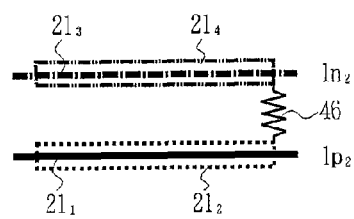
Figure 17D:
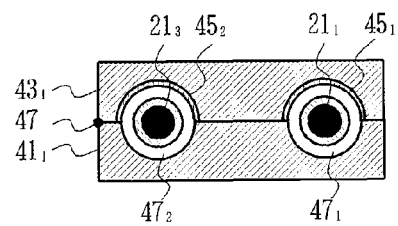

FIGS. 17A through 17D are diagrams illustrating the coupling unit of the differential type covered wire coupling type information communication network according to Example 5 in the case where a coupler is used. FIG. 17A is a schematic diagram illustrating the configuration, FIG. 17B is a perspective diagram illustrating a coupler, FIG. 17C is a symbolic diagram illustrating the coupler, and FIG. 17D is a cross-sectional diagram illustrating the coupler. As illustrated in FIG. 17A, the coupling unit is provided with a coupler $40_1$ for electromagnetic field coupling.

As illustrated in FIG. 17B, the coupler $40_1$ is provided with a bottom plate member $41_1$ in which a pair of semi-cylindrical trenches $42_1$ and $42_2$ are created, and an upper lid member $43_1$ in which semi-cylindrical trenches $44_1$ and $44_2$ having coupling electrodes $45_1$ and $45_2$ on the inner surface are created. In addition, a terminal resistor 46 for connecting the coupling electrodes $45_1$ and $45_2$ to each other is formed on the flat surface of the upper lid member $43_1$.

The bottom plate member $41_1$ and the upper lid member $43_1$ are rotated around a hinge 47 so as to be layered on top of each other, and thus, as illustrated in FIG. 17D, cylindrical through holes $48_1$ and $48_2$ through which the covered wire $21_1$ and the covered wire $21_3$ run are created. In addition, the covered wire $21_2$ (core conductor $22_2$) and the covered wire $21_4$ (core conductor $22_4$) are respectively connected to the other end of the coupling electrode $45_1$ and the other end of the coupling electrode $45_2$. At this time, it is desirable for the interference between the covered wire $21_1$ and the covered wire $21_3$ to be weakened for the purpose of sufficiently intensifying the coupling between the covered wire $21_1$ and the covered wire $21_2$ and the coupling between the covered wire $21_3$ and the covered wire $21_4$. In order to do this, it is desirable for the distance W between the covered wire $21_1$ and the covered wire $21_3$ to be made three times or more greater than the distance between the covered wire $21_1$ and the covered wire $21_2$, and in the case where the distance d for the coupling is 5 mm, for example, W is set to be 15 mm.

Figure 18:
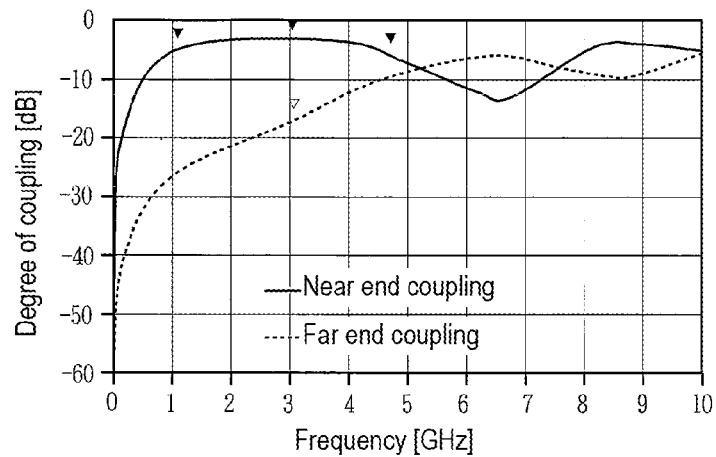
FIG. 18 is a graph illustrating the frequency characteristics of the coupler used in Example 5 of the present invention.

FIG. 18 is a graph illustrating the frequency characteristics of the coupler used in Example 5 of the present invention, where the degree of coupling of a signal propagating in the leftward direction through near end coupling is approximately −10 dB and the degree of coupling of a signal propagating in the rightward direction through far end coupling is approximately −20 dB, and thus, intense directionality is gained.

Figure 19A:
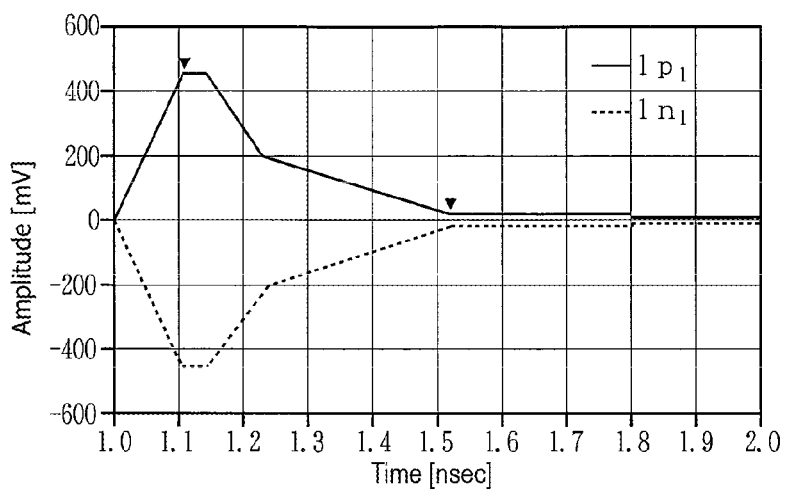
FIGS. 19A and 19B are graphs illustrating the operational waves of the coupler used in Example 5 of the present invention.
Figure 19B:
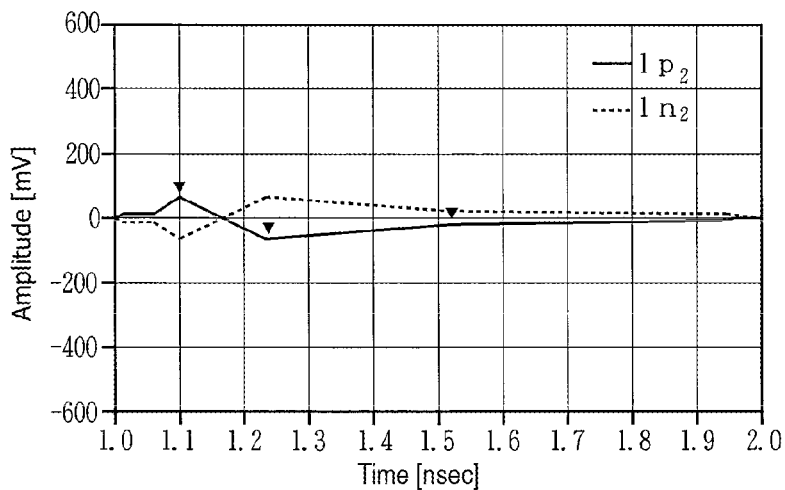

FIGS. 19A and 19B are graphs illustrating the operational waveforms of the coupler used in Example 5 of the present invention, where the results of electromagnetic field simulation are illustrated in the case where a step signal with an amplitude of 1V is applied during a rise time of 100 psec after 1 nsec. As illustrated in FIG. 19A, the amplitudes $1p_1$ and $1n_1$ that propagate towards the left side of the coupler $40_1$ merely have opposite polarities, and it can be seen that pulse signals of which the amplitude is approximately ½ of that of the inputted step signal propagate. Incidentally, the amplitude at the points indicated by the inverted black triangles from the left to the right in the figure is 0.467 V@1.111 nsec and 16.24 mV@1.520 nsec.

Meanwhile, as illustrated in FIG. 19B, the amplitudes of $1p_2$ and $1n_2$ that propagate towards the right side of the coupler $40_1$ are very small, and it can be seen that virtually no signals propagate. Incidentally, the amplitude at the points indicated by the inverted black triangles from the left to the right in the figure is 70.44 mV@1.100 nsec, −65.05 mV@1.236 nsec and −9.731 mV@1.520 nsec.

Thus, non-contact data connection is possible in a differential type communication system using covered wires as well by using electromagnetic field coupling. In particular, stable electromagnetic field coupling is possible by using a coupler.

Figure 20:
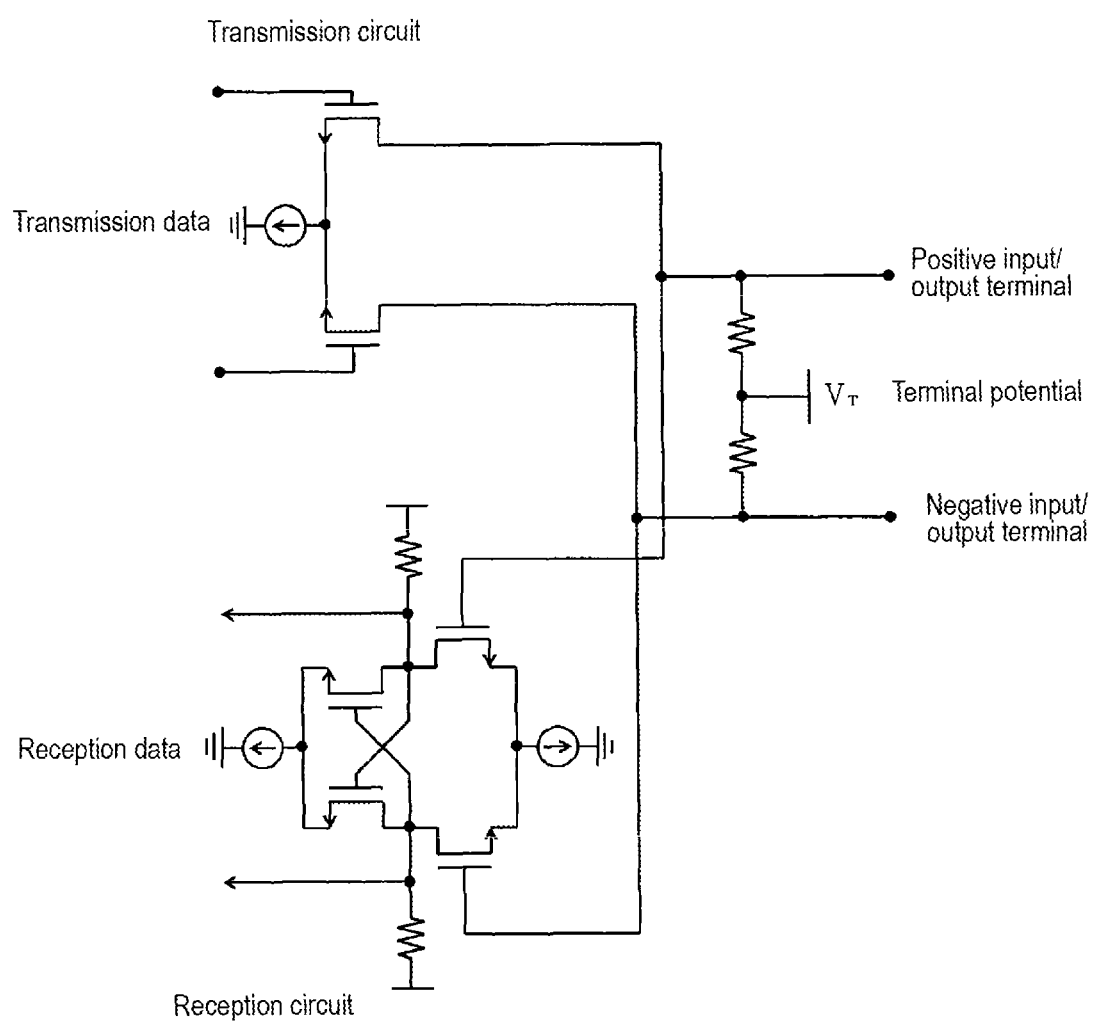
FIG. 20 is a diagram illustrating an example of a transmitter/receiver used in the covered wire coupling type information communication network according to Example 5 of the present invention.

FIG. 20 is a diagram illustrating an example of a transmitter/receiver used for the covered wire coupling type information communication network according to Example 5 of the present invention and illustrates a transmitter/receiver having the same configuration as the transmitter/receiver used for the conventional electromagnetic field coupling type communication apparatus that has been proposed, and the transmitter/receiver having this circuit configuration is appropriate for high speed communication.

Figure 21:
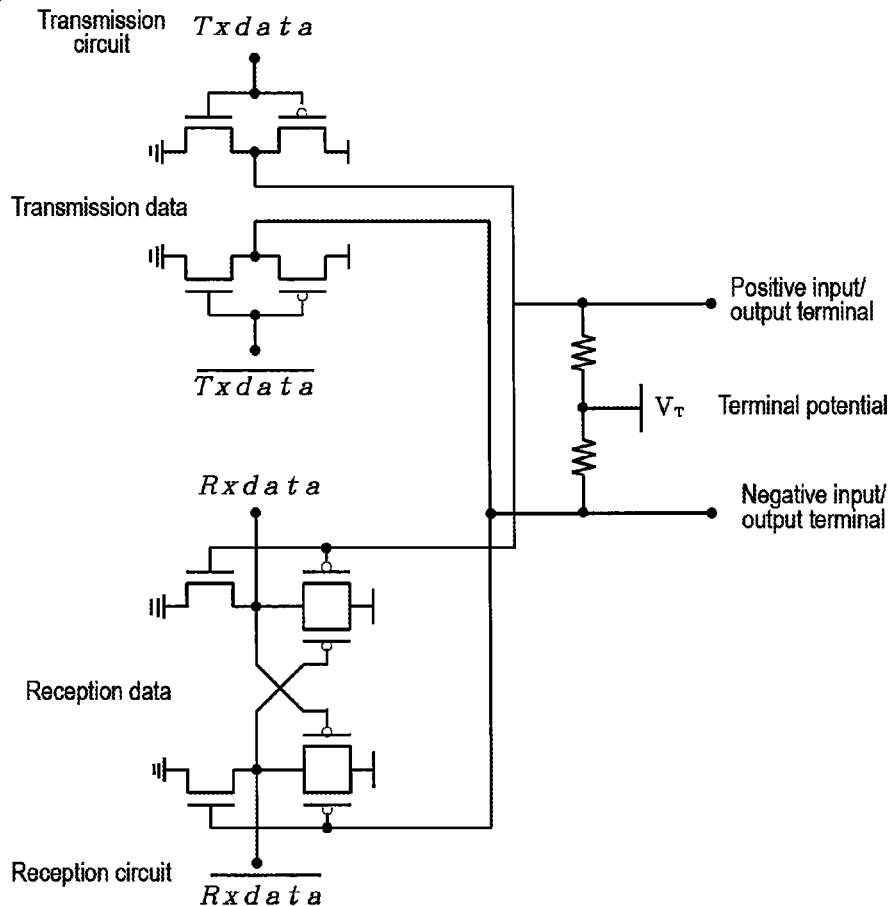
FIG. 21 is a diagram illustrating another example of a transmitter/receiver used in the covered wire coupling type information communication network according to Example 5 of the present invention.

FIG. 21 is a diagram illustrating another example of a transmitter/receiver used for the covered wire coupling type information communication network according to Example 5 of the present invention, which uses a CMOS circuit configuration so as to make it possible to reduce power consumption as compared to the transmitter/receiver in FIG. 20.

EXAMPLE 6

Figure 22:
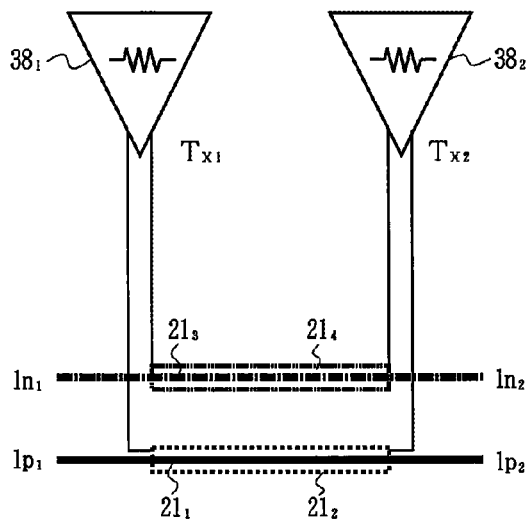
FIG. 22 is a symbolic diagram illustrating a coupling unit of the covered wire coupling type information communication network according to Example 6 of the present invention.

Next, the covered wire coupling type information communication network according to Example 6 of the present invention is described in reference to FIG. 22, which illustrates a modification of Example 5. FIG. 22 is a symbolic diagram illustrating the coupling unit of the covered wire coupling type information communication network according to Example 6 of the present invention. In the coupling unit 27, a transmitter/receiver $38_1$ is connected to one end of the covered wire $21_2$ and one end of the covered wire $21_4$, and a transmitter/receiver $38_2$ is connected to the other end of the covered wire $21_2$ and the other end of the covered wire $21_4$.

In this case, the current source of the transmission/reception circuit of either one can be cut off so as to disable the circuit, and thus, the resistor provided in the disabled transmission/reception circuit can be used as a terminal resistor, which makes a specific terminal resistor unnecessary unlike in Example 5. Which transmission/reception circuit that should be used for the terminal depends on the direction in which the signal propagates, and the current source of the transmission/reception circuit on the output end side may be cut off. In the case where a signal propagates in the leftward direction in the figure (in the direction towards $1p_1$ and $1n_1$), for example, the transmitter/receiver $38_1$ transmits data while the transmitter/receiver $38_2$ may be disabled.

EXAMPLE 7

Figure 23A:
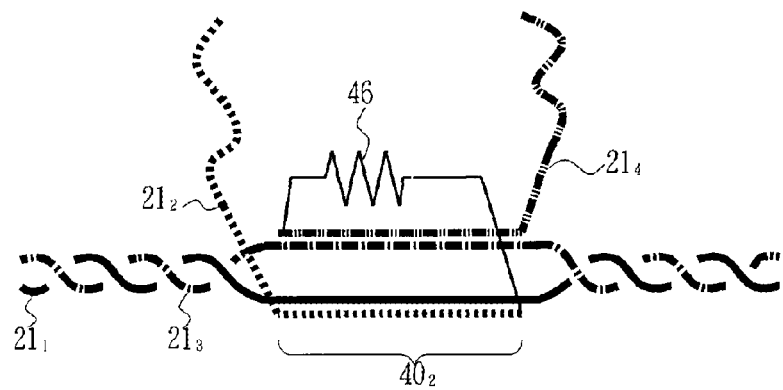
FIGS. 23A through 23C are diagrams illustrating a coupling unit of the differential type covered wire coupling type information communication network according to Example 7 of the present invention.

Next, the differential type covered wire coupling type information communication network according to Example 7 of the present invention is described in reference to FIGS. 23A through 27B, where only the coupling unit is described. FIGS. 23A through 23C are diagrams illustrating the coupling unit of the differential type covered wire coupling type information communication network according to Example 7 of the present invention. FIG. 23A is a schematic diagram illustrating the configuration, FIG. 23B is a symbolic diagram illustrating the propagation state of a signal, and FIG. 23C is a perspective diagram illustrating a coupler. As illustrated in FIG. 23A, in the case where the ends of the covered wires $21_2$ and $21_4$ are terminated with the impedance being matched in a coupler $40_2$ according to Example 7 of the present invention, a pair of coupling electrodes in the coupler $40_2$ are arranged opposite to each other in terms of the positive electrodes and the negative electrodes, and the covered wires are terminated with the impedance being matched using a terminal resistor 46.

Figure 23B:
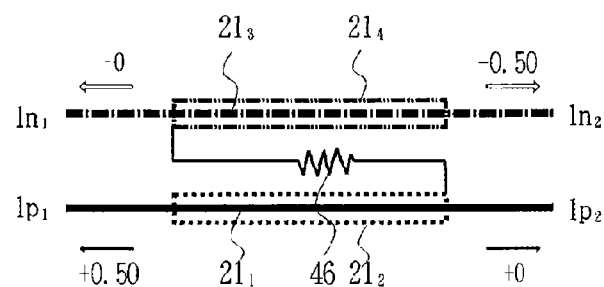

As for the propagation state of the signals in this case, a signal propagates through the covered wire $21_1$ in the same manner as in Example 5, whereas a signal propagates through the covered wire $21_3$ in the direction opposite to that in Example 5. That is to say, as illustrated in FIG. 23B, ideally, electromagnetic field coupling allows one-half of the positive signal that has entered from the covered wire $21_2$ to propagate through the covered wire $21_1$ towards the left in the figure and the other half to propagate through the covered wire $21_2$ towards the right, where the signal that has propagated towards the right is consumed as heat in the terminal resistor 46. Accordingly, when a signal propagates through the covered wire $21_1$, the direction is towards $1p_1$ and not towards $1p_2$. The polarity of a negative signal that has entered from the covered wire $21_4$ is inverted, and at the same time, the direction of propagation is also inverted. Here, calculation is carried out by assuming that the near end coupling is 0.5 and the far end coupling is 0 for the purpose of simplifying the calculation.

Figure 23C:
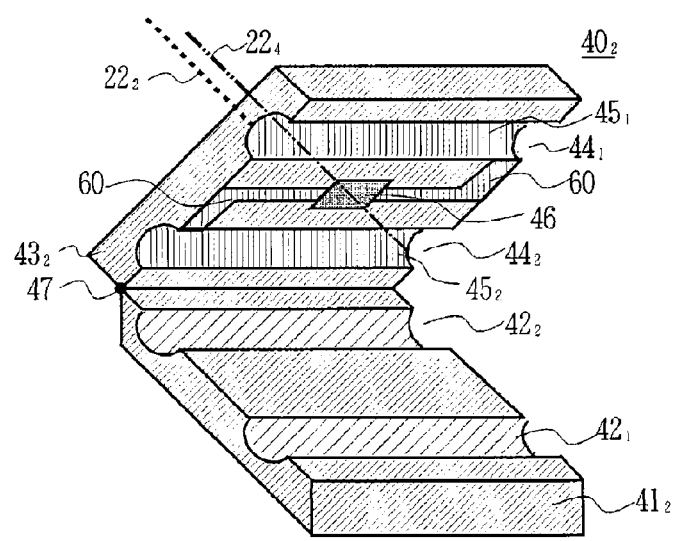

FIG. 23C is a perspective diagram illustrating a coupler. A coupler $40_2$ is provided with a bottom plate member $41_2$ in which a pair of semi-cylindrical trenches $42_1$ and $42_2$ are created and an upper lid member $43_2$ in which semi-cylindrical trenches $44_1$ and $44_2$ having coupling electrodes $45_1$ and $45_2$ on the inner surface are created. In addition, a terminal resistor 46 and a connection wire 60 for connecting the coupling electrodes $45_1$ and $45_2$ to each other are formed on the flat surface of the upper lid member $43_2$. In this case, it is necessary for the coupling electrodes $45_1$ and $45_2$ to have a sufficient distance between them in order to reduce electromagnetic interference between the coupling electrodes $45_1$, $45_2$ and the connection wire 60. Accordingly, the coupler $40_2$ is wider than the coupler $40_1$ in FIG. 17B.

FIGS. 24A through 25D are a diagram and graphs illustrating a concrete operational principle. The waveform of the signal that propagates in the direction towards $1p_1$ in FIG. 24D and the waveform of the signal that propagates in the direction towards $1p_2$ in FIG. 24E are the same as those in Example 5. Meanwhile, the waveform of the signal that propagates in the direction towards $1n_1$ in FIG. 25A and the waveform of the signal that propagates in the direction towards $1n_2$ in FIG. 25B have the same polarities as those in Example 5; however, the directions of propagation are opposite.

Figure 24A:
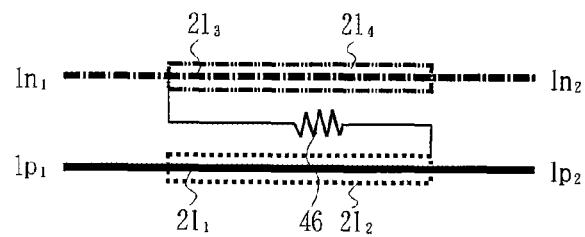
FIGS. 24A through 24E are a diagram and graphs illustrating a concrete operational principle (1)
Figure 24B:
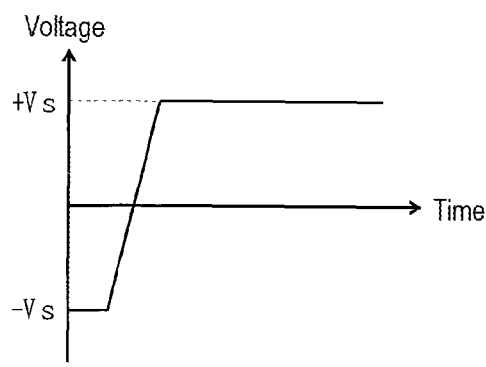
Figure 24C:
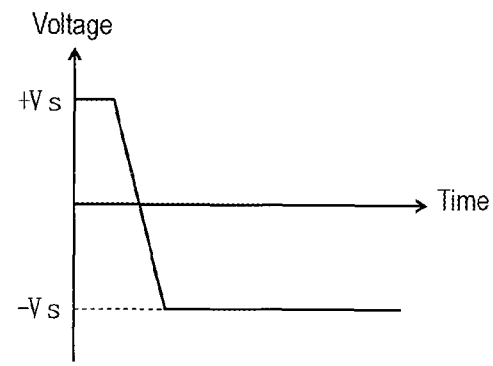
Figure 24D:
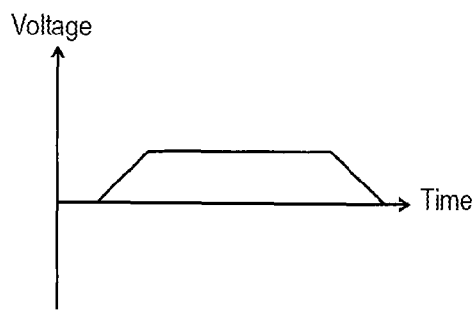
Figure 24E:
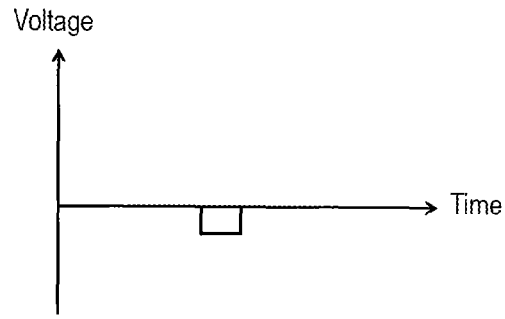
Figure 25A:
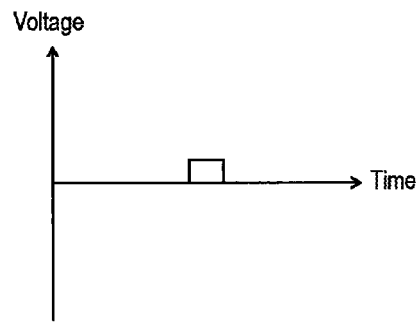
FIGS. 25A through 25D are graphs illustrating a concrete operational principle (2)
Figure 25B:
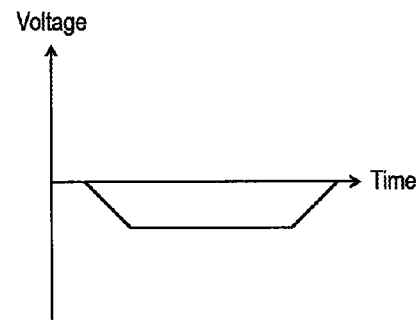
Figure 25C:
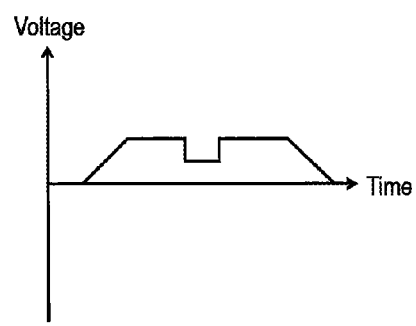
Figure 25D:
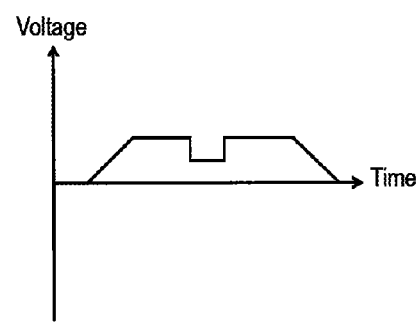

Accordingly, as illustrated in FIG. 25C, a waveform where a waveform that is gained by inverting the waveform in FIG. 25A and the waveform in FIG. 24D are superposed propagates at the left end as a differential signal. Meanwhile, as illustrated in FIG. 25D, a waveform where a waveform that is gained by inverting the waveform in FIG. 25B and the waveform in FIG. 24E are superposed propagates at the right end. As a result, such a coupler is gained that allows for propagation of a signal of which the amplitude is half of that in Example 5 but is the same between the left and right with the same polarity.

Figure 26:
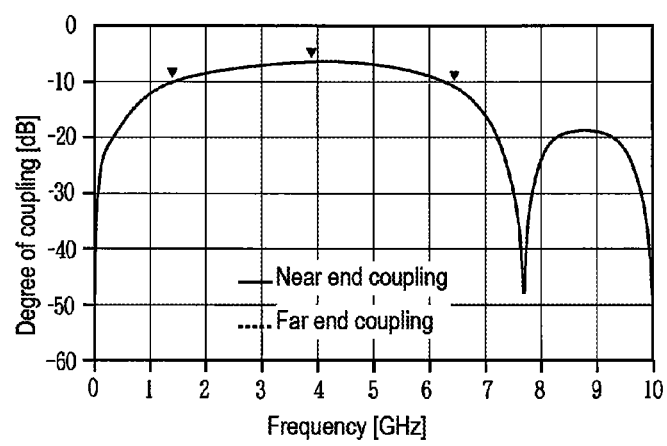
FIG. 26 is a graph illustrating the frequency characteristics of a coupler used in Example 7 of the present invention.

FIG. 26 is a graph illustrating the frequency characteristics of the coupler used in Example 7 of the present invention. A curve in the near end coupling and a curve in the far end coupling overlap, and thus, it is confirmed that a signal propagates with the same amplitude between the left and the right and with the same polarity. Incidentally, the degree of coupling at the points indicated by the inverted black triangles from the left to the right in the figure is −10.126 dB@1.410 GHz, −7.255 dB@3.910 GHz and −10.604 dB@6.410 GHz.

Figure 27A:
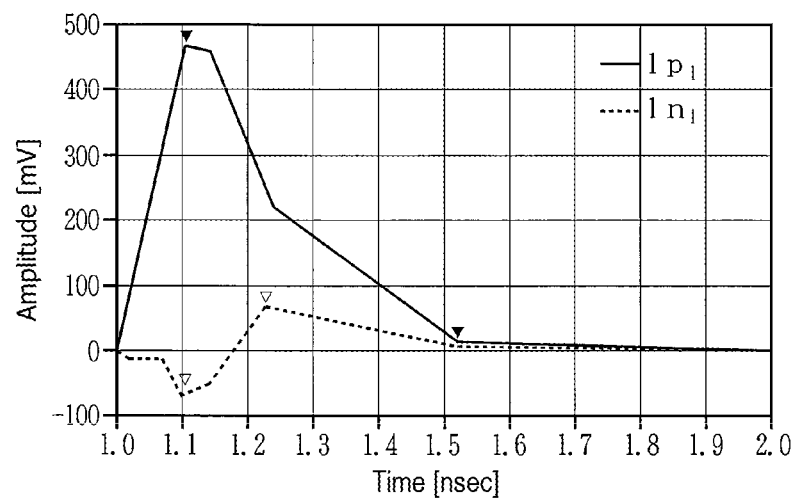
FIGS. 27A and 27B are graphs illustrating the operational waves of a coupler used in Example 7 of the present invention.
Figure 27B:
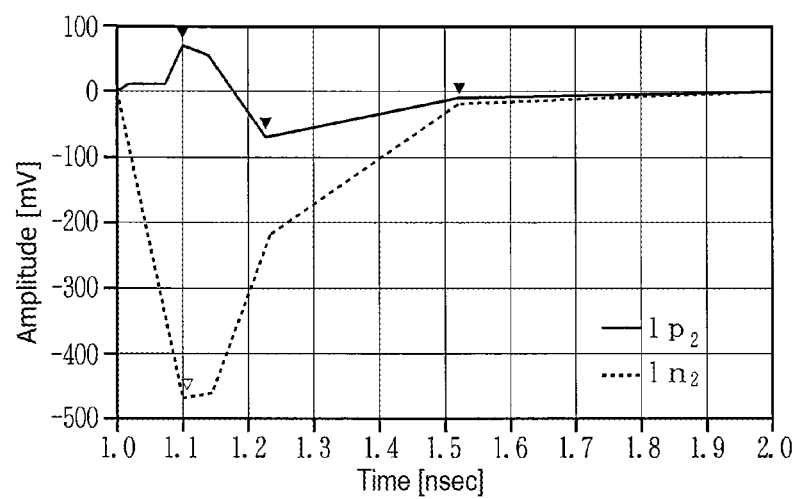

FIGS. 27A and 27B are graphs illustrating the operational waveforms of the coupler used in Example 7 of the present invention, where the results of electromagnetic field simulation are also illustrated in the case where a step signal with an amplitude of 1V is applied during a rise time of 100 psec after 1 nsec. As illustrated in FIG. 27A, $1p_1$ that propagates towards the left of the coupler $40_2$ is approximately the same as that in Example 5, while the amplitude of $1n_1$ is approximately the same as that of $1n_2$ in FIG. 19B. Incidentally, the amplitude at the points indicated by the inverted black triangles from the left to the right in the figure is 0.4667 V@1.111 nsec and 16.24 mV@1.520 nsec. In addition, the amplitude at the points indicated by the inverted white triangles from the left to the right in the figure is −70.38 mV@1.100 nsec, 65.09 mV@1.236 nsec and 16.24 mV@1.520 nsec.

Meanwhile, as illustrated in FIG. 27B, the amplitudes of $1p_2$ and $1n_2$ that propagate towards the right of the coupler $40_2$ are those of the signal waveforms that are gained by inverting $1p_1$ and $1n_1$ in FIG. 27A. Incidentally, the amplitude at the points indicated by the inverted black triangles from the left to the right in the figure is 70.44 mV@1.100 nsec, −65.05 mV@1.236 nsec and −9.731 mV@1.520 nsec.

In addition, the amplitude at the point indicated by an inverted white triangle in the figure is −469.3 mV@1.100 nsec.

Thus, a pair of coupling electrodes in the coupler $40_2$ are arranged in the direction opposite to each other in terms of the positive electrodes and the negative electrodes and terminated with the impedance being matched by means of a terminal resistor 46, which makes it possible to propagate a signal of which the amplitude is the same between the left and the right with the same polarity. In addition, the pulse is shortened and closed, and thus, interference is small between the symbols, which provides a coupler that is appropriate for high speed communication.

Figure 28A:
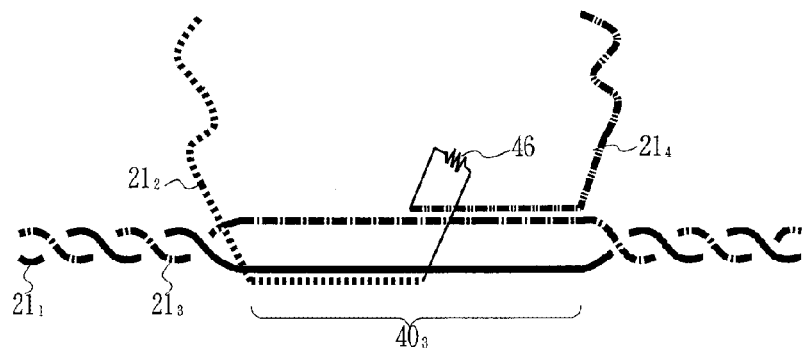
FIGS. 28A through 28C are diagrams illustrating a modification of a coupling unit of the differential type covered wire coupling type information communication network according to Example 7 of the present invention.
Figure 28B:
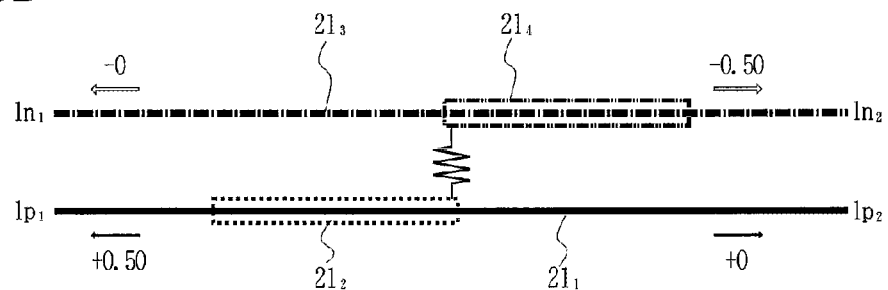
Figure 28C:
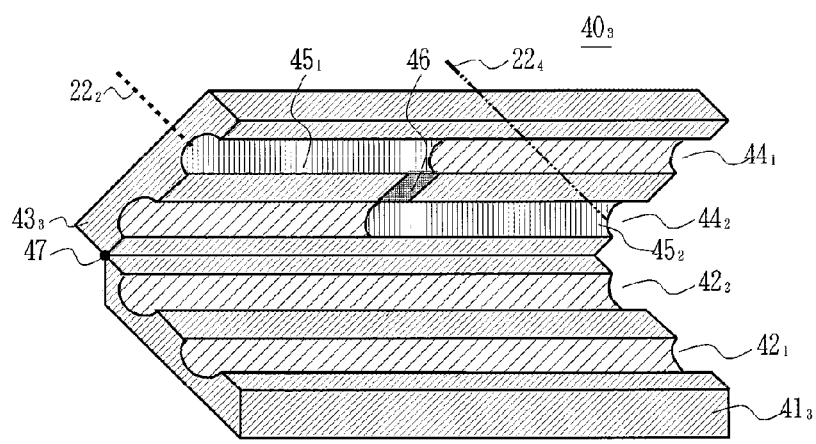

Next, a coupling unit of the differential type covered wire coupling type information communication network according to a modification of Example 7 of the present invention is described in reference to FIGS. 28A through 28C. FIGS. 28A through 28C are diagrams illustrating a coupling unit of the differential type covered wire coupling type information communication network according to a modification of Example 7 of the present invention. FIG. 28A is a schematic diagram illustrating the configuration, FIG. 28B is a symbolic diagram illustrating the propagation state of a signal, and FIG. 28C is a perspective diagram illustrating a coupler.

As illustrated in FIG. 28A, in the coupler $40_3$ according to the modification of Example 7 of the present invention, a pair of coupling electrodes in the coupler $40_3$ are arranged in the direction opposite to each other in terms of the positive electrodes and the negative electrodes so that the coupler $40_3$ can be made longer, which makes a connection wire unnecessary when the ends of the covered wires $21_2$ and $21_4$ are terminated with the impedance being matched by means of a terminal resistor 46. Therefore, the width of the coupler $40_3$ is the same as that of the coupler $40_1$ in Example 7. In this case, as illustrated in FIG. 28B, the propagation state of the signal is the same as that in Example 7 as illustrated in FIG. 23B.

FIG. 28C is a perspective diagram illustrating the coupler. The coupler $40_3$ is provided with a bottom plate member $41_3$ in which a pair of semi-cylindrical trenches $42_1$ and $42_2$ are created and an upper lid member $43_3$ in which semi-cylindrical trenches $44_1$ and $44_2$ having coupling electrodes $45_1$ and $45_2$ on the inner surface are created. Here, one coupling electrode $45_1$ is provided in the left half of the trench $44_1$, the other coupling electrode $45_2$ is provided in the right half of the trench $44_2$, and the two are directly connected through a terminal resistor 46. Accordingly, a process for providing a connection wire 60 is unnecessary, and at the same time, it is not necessary to take into consideration electromagnetic interference between the coupling electrodes $45_1$, $45_2$ and the connection wire 60.

EXAMPLE 8

Figure 29A:
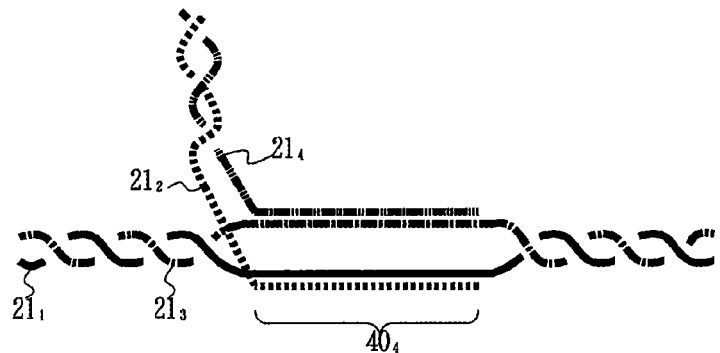
FIGS. 29A through 29C are diagrams illustrating a coupling unit of the differential type covered wire coupling type information communication network according to Example 8 of the present invention.

Next, the differential type covered wire coupling type information communication network according to Example 8 of the present invention is described in reference to FIGS. 29A through 33B, where only the coupling unit is described. FIGS. 29A through 29C are diagrams illustrating the coupling unit of the differential type covered wire coupling type information communication network according to Example 8 of the present invention. FIG. 29A is a schematic diagram illustrating the configuration, FIG. 29B is a symbolic diagram illustrating the propagation state of a signal, and FIG. 29C is a perspective diagram illustrating the coupler in the case where a coupler is used.

As illustrated in FIG. 29A, in the case where an electromagnetic coupling system is applied to differential type covered wires, entangled covered wires $21_1$ and $21_3$ are partially arranged to be in a parallel state so that a coupler $40_4$ is formed, where electromagnetic field coupling is achieved vis-à-vis other differential type covered wires $21_2$ and $21_4$. At this time, the covered wires $21_2$ and $21_4$ are terminated openly on the output end side.

Figure 29B:
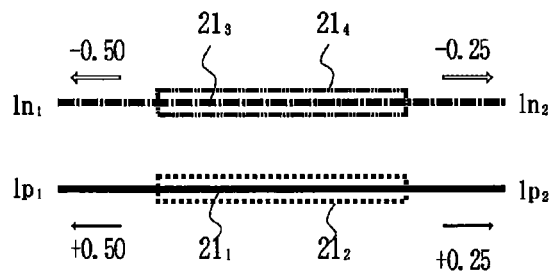

As illustrated in FIG. 29B, ideally, electromagnetic field coupling allows ½ of the positive signal that has entered from the covered wire $21_2$ to propagate through the covered wire $21_1$ in the direction towards $1p_1$ and ½ of the signal that has been totally reflected from the open end of the covered wire $21_2$ to propagate in the direction towards $1p_2$ when the signal propagates in the direction towards the left. Accordingly, the intensity of the signal that propagates in the direction towards $1p_2$ is ¼ (=½×½). The negative signal that has entered from the covered wire $21_4$ propagates in the same way as the positive signal only with the polarity being opposite. Accordingly, through the covered wires $21_1$ and $21_3$ that make a differential pair, ½ of the signal that propagates in the direction towards the left propagates in the direction towards the right without the polarity being opposite. Here, calculation is carried out by assuming that the near end coupling is 0.5 and the far end coupling is 0 for the purpose of simplifying the calculation.

Figure 29C:
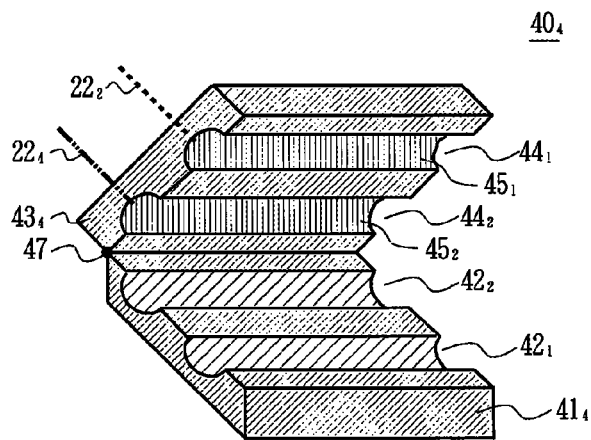

In this case, as illustrated in FIG. 29C, the coupler $40_4$ is provided with a bottom plate member $41_4$ in which a pair of semi-cylindrical trenches $42_1$ and $42_2$ are created and an upper lid member $43_4$ in which semi-cylindrical trenches $44_1$ and $44_2$ having coupling electrodes $45_1$ and $45_2$ on the inner surface are created. No terminal resistor is formed. The bottom plate member $41_4$ and the upper lid member $43_4$ are rotated around a hinge 47 so as to be layered on top of each other, and thus, cylindrical through holes through which covered wires $21_1$ and $21_3$ run are created.

Figure 30A:
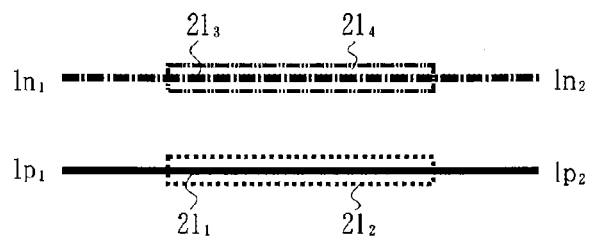
FIGS. 30A through 30E are a diagram and graphs illustrating a concrete operational principle (1)
Figure 30B:
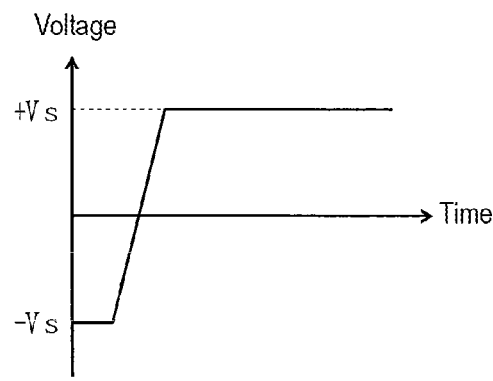
Figure 30C:
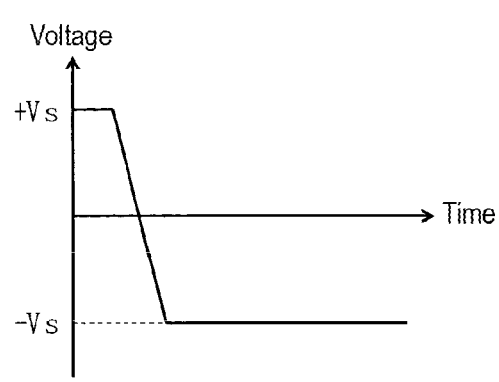

FIGS. 30A through 31D are a diagram and graphs illustrating a concrete operational principle. FIG. 30A is a symbolic diagram illustrating a coupler, where a case where the right end is terminated openly is described. FIG. 30B is a waveform diagram illustrating an example of a positive signal that propagates through the covered wire $21_2$, and FIG. 30C is a waveform diagram illustrating an example of a negative signal that propagates through the covered wire $21_4$. When a positive signal from the covered wire $21_2$ propagates from the left end of the coupling unit towards the right end, a capacitive coupling current and an inductive coupling current are induced so as to flow through the covered wire $21_1$. At the left end, an electromagnetic field coupling wave in such a waveform as in FIG. 30D appears. At the right end, an electromagnetic field coupling wave as that in FIG. 30E appears.

Figure 31A:
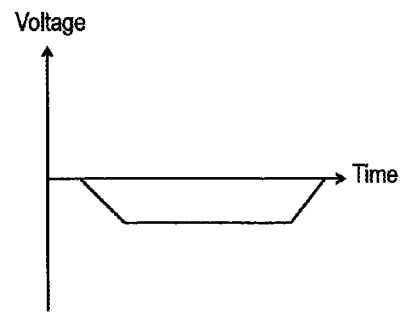
FIGS. 31A through 31D are graphs illustrating a concrete operational principle (2)
Figure 31B:
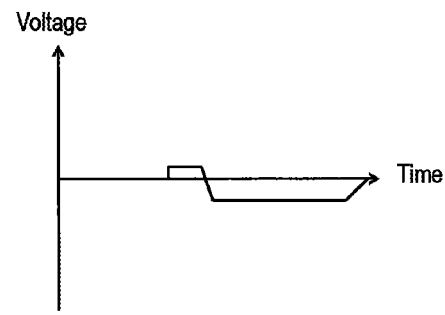

As for negative signals, when a negative signal from the covered wire $21_4$ propagates from the left end of the coupling unit towards the right end, an electromagnetic field coupling wave in such a waveform as that in FIG. 31A appears at the left end, and an electromagnetic field coupling wave as that in FIG. 31B appears at the right end.

Figure 30D:
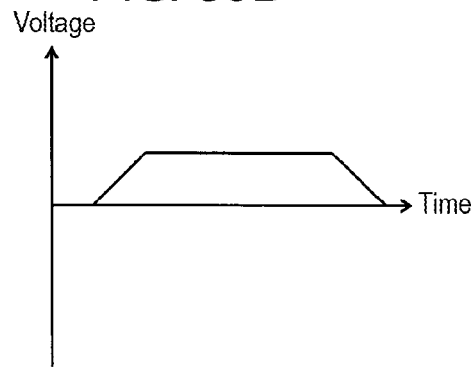
Figure 30E:
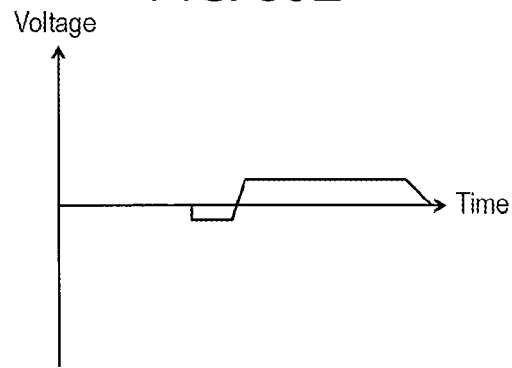
Figure 31C:
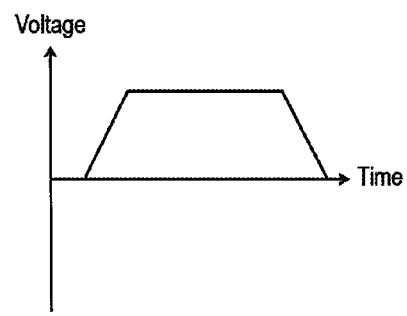
Figure 31D:
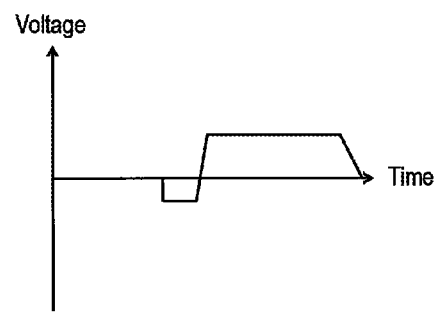

Accordingly, as illustrated in FIG. 31C, a waveform where a waveform that is gained by inverting the waveform in FIG. 31A and the waveform in FIG. 30D are superposed propagates at the left end as a differential signal. Meanwhile, as illustrated in FIG. 31D, a waveform where a waveform that is gained by inverting the waveform in FIG. 31B and the waveform in FIG. 30E are superposed propagates at the right end.

Figure 32:
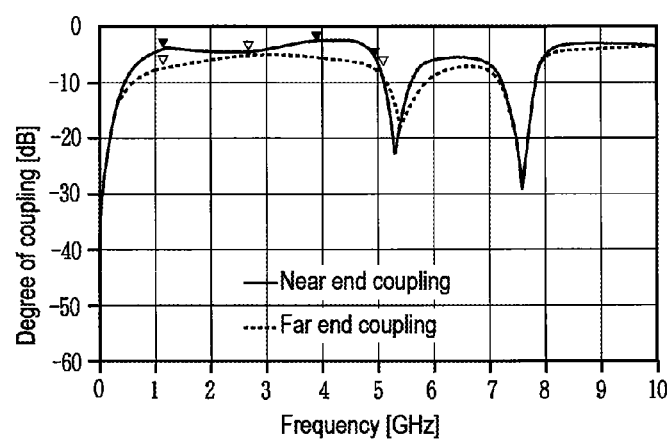
FIG. 32 is a graph illustrating the frequency characteristics of a coupler used in Example 8 of the present invention.

FIG. 32 is a graph illustrating the frequency characteristics of the coupler used in Example 8 of the present invention, where the directionality is weaker as compared to the case of termination with the impedance being matched as illustrated in FIG. 18. Incidentally, the degree of coupling at the points indicated by the inverted black triangles from the left to the right in the figure is −4.500 dB@1.160 GHz, −1.981 dB@3.860 GHz and −4.888 dB@4.960 GHz. In addition, the degree of coupling at the point indicated by the inverted white triangles from the left to the right in the figure is −7.555 dB@1.160 GHz, −4.453 dB@2.710 GHz and −7.707 dB@5.010 GHz.

Figure 33A:
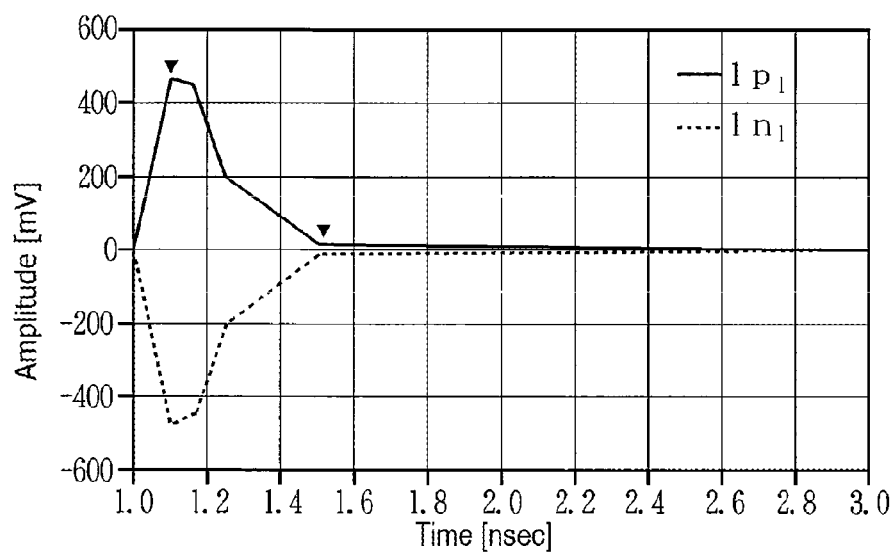
FIGS. 33A and 33B are graphs illustrating the operational waves of a coupler used in Example 8 of the present invention.
Figure 33B:
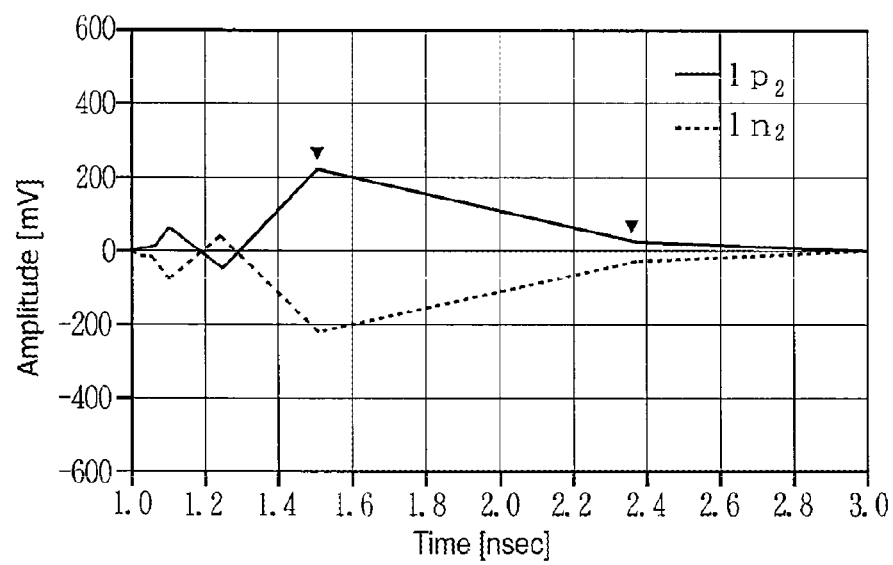

FIGS. 33A and 33B are graphs illustrating the operational waveform of the coupler used in Example 8 of the present invention, where the results of electromagnetic field simulation are illustrated in the case where a step signal with an amplitude of 1V is applied during a rise time of 100 psec after 1 nsec. As illustrated in FIG. 33A, $1p_1$ and $1n_1$ that propagate towards the left of the coupler $40_4$ are approximately the same as those in Example 5 only with the polarities being opposite, and it can be seen that a pulse signal of which the amplitude is approximately ½ of that of the inputted step signal propagates. Incidentally, the amplitude at the points indicated by the inverted black triangles from the left to the right in the figure is 0.4693 V@1.110 nsec and 9.619 mV@1.520 nsec.

Meanwhile, as illustrated in FIG. 33B, the amplitudes of the signals at $1p_2$ and $1n_2$ that propagate towards the right of the coupler $40_4$ are approximately one-half of the amplitudes of the signals that propagate in the direction towards $1p_1$ and $1n_1$. Incidentally, the amplitude at the points indicated by the inverted black triangles from the left to the right in the figure is 227.4 mV@1.520 nsec and 25.67 mV@2.370 nsec.

Thus, the coupler is terminated openly in Example 8 of the present invention, and therefore, it is possible to effectively use a signal in the far end coupling unit without discarding the signal through the terminal resistor, though the intensity thereof is ½ of that in the near end coupling unit.

EXAMPLE 9

Figure 34A:
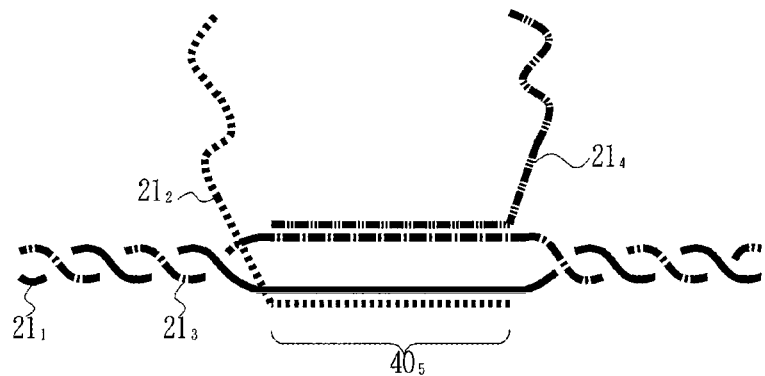
FIGS. 34A through 34C are diagrams illustrating a coupling unit of the differential type covered wire coupling type information communication network according to Example 9 of the present invention.

Next, the differential type covered wire coupling type information communication network according to Example 9 of the present invention is described in reference to FIGS. 34A through 38B, where only the coupling unit is described. FIGS. 34A through 34C are diagrams illustrating the coupling unit of the differential type covered wire coupling type information communication network according to Example 9 of the present invention. FIG. 34A is a schematic diagram illustrating the configuration, FIG. 34B is a symbolic diagram illustrating the propagation state of a signal, and FIG. 34C is a perspective diagram illustrating a coupler. As illustrated in FIG. 34A, in the case where the ends of the covered wires $21_2$ and $21_4$ are terminated openly in a coupler $40_5$ in Example 9 of the present invention, a pair of coupling electrodes in the coupler $40_5$ are arranged opposite to each other in terms of the positive electrodes and the negative electrodes so as to be connected to the covered wires $21_2$ and $21_4$.

Figure 34B:
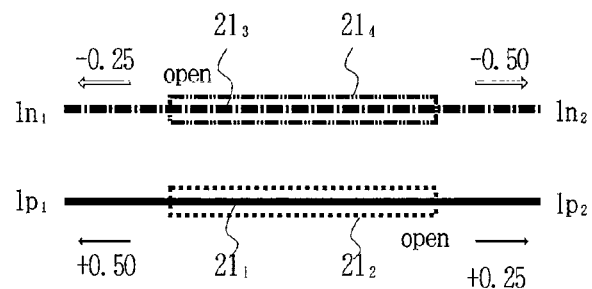

In this case, the propagation state of the signal that propagates through the covered wire $21_1$ is the same as that in Example 8, and the signal that propagates through the covered wire $21_3$ has an amplitude that is opposite between the left and the right to that in Example 8. That is to say, as illustrated in FIG. 34B, ideally, electromagnetic field coupling allows ½ of the positive signal that has entered from the covered wire $21_2$ to propagate through the covered wire $21_1$ in the direction towards $1p_1$ and ½ of the positive signal to propagate in the direction towards $1p_2$ when the signal that has been totally reflected from the open terminal of the covered wire $21_2$ propagates in the direction towards the left. Accordingly, the intensity of the signal that propagates in the direction towards $1p_1$ is ¼ (=½×½). The negative signal that has entered from the covered wire $21_4$ is regarded as being inputted in the opposite direction, and therefore, signals of which the polarities are opposite propagate in the directions opposite to each other. Here, calculation is carried out by assuming that the near end coupling is 0.5 and the far end coupling is 0 for the purpose of simplifying the calculation.

Figure 34C:
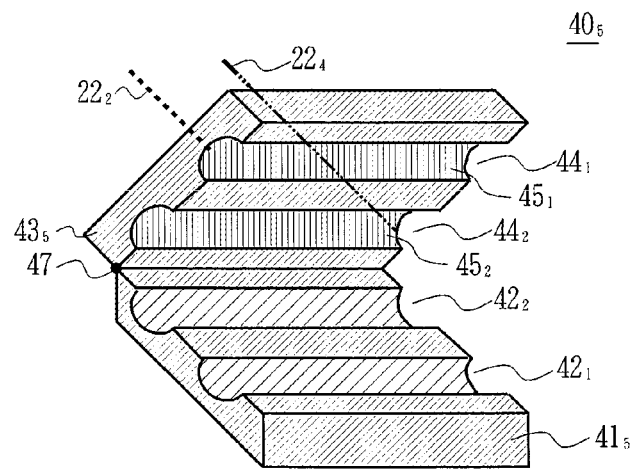

FIG. 34C is a perspective diagram illustrating the coupler. The coupler $40_5$ is provided with a bottom plate member $41_5$ in which a pair of semi-cylindrical trenches $42_1$ and $42_2$ are created and an upper lid member $43_5$ in which semi-cylindrical trenches $44_1$ and $44_2$ having coupling electrodes $45_1$ and $45_2$ on the inner surface are created. In Example 9, the core conductors $22_2$ and $22_4$ are connected to the coupling electrodes $45_1$ and $45_2$, respectively, through the end portions that are opposite to each other relative to the coupler $40_5$.

FIGS. 35A through 36D are a diagram and graphs for illustrating a concrete operational principle. The signal waveform that propagates in the direction towards $1p_1$ as illustrated in FIG. 35D and the signal waveform that propagates in the direction towards $1p_2$ as illustrated in FIG. 35E are the same as in Example 8. Meanwhile, the signal waveform that propagates in the direction towards $1n_1$ as illustrated in FIG. 36A and the signal waveform that propagates in the direction towards $1n_2$ as illustrated in FIG. 36B are the same as those in Example 8 in the polarity; however, the propagation directions are opposite to each other.

Figure 35B:
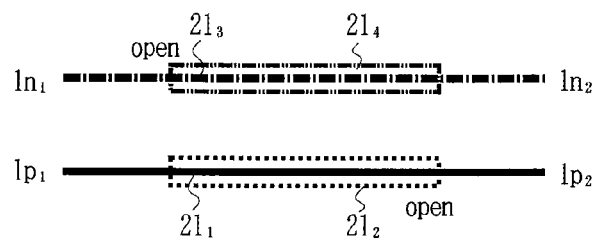
Figure 35B:
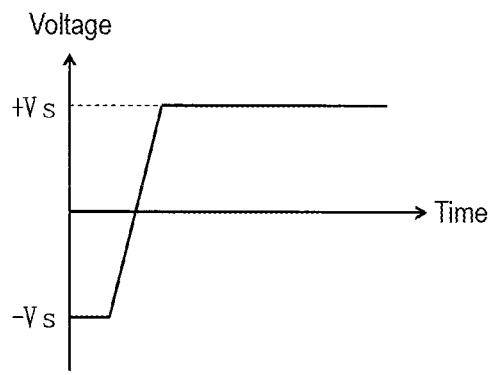
Figure 35C:
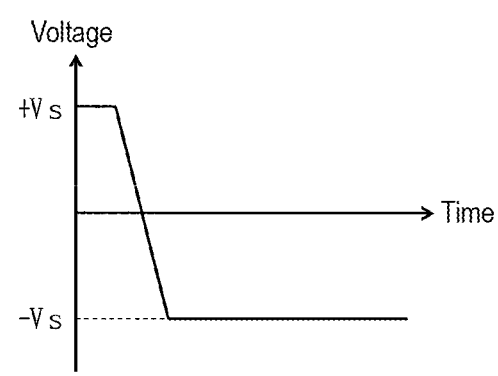
Figure 35D:
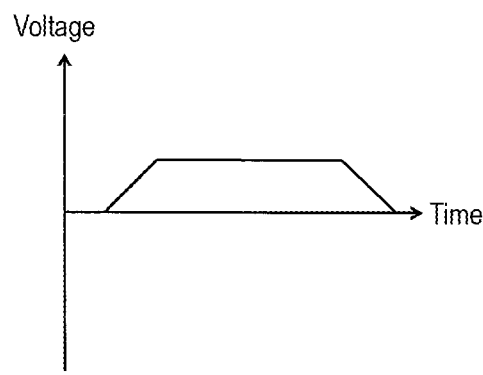
Figure 35E:
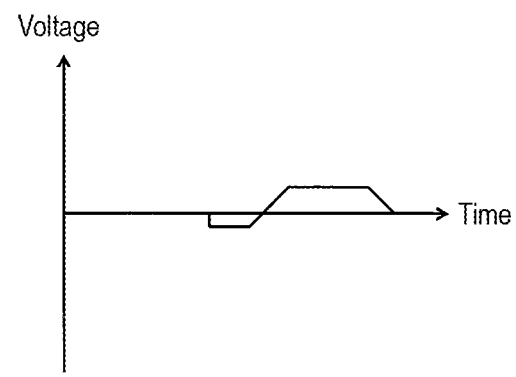
Figure 36A:
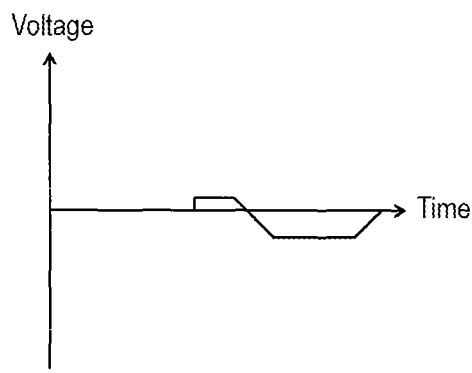
FIGS. 36A through 36D are graphs illustrating a concrete operational principle (2)
Figure 36B:
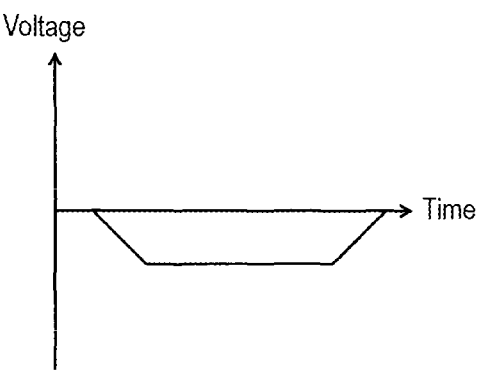
Figure 36C:
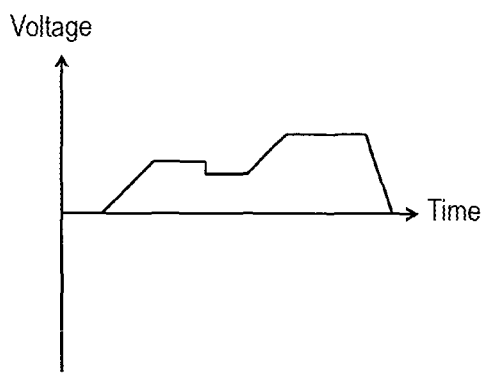
Figure 36D:
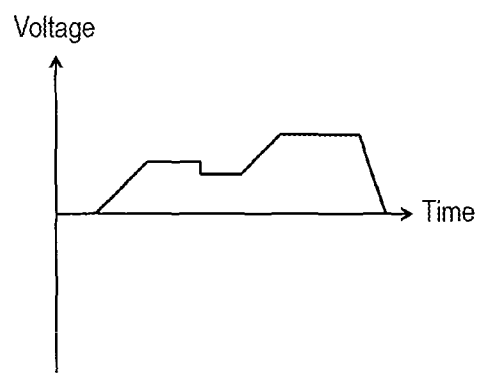

Accordingly, as illustrated in FIG. 36C, a waveform where a waveform that is gained by inverting the waveform in FIG. 36A and the waveform in FIG. 35D are superposed propagates at the left end as a differential signal. Meanwhile, as illustrated in FIG. 36D, a waveform where a waveform that is gained by inverting the waveform in FIG. 36B and the waveform in FIG. 35E are superposed propagates at the right end. The resulting coupler provides a propagating signal of which the amplitude is smaller than that in Example 7 but is the same between the left and the right with the same polarity.

Figure 37:
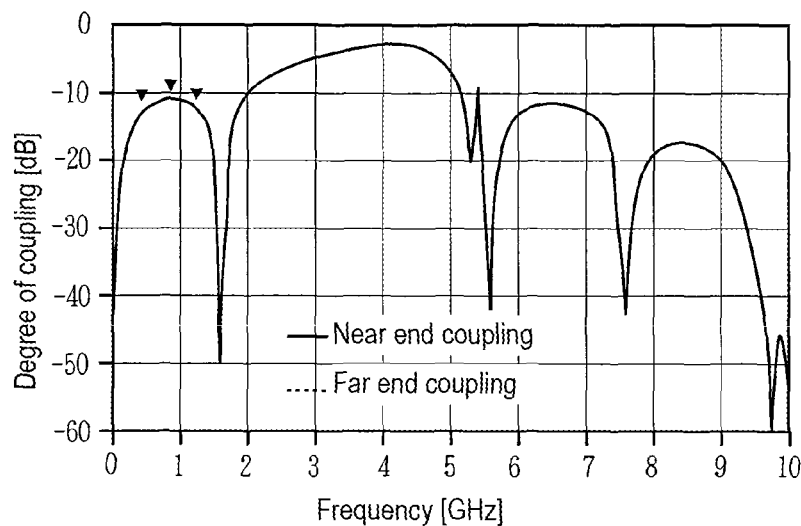
FIG. 37 is a graph illustrating the frequency characteristics of a coupler used in Example 9 of the present invention.

FIG. 37 is a graph illustrating the frequency characteristics of the coupler used in Example 9 of the present invention. The curve for the near end coupling and the curve for the far end coupling overlap, and it is confirmed that a signal propagates with the same amplitude between the left and the right and with the same polarity. Incidentally, the degree of coupling at the points indicated by the inverted black triangles from the left to the right in the figure is −13.520 dB@0.410 GHz, −10.450 dB@0.860 GHz and −13.543 dB@1.260 GHz.

Figure 38A:
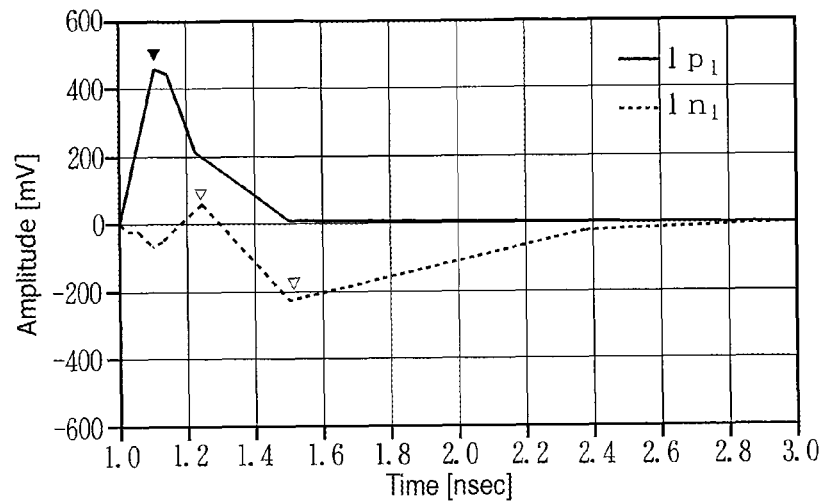
FIGS. 38A and 38B are graphs illustrating the operational waves of a coupler used in Example 9 of the present invention.
Figure 38B:
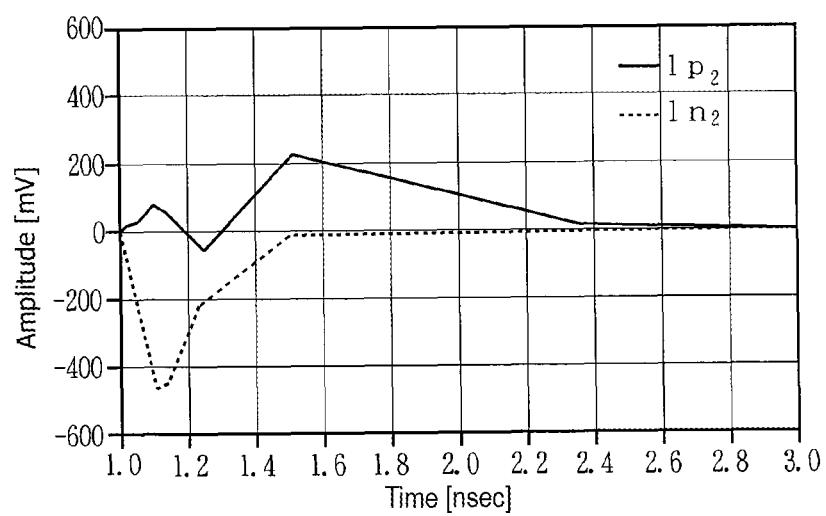

FIGS. 38A and 38B are graphs illustrating the operational waveform of the coupler used in Example 9 of the present invention, where the results of electromagnetic field simulation are also illustrated in the case where a step signal having an amplitude of 1V is applied during a rise time of 100 psec after 1 nsec. As illustrated in FIG. 38A, $1p_1$ that propagates towards the left of the coupler $40_5$ is approximately the same as in Example 8, while the amplitude of $1n_1$ is approximately the same as that of $1n_2$ as in FIG. 33B. Incidentally, the amplitude at the point indicated by the inverted black triangle in the figure is 0.4595 V@1.142 nsec. In addition, the amplitude at the points indicated by the inverted white triangles from the left to the right in the figure is 52.66 mV@1.236 nsec and −227.4 mV@1.520 nsec.

Meanwhile, as illustrated in FIG. 38B, the amplitudes of $1p_2$ and $1n_2$ that propagate towards the right of the coupler $40_2$ are those of the signal waveforms that are gained by inverting $1p_1$ and $1n_1$ in FIG. 38A.

Thus, a pair of coupling electrodes in the coupler $40_5$ are arranged opposite to each other in terms of the positive electrodes and the negative electrodes so as to be terminated openly, and as a result, it becomes possible to propagate signals having the same amplitude and the same polarity to the left and to the right.

EXAMPLE 10

Figure 39A:
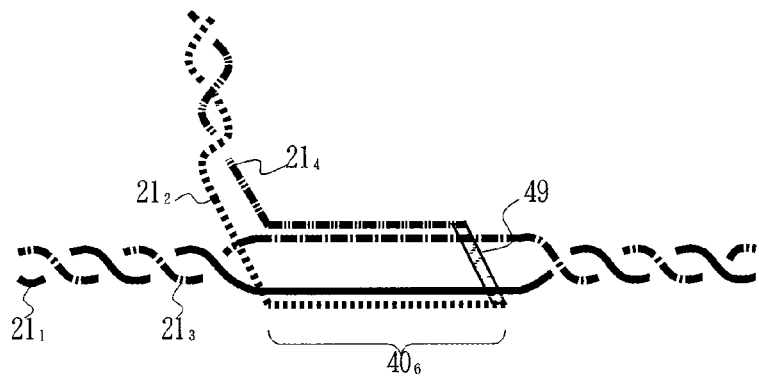
FIGS. 39A through 39C are diagrams illustrating a coupling unit of the differential type covered wire coupling type information communication network according to Example 10 of the present invention.

Next, the differential type covered wire coupling type information communication network according to Example 10 of the present invention is described in reference to FIGS. 39A through 43B, where only the coupling unit is described. FIGS. 39A through 39C are diagrams illustrating the coupling unit of the differential type covered wire coupling type information communication network according to Example 10 of the present invention. FIG. 39A is a schematic diagram illustrating the configuration, FIG. 39B is a symbolic diagram illustrating the propagation state of a signal, and FIG. 39C is a perspective diagram illustrating the coupler in the case where a coupler is used.

As illustrated in FIG. 39A, in the case where an electromagnetic coupling system is applied to differential type covered wires, entangled covered wires $21_1$ and $21_3$ are partially arranged to be in a parallel state so that a coupler $40_6$ is formed, where electromagnetic field coupling is achieved vis-à-vis other differential type covered wires $21_2$ and $21_4$. At this time, the covered wires $21_2$ and $21_4$ are connected to each other on the output end side.

Figure 39B:
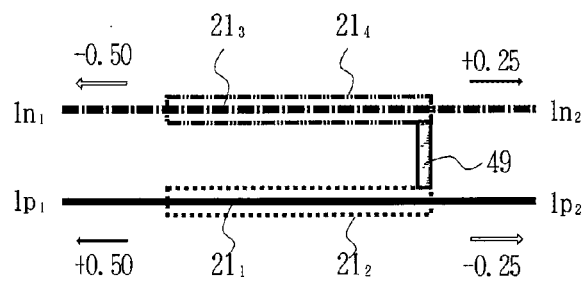

As illustrated in FIG. 39B, ideally, ½ of the positive signal that has entered from the covered wire $21_2$ so as to propagate in the rightward direction propagates in the direction towards $1p_1$ (in the leftward direction) and not in the direction towards $1p_2$ (in the rightward direction) when propagating through the covered wire $21_1$ in the coupling unit. When the remaining ½ of the signal propagates through the covered wire $21_4$ in the leftward direction via the linking unit 49, ¼ of the signal, which is ½ of the ½ signal, propagates through the covered wire $21_3$ in the direction towards $1n_2$ and does not propagate towards $1n_1$. The negative signal that has entered from the covered wire $21_4$ propagates in the same manner as the positive signal only with the polarity being inverted. Accordingly, ½ of the signal that propagates in the leftward direction propagates through the covered wires $21_1$ and $21_3$ that make a differential pair in the rightward direction in such a state that the polarity is inverted. Here, calculation is carried out by assuming that the near end coupling is 0.5 and the far end coupling is 0 for the purpose of simplifying the calculation.

Figure 39C:
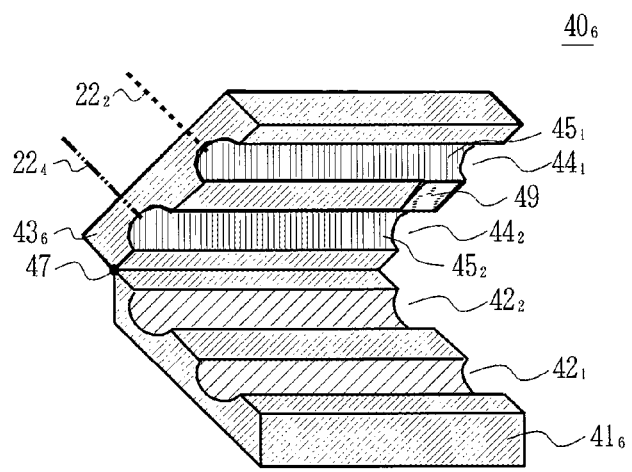

In this case, as illustrated in FIG. 39C, the coupler $40_6$ is provided with a bottom plate member $41_6$ in which a pair of semi-cylindrical trenches $42_1$ and $42_2$ are created and an upper lid member $43_6$ in which semi-cylindrical trenches $44_1$ and $44_2$ having coupling electrodes $45_1$ and $45_2$ on the inner surface are created. In addition, a linking unit 49 made of a good conductor for connecting the coupling electrodes $45_1$ and $45_2$ to each other is formed on the flat surface of the upper lid member $43_6$. In this case as well, the bottom plate member $41_6$ and the upper lid member $43_6$ are rotated around a hinge 47 so as to be layered on top of each other, and thus, cylindrical through holes through which covered wires $21_1$ and $21_3$ run are created.

Figure 40A:
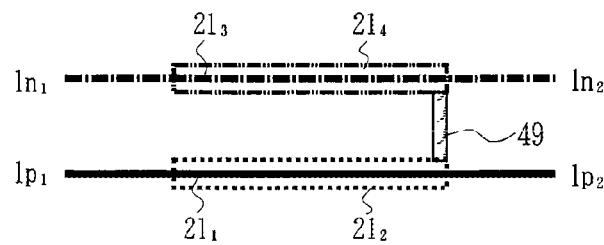
FIGS. 40A through 40E are a diagram and graphs illustrating a concrete operational principle (1)

FIGS. 40A through 41D are a diagram and graphs illustrating a concrete operational principle. FIG. 40A is a symbolic diagram illustrating a coupler, where a case where covered wires are linked on the right end is described.

Figure 40B:
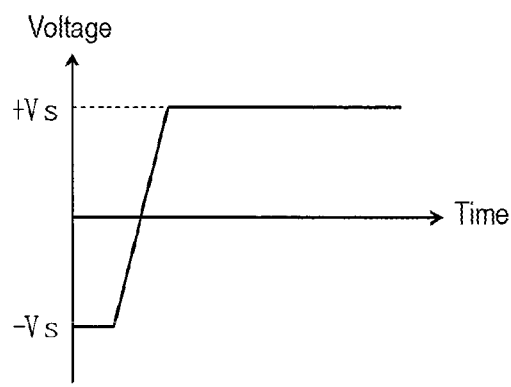
Figure 40C:
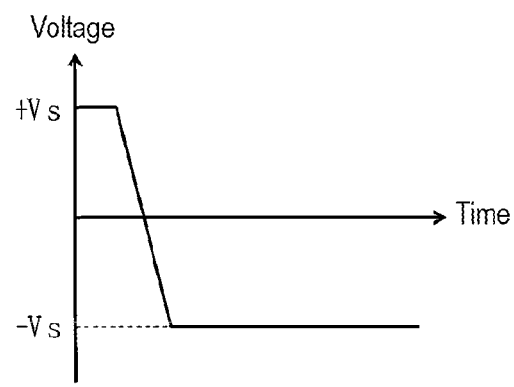

FIG. 40B is a waveform diagram illustrating one example of a positive signal, and FIG. 40C is a waveform diagram illustrating an example of a negative signal. When a positive signal from the covered wire $21_2$ propagates from the left end of the coupling unit towards the right end, a capacitive coupling current and an inductive coupling current are introduced so as to flow through the covered wire $21_1$. Furthermore, when a negative signal from the covered wire $21_4$ propagates through the covered wire $21_2$ from the right end towards the left end after passing through the linking unit, a capacitive coupling current and an inductive coupling current are also induced so as to flow through the covered wire $21_1$. As a result, an electromagnetic field coupling wave in a waveform as in FIG. 40D appears at the left end of the coupling unit along the covered wire $21_1$. In addition, an electromagnetic field coupling wave as that in FIG. 40E appears at the right end.

As for negative signals, when a negative signal from the covered wire $21_4$ propagates from the left end of the coupling unit towards the right end, a capacitive coupling current and an inductive coupling current are induced so as to flow through the covered wire $21_2$. Furthermore, when a positive signal from the covered wire $21_2$ propagates through the covered wire $21_4$ from the right end towards the left end after passing through the linking unit, a capacitive coupling current and an inductive coupling current are induced so as to flow through the covered wire $21_2$. As a result, an electromagnetic field coupling wave in such a waveform as in FIG. 41A appears at the left end of the coupling unit along the covered wire $21_2$. In addition, an electromagnetic field coupling wave as that in FIG. 42B appears at the right end.

Figure 40D:
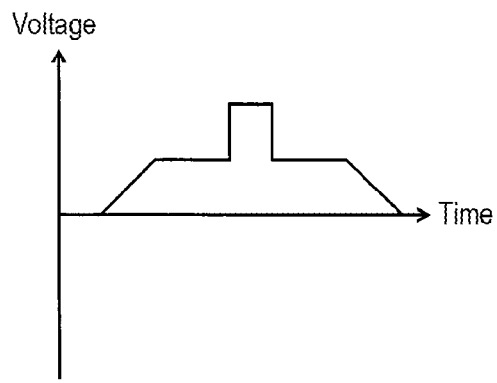
Figure 40E:
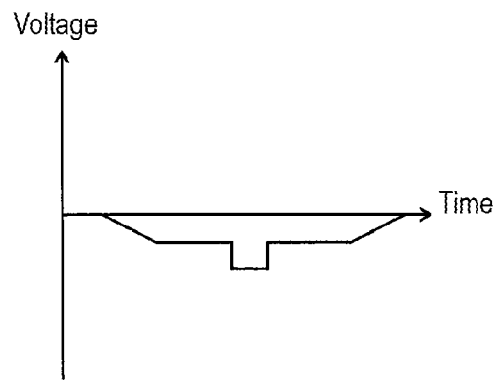
Figure 41A:
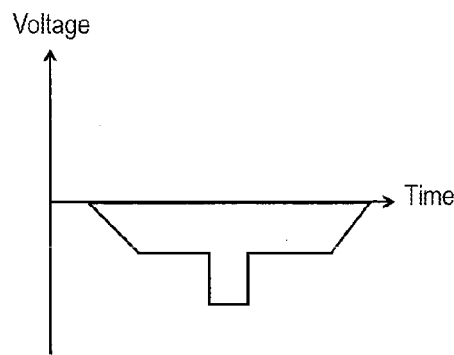
FIGS. 41A through 41D are graphs illustrating a concrete operational principle (2)
Figure 41B:
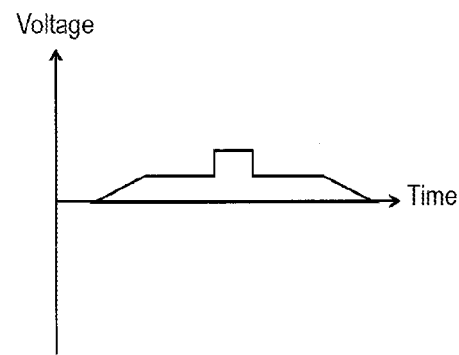
Figure 41C:
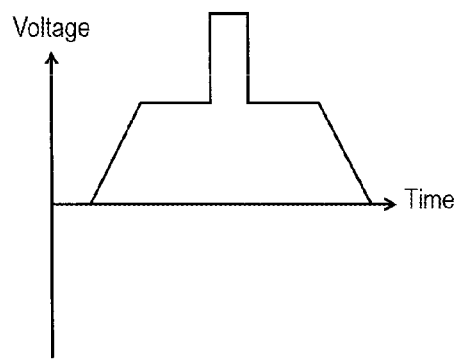
Figure 41D:
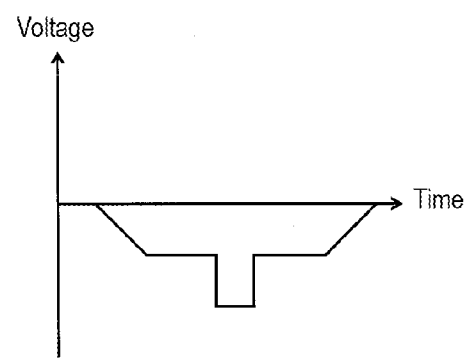

Accordingly, as illustrated in FIG. 41C, a waveform where a waveform that is gained by inverting the waveform in FIG. 41A and the waveform in FIG. 40D are superposed propagates at the left end as a differential signal. Meanwhile, as illustrated in FIG. 41D, a waveform where a waveform that is gained by inverting the waveform in FIG. 41B and the waveform in FIG. 40E are superposed propagates at the right end.

Figure 42:
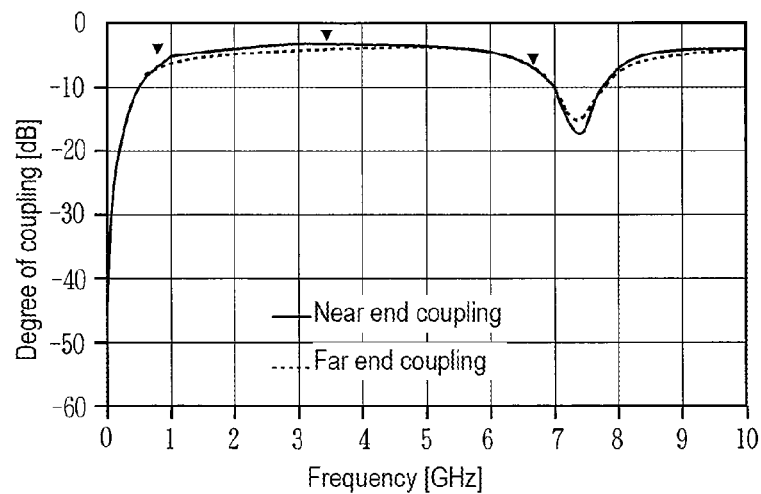
FIG. 42 is a graph illustrating the frequency characteristics of a coupler used in Example 10 of the present invention.

FIG. 42 is a graph illustrating the frequency characteristics of the coupler used in Example 10 of the present invention. It is confirmed that the band is broader as compared to the termination with the impedance being matched, and at the same time, the directionality is weaker. Incidentally, the degree of coupling at the point indicated by the inverted black triangles from the left to the right in the figure is −7.477 dB@0.810 GHz, −3.437 dB@3.410 GHz and −7.297 dB@6.660 GHz.

Figure 43A:
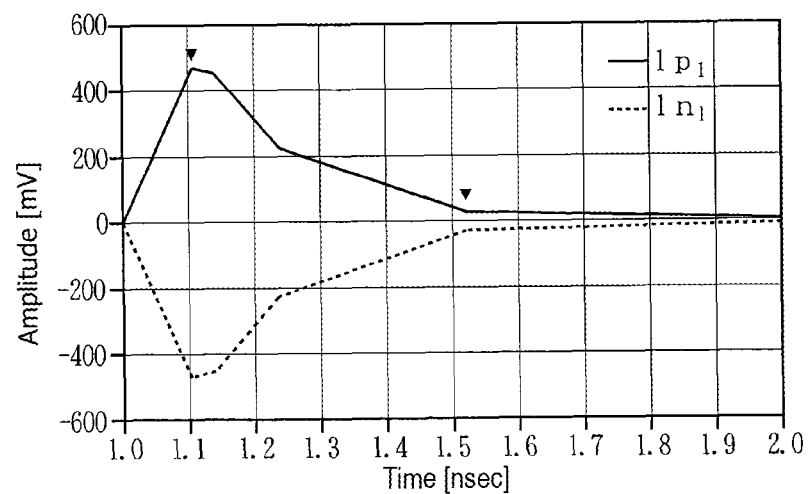
FIGS. 43A and 43B are graphs illustrating the operational waves of a coupler used in Example 10 of the present invention.
Figure 43B:
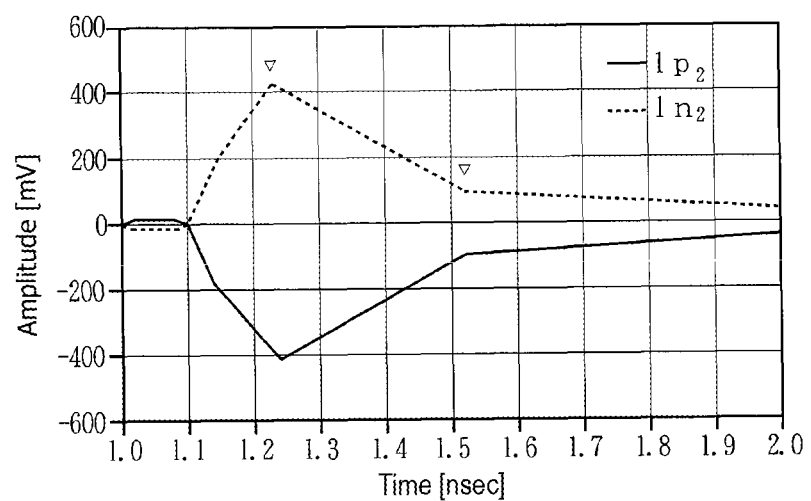

FIGS. 43A and 43B are graphs illustrating the operational waveform of the coupler used in Example 10 of the present invention, where the results of electromagnetic field simulation are illustrated in the case where a step signal having an amplitude of 1V is applied during a rise time of 100 psec after 1 nsec. As illustrated in FIG. 43A, only the polarities of the amplitudes of $1p_1$ and $1n_1$ that propagate towards the left of the coupler $40_6$ are opposite, and it can be seen that a pulse signal of which the amplitude is approximately ½ of that of the inputted step signal propagates. Incidentally, the amplitude at the points indicated by the inverted black triangles from the left to the right in the figure is 0.4682 V@1.111 nsec and 31.65 mV@1.520 nsec.

Meanwhile, as illustrated in FIG. 43B, the amplitudes of $1p_2$ and $1n_2$ that propagate towards the right of the coupler $40_6$ are small, and the polarities thereof are opposite to those of the signals that propagate in the directions toward $1p_1$ and $1n_1$. Incidentally, the amplitude at the points indicated by the inverted white triangles from the left to the right in the figure is 0.4107 V@1.236 nsec and 95.79 mV@1.520 nsec.

Thus, end portions of the pair of coupling electrodes in the coupler $40_6$ are linked to each other, and thereby it becomes possible to effectively use a signal that has been discarded through the terminal resistor in the far end coupling unit even though the intensity thereof is ½ of that in the near end coupling unit, and the polarity thereof is opposite.

EXAMPLE 11

Figure 44A:
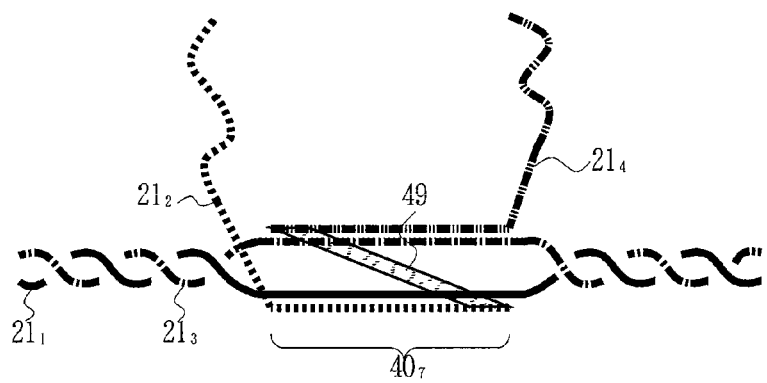
FIGS. 44A through 44C are diagrams illustrating a coupling unit of the differential type covered wire coupling type information communication network according to Example 11 of the present invention.

Next, the differential type covered wire coupling type information communication network according to Example 11 of the present invention is described in reference to FIGS. 44A through 48B, where only the coupling unit is described. FIGS. 44A through 44C are diagrams illustrating the coupling unit of the differential type covered wire coupling type information communication network according to Example 11 of the present invention. FIG. 44A is a schematic diagram illustrating the configuration, FIG. 44B is a symbolic diagram illustrating the propagation state of a signal, and FIG. 44C is a perspective diagram illustrating a coupler. As illustrated in FIG. 44A, when the end portions of the covered wires $21_2$ and $21_4$ are linked using a good conductor in the coupler $40_7$ according to Example 11 of the present invention, a pair of coupling electrodes in the coupler $40_7$ are arranged opposite to each other in terms of the positive electrodes and the negative electrodes so as to be linked through a linking unit 49.

Figure 44B:
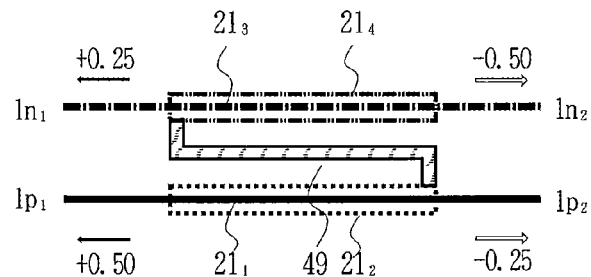

In this case, as illustrated in FIG. 44B, as for the ideal propagation state of signals, ½ of a positive signal that has entered from the covered wire $21_2$ and that propagates in the rightward direction propagates in the direction towards $1p_1$ (in the leftward direction) when propagating through the covered wire $21_1$ in the coupling unit and does not propagate in the direction towards $1p_2$ (in the rightward direction). When the remaining ½ of the signal propagates through the covered wire $21_4$ in the rightward direction via the linking unit 49, ¼ of the signal, which is ½ of the ½ signal, propagates through the covered wire $21_3$ in the direction towards $1n_1$ and does not propagate towards $1n_2$. A negative signal that has entered from the covered wire $21_4$ propagates in the same manner as the positive signal only with the polarity being opposite and the propagation direction being inverted. Accordingly, signals having the same amplitude and the same polarity propagate through the covered wires $21_1$ and $21_3$ that make a differential pair in the leftward and rightward directions. Here, calculation is carried out by assuming that the near end coupling is 0.5 and the far end coupling is 0 for the purpose of simplifying the calculation.

Figure 44C:
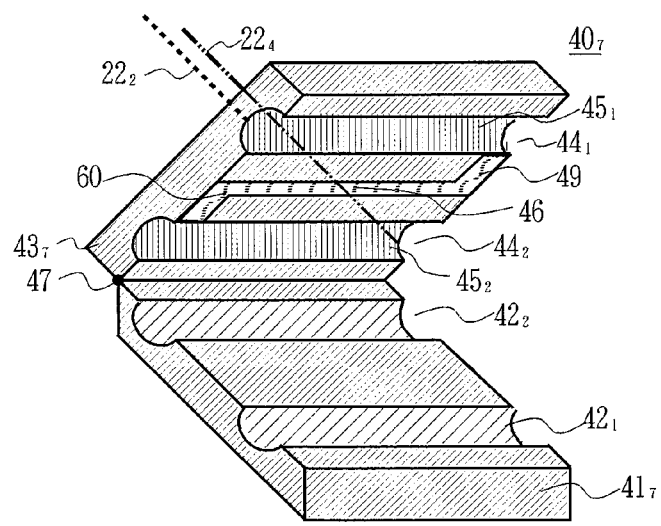

FIG. 44C is a perspective diagram illustrating the coupler. The coupler $40_7$ is provided with a bottom plate member $41_7$ in which a pair of semi-cylindrical trenches $42_1$ and $42_2$ are created and an upper lid member $43_7$ in which semi-cylindrical trenches $44_1$ and $44_2$ having coupling electrodes $45_1$ and $45_2$ on the inner surface are created. In addition, a linking unit 49 for connecting the coupling electrodes $45_1$ and $45_2$ through a good conductor is formed on the flat surface of the upper lid member $43_7$. In this case, it is necessary for the coupling electrodes $45_1$, $45_2$ and the linking unit 49 to have a sufficient distance between them in order to reduce electromagnetic interference between the coupling electrodes $45_1$, $45_2$ and the linking unit 49. Accordingly, the coupler $40_7$ is broad in the same manner as the coupler $40_2$ in FIG. 23C.

FIGS. 45A through 46D are a diagram and graphs illustrating a concrete operational principle. The waveform of the signal that propagates in the direction towards $1p_1$ as in FIG. 45D and the waveform of the signal that propagates in the direction towards $1p_2$ as in FIG. 45E are the same as in Example 10. Meanwhile, the waveform of the signal that propagates in the direction towards $1n_1$ as in FIG. 46A and the waveform of the signal that propagates in the direction towards $1n_2$ as in FIG. 46B have the same polarities as in Example 10, but the propagation directions are opposite to those in Example 10.

Figure 45A:
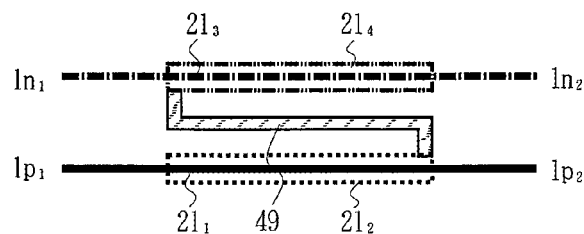
FIGS. 45A through 45E are a diagram and graphs illustrating a concrete operational principle (1)
Figure 45B:
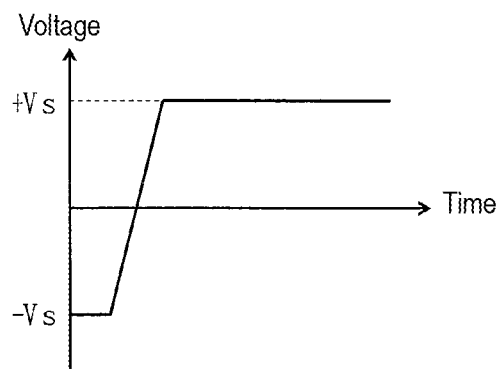
Figure 45C:
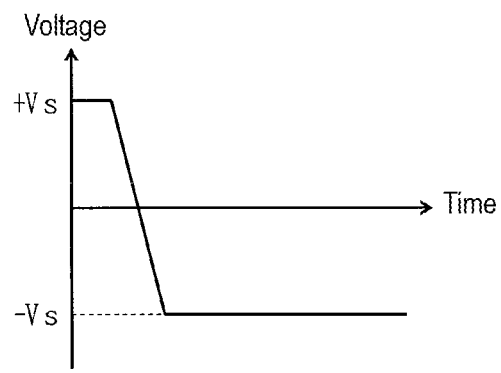
Figure 45D:
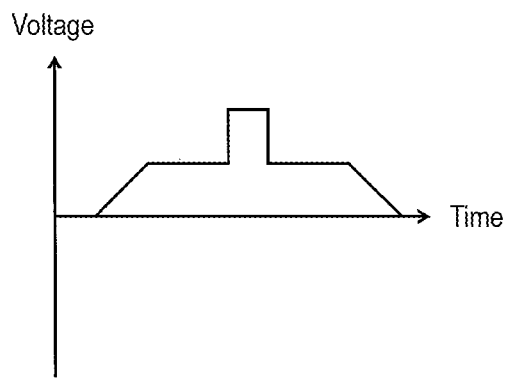
Figure 45E:
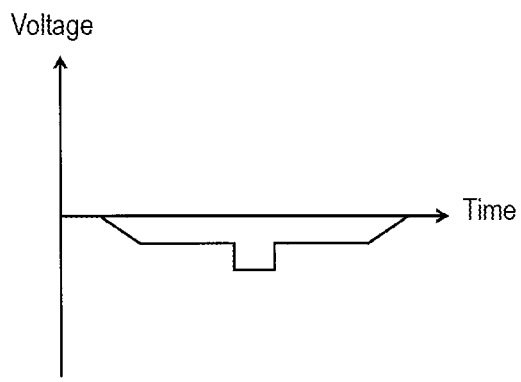

Accordingly, as illustrated in FIG. 46C, a waveform where a waveform that is gained by inverting the waveform in FIG. 46A and the waveform in FIG. 45D are superposed propagates at the left end as a differential signal. Meanwhile, as illustrated in FIG. 46D, a waveform where a waveform that is gained by inverting the waveform in FIG. 46B and the waveform in FIG. 45E are superposed propagates at the right end. The resulting coupler provides a propagating signal of which the amplitude is smaller than that in Example 10 but is the same between the left and right with the same polarity.

FIG. 47 is a graph illustrating the frequency characteristics of the coupler used in Example 11 of the present invention. The curve for the near end coupling and the curve for the far end coupling overlap, and it is confirmed that signals propagate with the same amplitude between the left and the right and with the same polarity. Incidentally, the degree of coupling at the points indicated by the inverted black triangles from the left to the right in the figure is −6.734 dB@1.160 GHz, −3.909 dB@2.060 GHz and −6.649 dB@2.910 GHz.

Figure 48A:
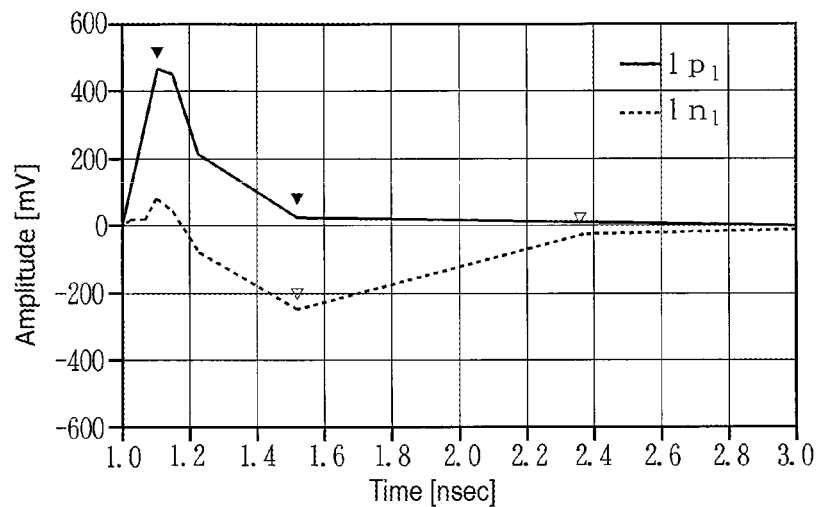
FIGS. 48A and 48B are graphs illustrating the operational waves of a coupler used in Example 11 of the present invention.
Figure 48B:
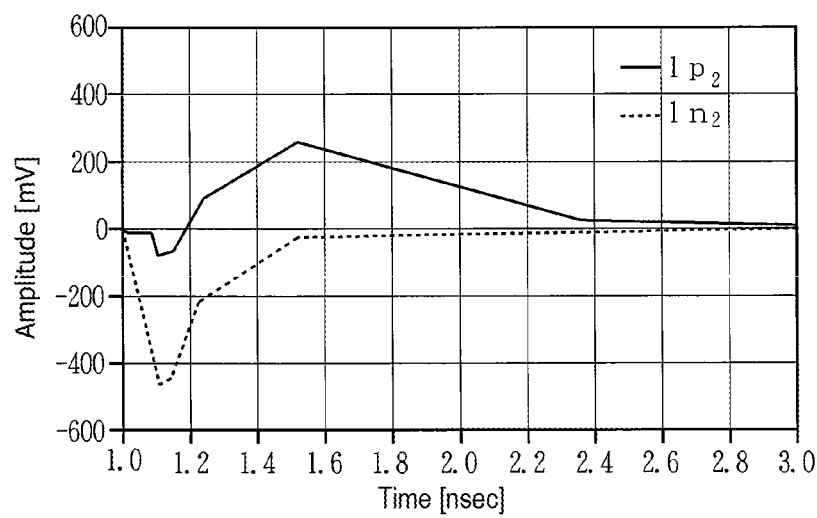

FIGS. 48A and 48B are graphs illustrating the operational waveforms of the coupler used in Example 11 of the present invention, where the results of electromagnetic field simulation are also illustrated in the case where a step signal having an amplitude of 1V is applied during a rise time of 100 psec after 1 nsec. As illustrated in FIG. 48A, $1p_1$ that propagates towards the left of the coupler $40_7$ is approximately the same as that in Example 10, while the waveform that propagates in the direction towards $1n_1$ becomes a signal of the opposite polarity having a small amplitude and a delayed phase. Incidentally, the amplitude at the points indicated by the inverted black triangles from the left to the right in the figure is 0.4667 V@1.111 nsec and 22.81 mV@1.520 nsec. In addition, the amplitude at the points indicated by the inverted white triangles from the left to the right in the figure is −245.2 mV@1.520 nsec and −25.76 mV@2.370 nsec. Meanwhile, as illustrated in FIG. 48B, the amplitudes of $1p_2$ and $1n_2$ that propagate towards the right of the coupler $40_7$ form a waveform of the signal that is obtained by inverting $1p_1$ and $1n_1$ in FIG. 48A.

Thus, a pair of coupling electrodes in the coupler $40_7$ are arranged opposite to each other in terms of the positive electrodes and the negative electrodes so as to be linked through the linking unit 49, and as a result, it becomes possible to propagate a signal having the same amplitude between the left and the right with the same polarity.

Figure 49A:
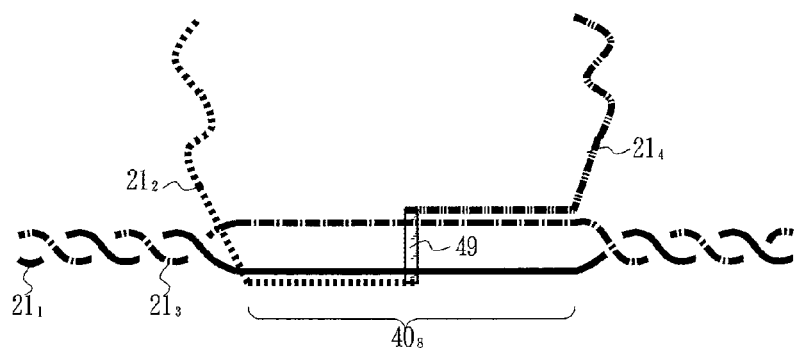
FIGS. 49A through 49C are diagrams illustrating a modification of the coupling unit of the differential type covered wire coupling type information communication network according to Example 11 of the present invention.
Figure 49B:
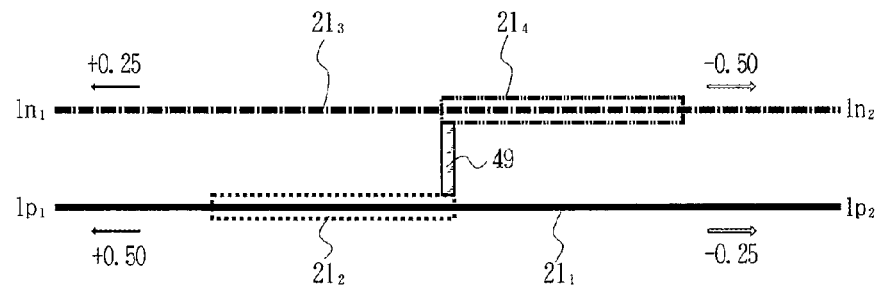
Figure 49C:
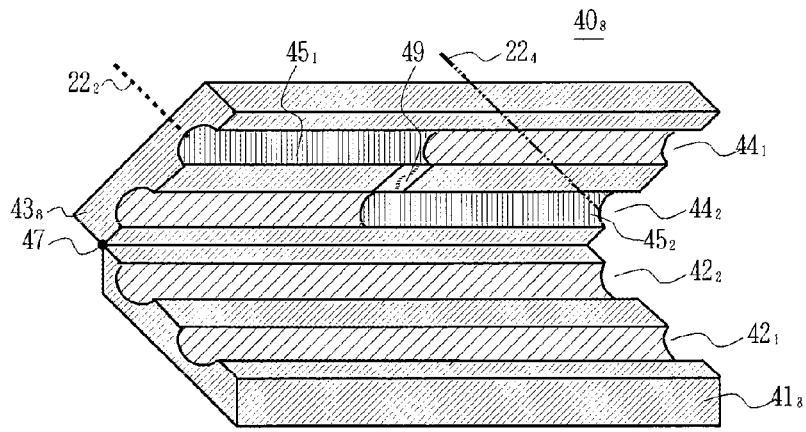

Next, a coupling unit of the differential type covered wire coupling type information communication network according to a modification of Example 11 of the present invention is described in reference to FIGS. 49A through 49C. FIGS. 49A through 49C are diagrams illustrating a coupling unit of the differential type covered wire coupling type information communication network according to a modification of Example 11 of the present invention. FIG. 49A is a schematic diagram illustrating the configuration, FIG. 49B is a symbolic diagram illustrating the propagation state of a signal, and FIG. 49C is a perspective diagram illustrating a coupler.

As illustrated in FIG. 49A, in the coupler $40_8$ according to the modification of Example 11 of the present invention, a pair of coupling electrodes in the coupler $40_8$ are arranged opposite to each other in terms of the positive electrodes and the negative electrodes so as to be linked through the linking unit 49 made of a good conductor in such a position that the end portions of the covered wires $21_2$ and $21_4$ are aligned. In this case, as illustrated in FIG. 49B, the propagation state of a signal is the same as in Example 10 illustrated in FIG. 44B.

FIG. 49C is a perspective diagram illustrating the coupler. The coupler $40_8$ is provided with a bottom plate member $41_8$ in which a pair of semi-cylindrical trenches $42_1$ and $42_2$ are created and an upper lid member $43_8$ in which semi-cylindrical trenches $44_1$ and $44_2$ having coupling electrodes $45_1$ and $45_2$ on the inner surface are created. Here, one coupling electrode $45_1$ is provided in the left half of the trench $44_1$, the other coupling electrode $45_2$ is provided in the right half of the trench $44_2$, and the two are connected through a good conductor so as to form a linking unit 49 in the center portion. Accordingly, it is not necessary to take into consideration electromagnetic interference between the coupling electrodes $45_1$, $45_2$ and the linking unit 49.

EXAMPLE 12

Figure 50:
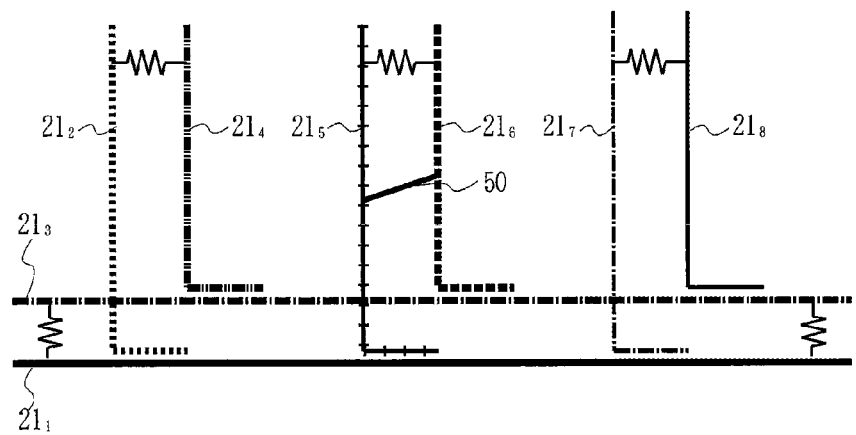
FIG. 50 is a symbolic diagram illustrating a coupling unit of the covered wire coupling type information communication network according to Example 12 of the present invention.

Next, the covered wire coupling type information communication network according to Example 12 of the present invention is described in reference to FIG. 50. FIG. 50 is a symbolic diagram illustrating the coupling unit of the covered wire coupling type information communication network according to Example 12 of the present invention, where a pair of differential covered wires $21_1$ and $21_3$ are used as a bus with which three differential pairs (($21_2$, $21_4$), ($21_5$, $21_6$), ($21_7$, $21_8$)) achieve electromagnetic field coupling at different coupling locations.

In this case, data connection is achieved between the respective differential pairs via the bus. Even in the case where a short circuit 50 occurs in one differential pair, the electromagnetic field coupling connector that becomes the coupling unit does not allow a direct current signal to flow, and therefore, the short circuit does not affect the entirety of the network, unlike mechanical connectors. Accordingly, this is appropriate for an application to the LAN such as in an automobile or an airplane where high reliability is required.

EXAMPLE 13

Figure 51A:
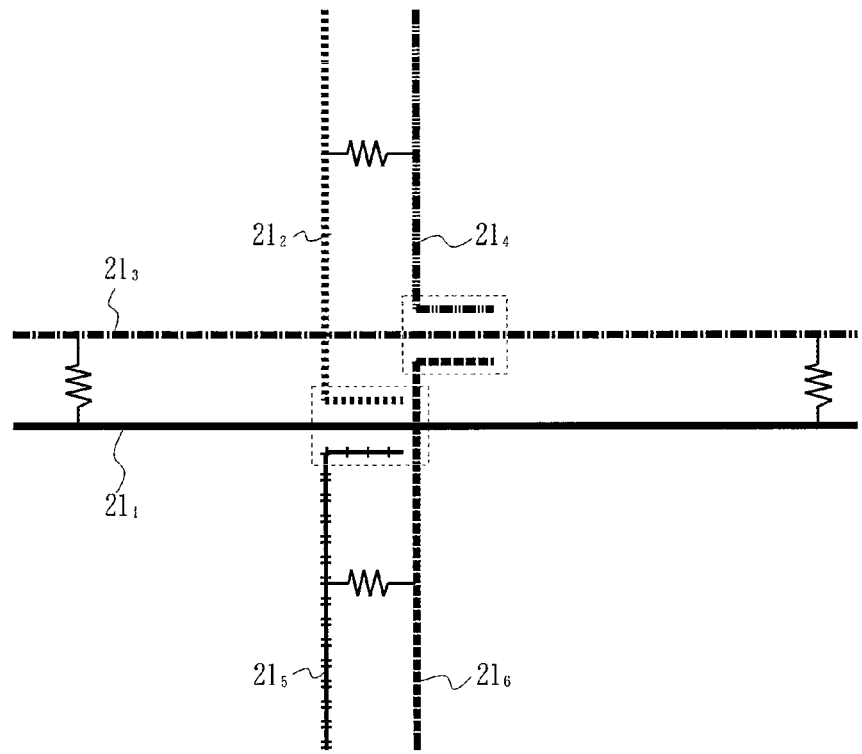
FIGS. 51A and 51B are diagrams illustrating a coupling unit of the covered wire coupling type information communication network according to Example 13 of the present invention.

Next, the covered wire coupling type information communication network according to Example 13 of the present invention is described in reference to FIGS. 51A through 53B. FIGS. 51A and 51B are diagrams illustrating the coupling unit of the covered wire coupling type information communication network according to Example 13 of the present invention. FIG. 51A is a symbolic diagram, and FIG. 51B is a schematic cross-sectional diagram illustrating the coupling unit. As illustrated in FIG. 51A, one pair of differential covered wires $21_1$ and $21_3$ is used as a bus with which two differential pairs (($21_2$, $21_4$), ($21_5$, $21_6$)) achieve electromagnetic field coupling at the same coupling location.

Figure 51B:
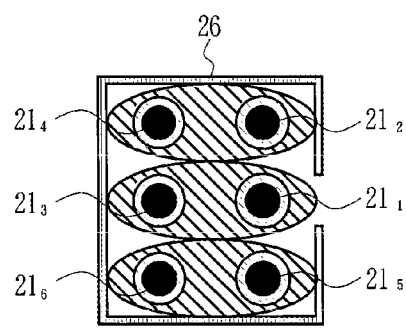

Thus, in the case where electromagnetic field coupling is achieved at the same location, as illustrated in FIG. 51B, three differential pairs of covered wires (($21_2$, $21_4$), ($21_1$, $21_3$), ($21_5$, $21_6$)) may be connected by pressure using a caulking fixture 26.

In the coupling state, as in FIG. 51B, the same data that propagates through the differential pair of covered wires $21_1$ and $21_3$ that works as a bus can be sent to the differential pair of covered wires $21_2$ and $21_4$ and to the differential pair of covered wires $21_5$ and $21_6$ at the same time.

Figure 52A:
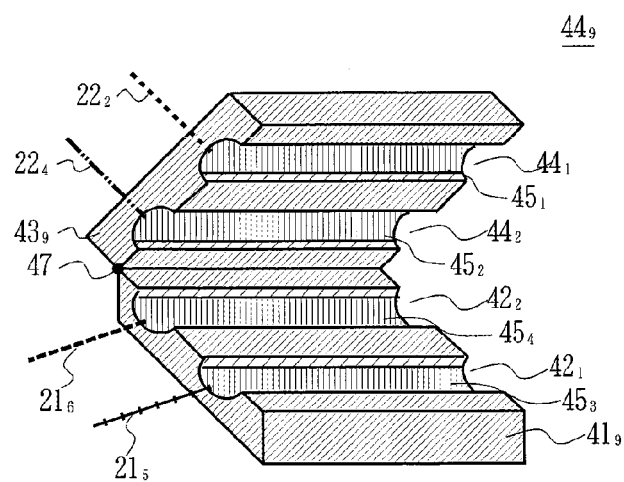
FIGS. 52A and 52B are diagrams illustrating a case where a coupler is used.
Figure 52B:
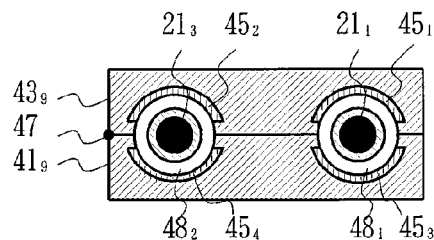

FIGS. 52A and 52B are diagrams illustrating a case where a coupler is used. FIG. 52A is a perspective diagram illustrating a coupler, and FIG. 52B is a schematic cross-sectional diagram illustrating the coupling state. In this case, as illustrated in FIG. 52A, the coupler $40_9$ is provided with a bottom plate member $41_9$ in which a pair of semi-cylindrical trenches $42_1$ and $42_2$ having coupling electrodes $45_3$ and $45_4$ on the inner surface are created and an upper lid member $43_9$ in which semi-cylindrical trenches $44_1$ and $44_2$ having coupling electrodes $45_1$ and $45_2$ on the inner surface are created. The coupling electrodes $45_3$ and $45_4$ in the bottom plate member $41_9$ correspond to the covered wires $21_2$ and $21_4$, and the coupling electrodes $45_1$ and $45_2$ provided in the upper lid member $43_9$ correspond to the covered wires $21_5$ and $21_6$. In this case as well, the bottom plate member $41_9$ and the upper lid member $43_9$ are rotated around a hinge 47 so as to be layered on top of each other so that cylindrical through holes $48_1$ and $48_2$ through which the covered wires $21_1$ and $21_3$ run are created.

Figure 53A:
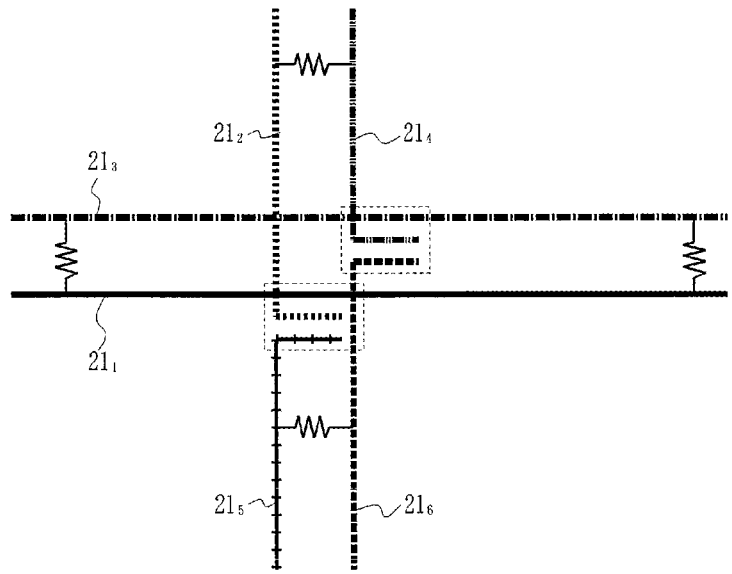
FIGS. 53A and 53B are diagrams illustrating a modification of a coupling unit of the covered wire coupling type information communication network according to Example 13 of the present invention.
Figure 53B:
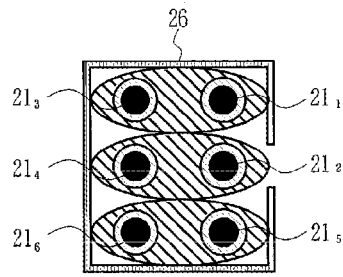

FIGS. 53A and 53B are diagrams illustrating the coupling unit of the covered wire coupling type information communication network according to a modification of Example 13 of the present invention. FIG. 53A is a symbolic diagram, and FIG. 53B is a schematic cross-sectional diagram illustrating the coupling unit. As illustrated in FIG. 53A, one pair of differential covered wires $21_1$ and $21_3$ is used as a bus with which two differential pairs (($21_2$, $21_4$), ($21_5$, $21_6$)) achieve electromagnetic field coupling in the same coupling locations. At this time, layers are layered in the order of ($21_1$, $21_3$)/($21_2$, $21_4$)/($21_5$, $21_6$).

In the case where electromagnetic field coupling is achieved between the covered wires layered in this order, as illustrated in FIG. 53B, three differential pairs of covered wires (($21_1$, $21_3$), ($21_2$, $21_4$), ($21_5$, $21_6$)) may be layered on top of each other in the order of ($21_1$, $21_3$)/($21_2$, $21_4$)/($21_5$, $21_6$), and after that may be connected by pressure using a caulking fixture 26.

In the coupling state, as in FIG. 53B, the same data that propagates through the differential pair of covered wires $21_1$ and $21_3$ that work as a bus can be sent to the differential pair of covered wires $21_2$ and $21_4$ and the differential pair of covered wires $21_5$ and $21_6$. In this case, the signal that is transferred to the differential pair of covered wires $21_5$ and $21_6$ is weaker than the signal that is transferred to the differential pair of covered wires $21_2$ and $21_4$.

EXAMPLE 14

Figure 54:
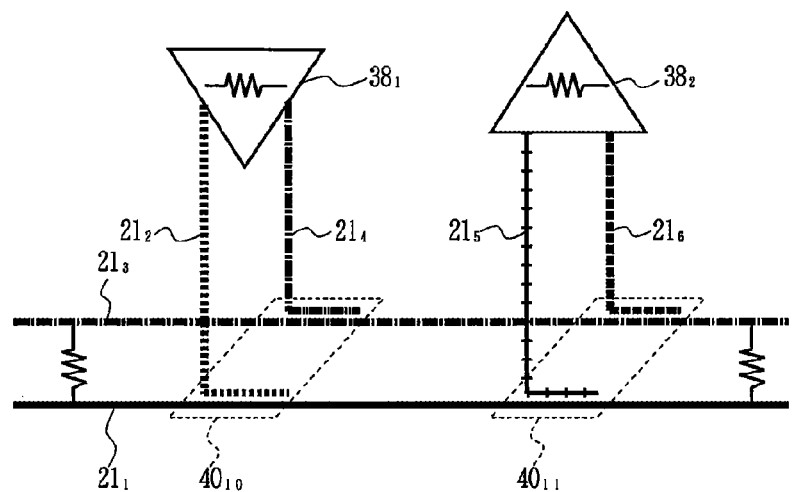
FIG. 54 is a symbolic diagram illustrating a coupling unit of the covered wire coupling type information communication network according to Example 14 of the present invention.
Figure 55A:
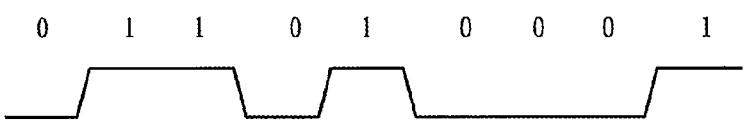
FIGS. 55A through 55D are graphs illustrating transmission/reception waves.
Figure 55B:
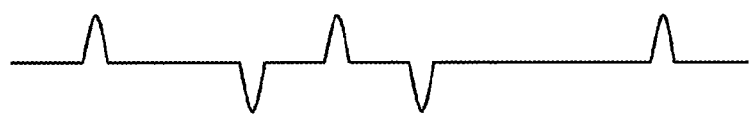
Figure 55C:
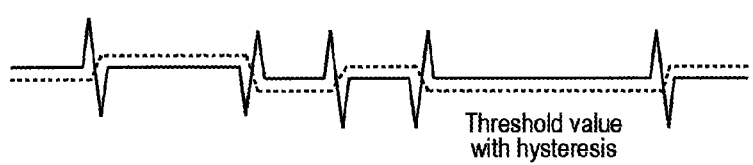
Figure 55D:
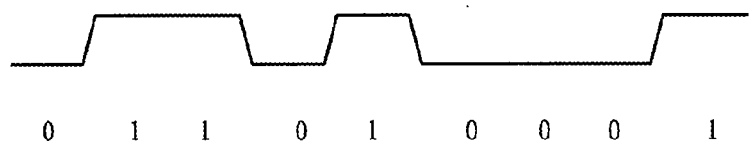

Next, the covered wire coupling type information communication network according to Example 14 of the present invention is described in reference to FIGS. 54 through 55D. Example 14 relates to a method for transmitting/decoding a signal. FIG. 54 is a symbolic diagram illustrating the coupling unit of the covered wire coupling type information communication network according to Example 14 of the present invention, where the pair of covered wires $21_1$ and $21_3$ is used as a bus with which two differential pairs (($21_2$, $21_4$), ($21_5$, $21_6$)) achieve electromagnetic field coupling using couplers $40_{10}$ and $40_{11}$ at different coupling locations. In Example 14, a transmitter/receiver $38_1$ as in FIG. 20 is connected to the differential pair made of covered wires $21_2$ and $21_4$, and a transmitter/receiver $38_2$ as in FIG. 20 is connected to the differential pair made of covered wires $21_5$ and $21_6$. For the purpose of making the functions easier to understand, the transmitter/receiver $38_1$ on the transmission side is represented by a transmitter symbol, and the transmitter/receiver $38_2$ on the receiver side is represented by a receiver symbol.

FIGS. 55A through 55D are graphs illustrating a transmission/reception waveform. FIG. 55A illustrates a digital signal waveform of NRZ (non-return to zero) from the transmitter/receiver $38_1$. FIG. 55B illustrates an output waveform from the coupler $40_{10}$, which is a waveform gained by differentiating the digital signal. FIG. 55C illustrates an output waveform from the coupler $40_{11}$, which is a waveform gained by further differentiating the output in FIG. 55B. FIG. 55D illustrates a waveform of the signal received by the transmitter/receiver $38_2$, which is the decoded digital signal by using the threshold value with hysteresis as in FIG. 55C in the transmitter/receiver $38_2$ so as to determine the polarity of the output waveform from the coupler $40_{11}$.

EXAMPLE 15

Figure 56:
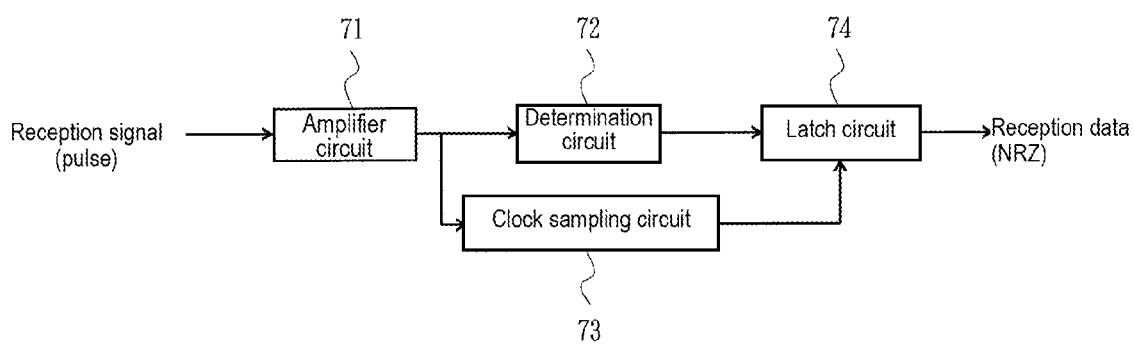
FIG. 56 is a schematic circuit block diagram on the reception side according to Example 15 of the present invention.
Figure 57A:
FIGS. 57A through 57E are graphs illustrating transmission/reception waves.
Figure 57B:
Figure 57C:
Figure 57D:
Figure 57E:
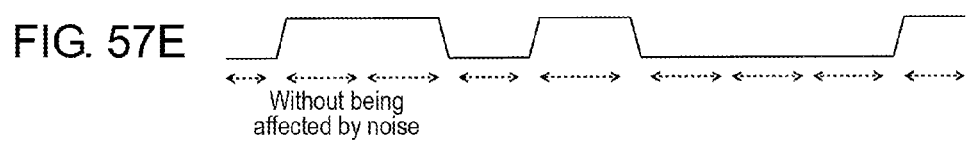

Next, the covered wire coupling type information communication network according to Example 15 of the present invention is described in reference to FIGS. 56 through 57E. Example 15 also relates to a method for transmitting/decoding a signal, which is gained by improving the transmission/decoding method in Example 14. That is to say, in the case of the method in Example 14, such a problem arises that transmission is not carried out with the resistance to noise deteriorating when the same bit (0 or 1) continues. In addition, the rhythm of the data transmission is not constant, which causes such a problem that clock sampling becomes more difficult. Here, the coupling state is the same as that in Example 14 as illustrated in FIG. 54.

Thus, transmission is carried out after 8 bit-10 bit encoding or Manchester encoding so that the same bit does not continue for many bits on the transmission side. On the reception side, a clock signal that is sampled by the clock sampling circuit is used to latch data, and thus, the resistance to noise is increased.

FIG. 56 is a conceptual block diagram illustrating the circuit on the reception side according to Example 15 of the present invention, where an amplifier circuit 71 for amplifying a received signal, a determination circuit 72 for determining the polarity of the amplified signal, and a clock sampling circuit 73 for sampling a clock from the amplified signal are provided so that the outputs from the two are inputted into a latch circuit 74 so as to decode the received data.

FIGS. 57A through 57E are graphs illustrating a transmission/reception waveform. FIG. 57A illustrates a digital signal waveform of NRZ (non-return to zero) that has been inputted into the transmitter/receiver $38_1$. FIG. 57B illustrates a transmission waveform that has been Manchester encoded. FIG. 57C illustrates a waveform of a transmission signal that has been outputted from the transmitter/receiver $38_1$. FIGS. 55B and 55C illustrate the same waveforms as the one that is gained by differentiating this transmission signal as being outputted from the coupler $40_{10}$, and the other one that is gained after that by further differentiating the transmission signal as being outputted from the coupler $40_{11}$. FIG. 57D illustrates a clock waveform that has been sampled by the clock sampling circuit in the transmitter/receiver $38_2$. FIG. 57E illustrates a received data waveform that is gained by decoding the reception signal that has been Manchester encoded using a clock waveform.

As illustrated in FIGS. 57A through 57E, the transmission signal is Manchester encoded, and at the same time, a clock is sampled from the received signal for decoding, and therefore, decoding is possible without being affected by noise even when the same bit continues.

EXAMPLE 16

Figure 58:
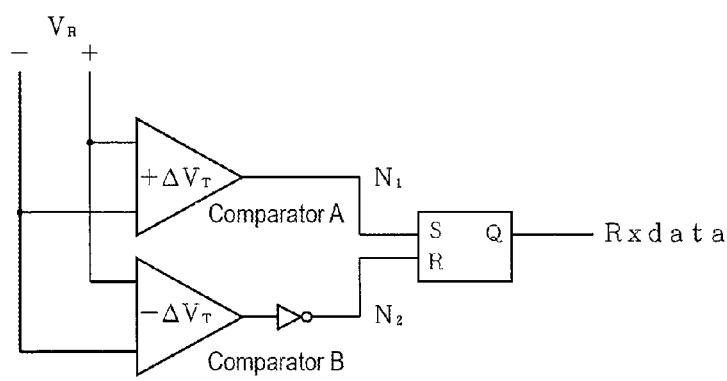
FIG. 58 is a diagram illustrating a reception circuit used in Example 16 of the present invention.
Figure 59A:
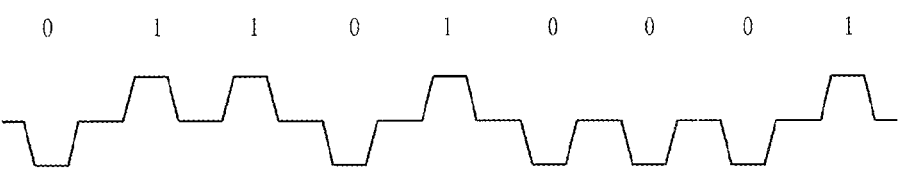
FIGS. 59A through 59D are graphs illustrating transmission/reception waves.
Figure 59B:
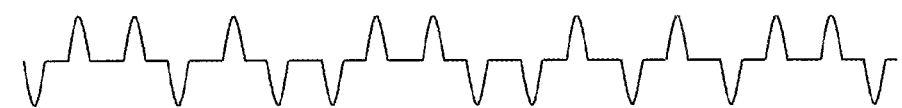
Figure 59C:
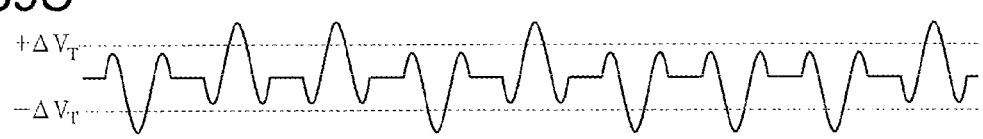
Figure 59D:
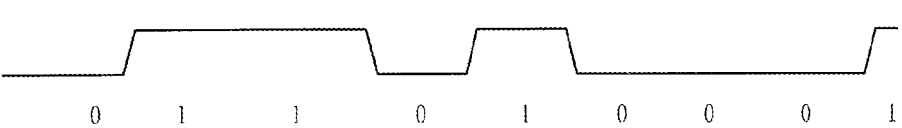

Next, the covered wire coupling type information communication network according to Example 16 of the present invention is described in reference to FIGS. 58 through 59D. Example 16 also relates to a method for transmitting/decoding a signal that is gained by improving the transmission/decoding method in Example 14 or Example 15. That is to say, according to the method in Example 14 or Example 15, in the case where the data transfer rate is slow, that is to say, in the case where it takes a long time before the next data is transmitted, the state where the transmission current keeps flowing is maintained, which makes the transmission power constant in spite of the fact that the data transmission rate is slow, and thus, it is difficult to reduce the power consumption.

In Example 16, however, the transmission waveform is made to be a short pulse so that the time during which the transmission current flows is made short and constant irrelevant of the data transfer rate. No transmission current flows before the next data is transferred, and therefore, the transmission power can be reduced when the data transfer rate is slow by the amount in proportion to how slow the rate is.

FIG. 58 is a diagram illustrating the reception circuit used in Example 16 of the present invention, where a determination circuit is formed of two comparator circuits. As described below, in reference to FIGS. 59A through 59D, when a short pulse passes through the coupler in the present invention twice for transmission and reception, the signal waveform is secondary differentiated so as to become a bipolar pulse signal as in FIG. 59C. In order to receive this bipolar pulse signal, a reception circuit having two comparators where threshold values $+\Delta V_t$ and $-\Delta V_t$ are set become necessary. Here, the coupling state is the same as the coupling state in Example 14 as illustrated in FIG. 54.

FIGS. 59A through 59D are graphs illustrating the transmission/reception waveforms. FIG. 59A illustrates a pulse signal waveform of which the polarity is in response to the digital signal from the transmitter/receiver $38_1$. FIG. 59B illustrates the output waveform from the coupler $40_{10}$, which is a waveform gained by differentiating a pulse waveform. FIG. 59C illustrates a bipolar pulse signal waveform that has been induced in the covered wires $21_5$ and $21_6$. FIG. 59D illustrates the original digital signal that has been decoded from the bipolar pulse signal waveform in FIG. 59C by determining the polarity thereof through the comparison with the threshold values $+\Delta V_t$ and $-\Delta V_t$ that had been set in the two comparators.

EXAMPLE 17

Figure 60A:
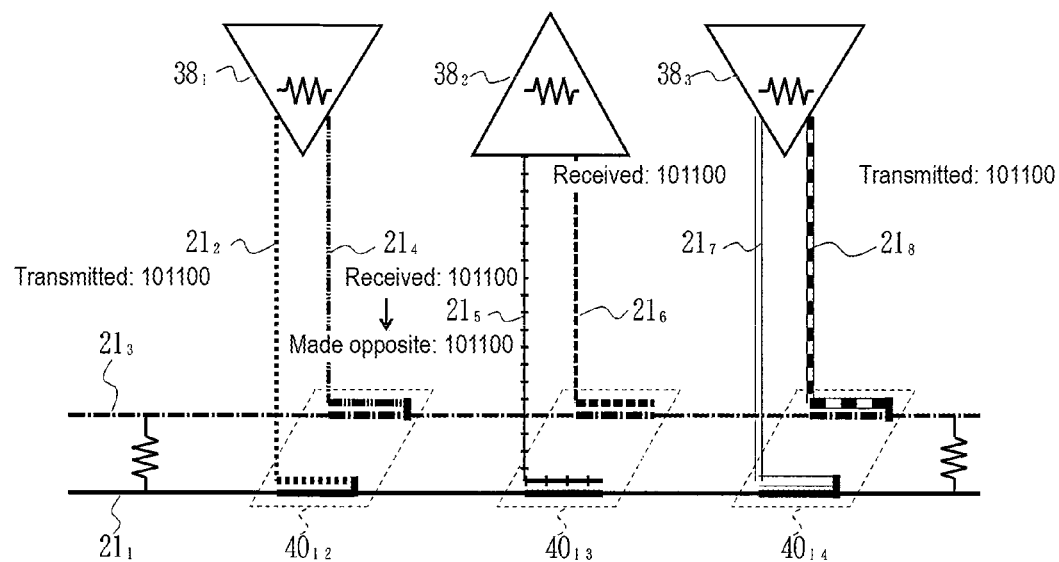
FIGS. 60A through 60C are a graph and diagrams illustrating the covered wire coupling type information communication network according to Example 17 of the present invention.
Figure 60B:
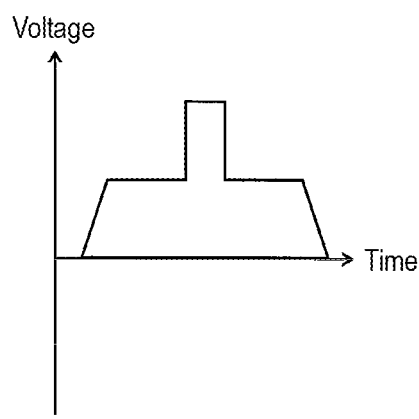
Figure 60C:
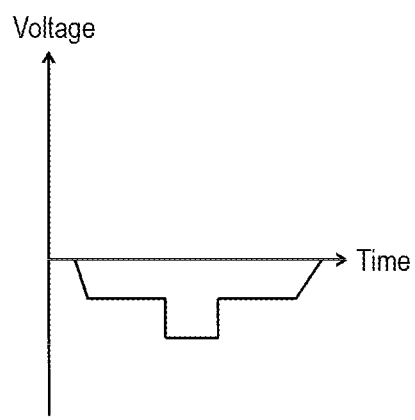
Figure 61A:
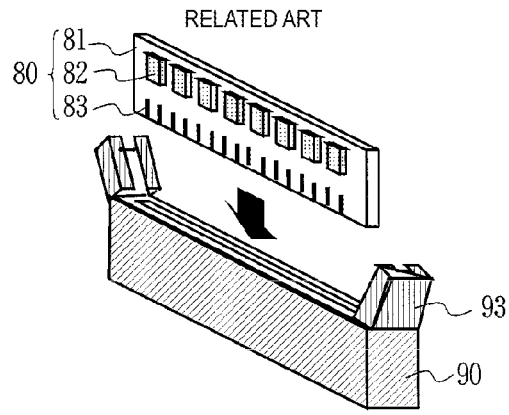
FIGS. 61A through 61C are diagrams illustrating a coupling mechanism using a conventional mechanical connector.
Figure 61B:
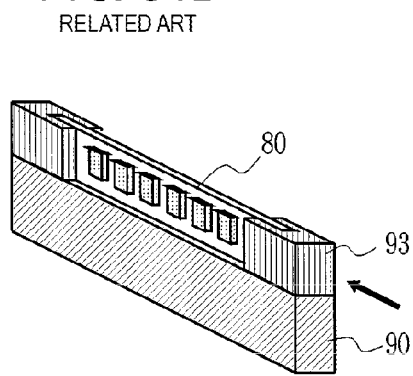
Figure 61C:
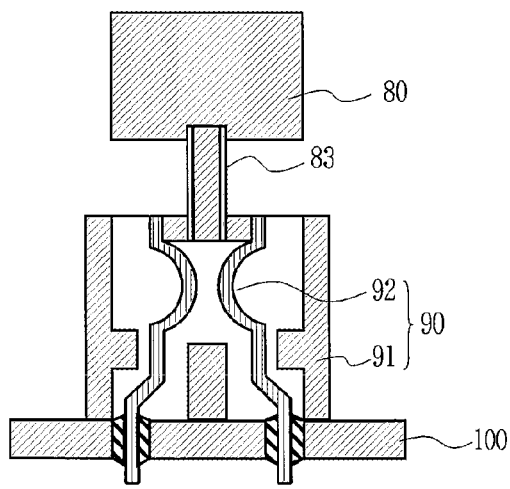
Figure 62:
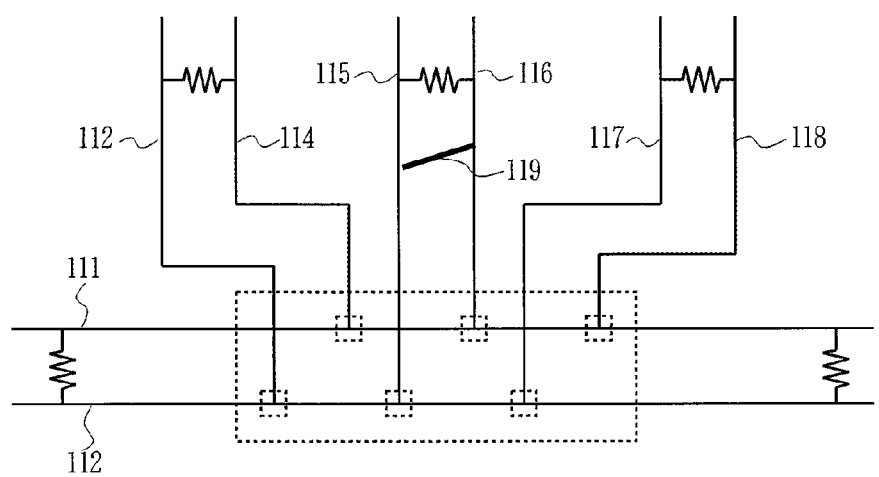
FIG. 62 is a diagram illustrating a short circuit.

Next, the covered wire coupling type information communication network according to Example 17 of the present invention is described in reference to FIGS. 60A through 60C. FIGS. 60A through 60C are a diagram and graphs illustrating the covered wire coupling type information communication network according to Example 17 of the present invention. FIG. 60A is a symbolic diagram illustrating the coupling state, and FIGS. 60B and 60C are graphs illustrating the reception signal. As illustrated in FIG. 60A, couplers $40_{12}$ and $40_{14}$ of which the coupling electrodes are linked on the right side are used as a coupler on the transmission side. Accordingly, the differential signal waveform that propagates from the differential pair made of the covered wires $21_7$ and $21_8$ that are connected on the right side towards the left is a waveform as in FIG. 60B. Meanwhile, the differential signal waveform that propagates from the differential pair made of the covered wires $21_2$ and $21_4$ towards the right is a waveform that is gained by inverting the differential signal waveform in FIG. 60B and by making the intensity ½ as illustrated in FIG. 60C.

Accordingly, as illustrated in FIG. 60A, in the case where the transmitter/receiver $38_2$ that is connected to the differential pair made of the covered wires $21_5$ and $21_6$ receives a pulse signal of 101100 from the transmitter/receiver $38_3$ that is connected to the differential pair on the right side, the pulse signal is received with the polarity being opposite, and therefore, an opposite pulse signal of 010011 is received. Meanwhile, in the case where the transmitter/receiver $38_1$ that is connected to the differential pair made of the covered wires $21_2$ and $21_4$ transmits a pulse signal of 101100, the polarity of the signal that propagates towards the right is made opposite by the coupler $40_{12}$, and therefore, a pulse signal of 010011 is sent. However, the transmitter/receiver $38_2$ receives signals from the left without making the polarity opposite, and therefore, the received signal remains as an opposite pulse signal of 010011. In either case, the transmitter/receiver $38_2$ receives an opposite pulse signal.

Thus, communication is carried out in advance by using a test signal so that the transmitter/receiver $38_2$ that functions as a receiver memorizes whether or not an opposite signal is received, and thus, the polarity of the received signal is further made opposite so as to return to the normal signal polarity in the case where an opposite signal is received. In this case, the polarity stays the same unless the direction or the connection order of the couplers are not changed, whichever the side the linking end of each coupler is on, and therefore, the polarity determination can be carried out once in order to receive data correctly afterwards.

EXPLANATION OF SYMBOLS $1_1$, $1_2$, $1_3$, $1_4$ covered wire
$2_1$, $2_2$, $2_3$, $2_4$ core conductor
$3_1$, $3_2$, $3_3$, $3_4$ insulator
4 coupling unit
5 coating insulator film
6 tape
7 caulking member
10 coupler
11 bottom plate member
$12_1$, $12_2$ trench
13 upper lid member
$14_1$, $14_2$ trench
$15_1$-$15_6$ coupling electrode
$16_1$-$16_6$ cylindrical through hole
17 hinge
18 center housing
$19_1$, $19_2$ side housing
$21_1$-$21_8$ covered wire $22_1$, $22_2$, $22_4$-$22_6$ core conductor
$23_1$, $23_2$ insulator
$24_1$, $24_2$ protective coating film
25 tape
26 caulking fixture
27 coupling unit
28, $28_1$-$28_4$ coupling electrodes
29 terminal resistor
30 coupler
31 bottom plate member
32 trench
33 upper lid member
34 trench
35 coupling electrode
36 cylindrical through hole
37 hinge
$38_1$-$38_3$ transmitter/receiver
$40_1$-$40_{14}$ coupler
$41_1$-$41_9$ bottom plate member
$42_1$, $42_2$ trench
$43_1$, $43_9$ upper lid member
$44_1$, $44_2$ trench
$45_1$-$45_4$ coupling electrode
46 terminal resistor
47 hinge
$48_1$-$48_6$ cylindrical through hole
49 linking unit
50 short circuit
60 connection wire
71 amplifier circuit
72 determination circuit
73 clock sampling circuit
74 latch circuit
80 memory module
81 substrate
82 memory element
83 connection terminal
90 DIMM connector
91 housing
92 spring member
93 fixture
100 circuit substrate
111, 112 bus
113-118 wire
119 short circuit

What is claimed is:

1. A covered wire coupling type information communication network, comprising:
   a first covered wire provided with a cylindrical inner conductor coated with an insulator; and
   a second covered wire provided with an inner conductor coated with an insulator, wherein
   the first covered wire and the second covered wire are placed in close proximity in a first electromagnetic field coupling unit so that data connection is achieved between the first covered wire and the second covered wire through electromagnetic field coupling,
   the second covered wire has an electromagnetic field coupling electrode where the inner conductor is not coated with the insulator in the first electromagnetic field coupling unit, and
   the electromagnetic field coupling electrode encompasses the inner conductor of the first covered wire by a visual angle of 90° or greater.

2. The covered wire coupling type information communication network according to claim 1, wherein the electromagnetic field coupling electrode makes direct contact with the outer periphery of the insulator that coats the first covered wire in such a manner as to cover the outer periphery of the insulator.

3. The covered wire coupling type information communication network according to claim 1, wherein the electromagnetic field coupling electrode is formed of a conductive layer provided on the inner wall of a cylindrical through hole through which the first covered wire runs in a coupler that is provided with the cylindrical through hole.

4. The covered wire coupling type information communication network according to claim 1, wherein the electromagnetic field coupling electrode of the second covered wire is terminated with the impedance being matched.

5. The covered wire coupling type information communication network according to claim 1, wherein the electromagnetic field coupling electrode of the second covered wire is terminated openly.

6. The covered wire coupling type information communication network according to claim 1, wherein the first covered wire has a third covered wire having the same structure as the first covered wire and forming a differential pair with the first covered wire, and at the same time, the second covered wire has a fourth covered wire having the same structure as the second covered wire and forming a differential pair with the second covered wire, and
   the third covered wire and the fourth covered wire achieve electromagnetic field coupling in a second electromagnetic field coupling unit that is positioned parallel to the first electromagnetic field coupling unit.

7. The covered wire coupling type information communication network according to claim 6, wherein the electromagnetic field coupling electrode of the second covered wire and the electromagnetic field coupling electrode of the fourth covered wire are terminated with impedance being matched.

8. The covered wire coupling type information communication network according to claim 7, wherein the electromagnetic field coupling electrode of the second covered wire and the electromagnetic field coupling electrode of the fourth covered wire are terminated with impedance being matched on the same side in the direction in which the coupling electrodes are arranged in parallel.

9. The covered wire coupling type information communication network according to claim 7, wherein the electromagnetic field coupling electrode of the second covered wire and the electromagnetic field coupling electrode of the fourth covered wire are terminated with impedance being matched on the opposite sides in the direction in which the coupling electrodes are arranged in parallel.

10. The covered wire coupling type information communication network according to claim 7, wherein a conductor for connecting each end of a pair of electromagnetic field coupling electrodes to each other is formed in a coupler so as to provide a terminal resistor for termination with impedance being matched, where the coupler is provided with the pair of electromagnetic field coupling electrodes comprising a pair of cylindrical through holes that are parallel to each other and through which the first covered wire and the third covered wire run, respectively, and conductive layers provided on the inner walls of the pair of cylindrical through holes.

11. The covered wire coupling type information communication network according to claim 7, wherein a transmitter/receiver is connected to either end of the pair of electromagnetic field coupling electrodes so that the resistor provided in the transmitter/receiver connected on the downstream side in the direction of propagation is used as the terminal resistor.

12. The covered wire coupling type information communication network according to claim 6, wherein the electromagnetic field coupling electrode of the second covered wire and the electromagnetic field coupling electrode of the fourth covered wire are terminated openly.

13. The covered wire coupling type information communication network according to claim 12, wherein the electromagnetic field coupling electrode of the second covered wire and the electromagnetic field coupling electrode of the fourth covered wire are terminated openly on the same side in the direction in which the coupling electrodes are arranged in parallel.

14. The covered wire coupling type information communication network according to claim 12, wherein the electromagnetic field coupling electrode of the second covered wire and the electromagnetic field coupling electrode of the fourth covered wire are terminated openly on the opposite sides in the direction in which the coupling electrodes are arranged in parallel.

15. The covered wire coupling type information communication network according to claim 6, wherein the electromagnetic field coupling electrode of the second covered wire and the electromagnetic field coupling electrode of the fourth covered wire are linked without a resistor.

16. The covered wire coupling type information communication network according to claim 15, wherein the electromagnetic field coupling electrode of the second covered wire and the electromagnetic field coupling electrode of the fourth covered wire are linked on the same side in the direction in which the coupling electrodes are arranged in parallel.

17. The covered wire coupling type information communication network according to claim 15, wherein the electromagnetic field coupling electrode of the second covered wire and the electromagnetic field coupling electrode of the fourth covered wire are linked on the opposite sides in the direction in which the coupling electrodes are arranged in parallel.

18. The covered wire coupling type information communication network according to claim 15, wherein a good conductor for connecting each end of a pair of electromagnetic field coupling electrodes to each other is formed in a coupler so as to provide a linking unit, where the coupler is provided with the pair of electromagnetic field coupling electrodes comprising a pair of cylindrical through holes that are parallel to each other and through which the first covered wire and the third covered wire run, respectively, and conductive layers provided on the inner walls of the pair of cylindrical through holes.

19. The covered wire coupling type information communication network according to claim 6, wherein a differential pair comprising a fifth covered wire and a sixth covered wire achieves electromagnetic field coupling with a differential pair comprising the first covered wire and the third covered wire in a location different from the first and second electromagnetic field coupling units.

20. The covered wire coupling type information communication network according to claim 6, wherein a differential pair comprising a fifth covered wire and a sixth covered wire achieves electromagnetic field coupling with a differential pair comprising the first covered wire and the third covered wire in a location that allows for electromagnetic field coupling with the first and second electromagnetic field coupling units.

21. The covered wire coupling type information communication network according to claim 19, further comprising:
a transmission means for transmitting a digital signal to a differential pair comprising the second covered wire and the fourth covered wire; and
a decoding means for decoding the digital signal by determining the polarity of a pulse signal that is induced in a differential pair comprising the first covered wire and the third covered wire.

22. The covered wire coupling type information communication network according to claim 19, further comprising:
a transmission means for transmitting a pulse signal of which the polarity is in response to a digital signal to a differential pair comprising the second covered wire and the fourth covered wire; and
a decoding means for decoding the digital signal by determining the polarity of a bipolar pulse signal that is induced in a differential pair comprising the first covered wire and the third covered wire.

23. The covered wire coupling type information communication network according to claim 19, further comprising:
a test signal transmission means for transmitting a test signal to a differential pair that achieves electromagnetic field coupling with a differential pair comprising the first covered wire and the third covered wire; and
a polarity adjustment means for returning to a normal polarity the polarity of a signal received by another differential pair that achieves electromagnetic field coupling with a differential pair comprising the first covered wire and the third covered wire.

24. An electromagnetic field coupler, comprising:
a first cylindrical through hole through which a first covered wire comprising a cylindrical inner conductor coated with an insulator runs; and
a first electromagnetic field coupling electrode made of a conductive layer provided on the inner wall of the first cylindrical through hole so as to be connected to an inner conductor of a second covered wire comprising the inner conductor coated with an insulator,
wherein data connection is achieved between the first covered wire and the first electromagnetic field coupling electrode through electromagnetic field coupling in the first cylindrical through hole.

25. The electromagnetic field coupler according to claim 24, further comprising:
a second cylindrical through hole through which a third covered wire having the same structure as the first covered wire and forming a differential pair with the first covered wire runs; and
a second electromagnetic field coupling electrode made of a conductive layer provided on the inner wall of the second cylindrical through hole so as to be connected to an inner conductor of a fourth covered wire having the same structure as the second covered wire and forming a differential pair with the second covered wire.

26. The electromagnetic field coupler according to claim 25, wherein one end of the first electromagnetic field coupling electrode and one end of the second electromagnetic field coupling electrode achieve terminal connection through a terminal resistor.

27. The electromagnetic field coupler according to claim 26, wherein the terminal resistor is connected to the first electromagnetic field coupling electrode and the second electromagnetic field coupling electrode on the same side in the direction in which the first and second electromagnetic field coupling electrodes run.

28. The electromagnetic field coupler according to claim 26, wherein the terminal resistor is connected to the first electromagnetic field coupling electrode and the second electromagnetic field coupling electrode on the opposite sides in the direction in which the first and second electromagnetic field coupling electrodes run.

29. The electromagnetic field coupler according to claim 28, wherein the first electromagnetic field coupling electrode is provided inside the first cylindrical through hole on one side in the direction in which the first cylindrical through hole runs, and the second electromagnetic field coupling electrode is provided inside the second cylindrical through hole on the side that is further away from the first electromagnetic field coupling electrode.

30. The electromagnetic field coupler according to claim 25, wherein one end of the first electromagnetic field coupling electrode and one end of the second electromagnetic field coupling electrode are linked through a good conductor.

31. The electromagnetic field coupler according to claim 30, wherein the good conductor is connected to the first electromagnetic field coupling electrode and the second electromagnetic field coupling electrode on the same side in the direction in which the first and the second electromagnetic field coupling electrodes run.

32. The electromagnetic field coupler according to claim 30, wherein the good conductor is connected to the first electromagnetic field coupling electrode and the second electromagnetic field coupling electrode on the opposite sides in the direction in which the first and the second electromagnetic field coupling electrodes run.

33. The electromagnetic field coupler according to claim 32, wherein the first electromagnetic field coupling electrode is provided inside the first cylindrical through hole on one side in the direction in which the first cylindrical through hole runs, and the second electromagnetic field coupling electrode is provided inside the second cylindrical through hole on the side that is further away from the first electromagnetic field coupling electrode.

34. The electromagnetic field coupler according to claim 25, wherein one end of the first electromagnetic field coupling electrode and one end of the second electromagnetic field coupling electrode are terminated openly.

35. The electromagnetic field coupler according to claim 34, wherein the connection point between the first electromagnetic field coupling electrode and the inner conductor of the second covered wire and the connection point between the second electromagnetic field coupling electrode and the inner conductor of the fourth covered wire are on the same side in the direction in which the first electromagnetic field coupling electrode and the second electromagnetic field coupling electrode run.

36. The electromagnetic field coupler according to claim 34, wherein the connection point between the first electromagnetic field coupling electrode and the inner conductor of the second covered wire and the connection point between the second electromagnetic field coupling electrode and the inner conductor of the fourth covered wire are on the opposite sides in the direction in which the first electromagnetic field coupling electrode and the second electromagnetic field coupling electrode run.

* * * * *